United States Patent
Minami et al.

(10) Patent No.: US 8,681,592 B2
(45) Date of Patent: Mar. 25, 2014

(54) OBJECTIVE LENS ELEMENT AND OPTICAL HEAD DEVICE INCLUDING THE SAME

(75) Inventors: Kazuhiro Minami, Osaka (JP);
Yoshiaki Komma, Osaka (JP);
Fumitomo Yamasaki, Nara (JP);
Katsuhiko Hayashi, Nara (JP)

(73) Assignee: Panasonic Corporation, Kadoma-shi (JP)

(*) Notice: Subject to any disclaimer, the term of this patent is extended or adjusted under 35 U.S.C. 154(b) by 122 days.

(21) Appl. No.: 13/396,601

(22) Filed: Feb. 15, 2012

(65) Prior Publication Data

US 2012/0207008 A1     Aug. 16, 2012

(30) Foreign Application Priority Data

Feb. 15, 2011 (JP) ................................ 2011-029371
Feb. 14, 2012 (JP) ................................ 2012-029063

(51) Int. Cl.
*G11B 7/00* (2006.01)

(52) U.S. Cl.
USPC ................................ 369/112.07; 369/112.08

(58) Field of Classification Search
None
See application file for complete search history.

(56) References Cited

U.S. PATENT DOCUMENTS

2006/0002280 A1* 1/2006 Ogiwara ................... 369/112.23
2011/0242950 A1* 10/2011 Komma et al. ............ 369/30.04

FOREIGN PATENT DOCUMENTS

JP  2006-114081 A  4/2006
JP  2010-170694 A  8/2010

* cited by examiner

*Primary Examiner* — Paul Huber
(74) *Attorney, Agent, or Firm* — Judge Patent Associates

(57) ABSTRACT

An objective lens element having improved diffraction efficiency at least one of used wavelengths is provided. The objective lens element includes one surface including: a first region including an optical axis; and a second region surrounding the first region. A periodic first diffraction structure is formed on the first region, and a periodic second diffraction structure different from the first diffraction structure is formed on the second region. The objective lens element satisfies the following conditions.

$$|A1-B1| < |A2-B2| \tag{1}$$

$$|B1| \geq |B2| \tag{2}$$

Here,
A1 and B1 are diffraction orders at the first region to converge light of a first wavelength and light of a second wavelength on a recording surface, respectively, and
A2 and B2 are diffraction orders at the second region to converge the light of the first wavelength and the light of the second wavelength on a recording surface, respectively.

9 Claims, 14 Drawing Sheets

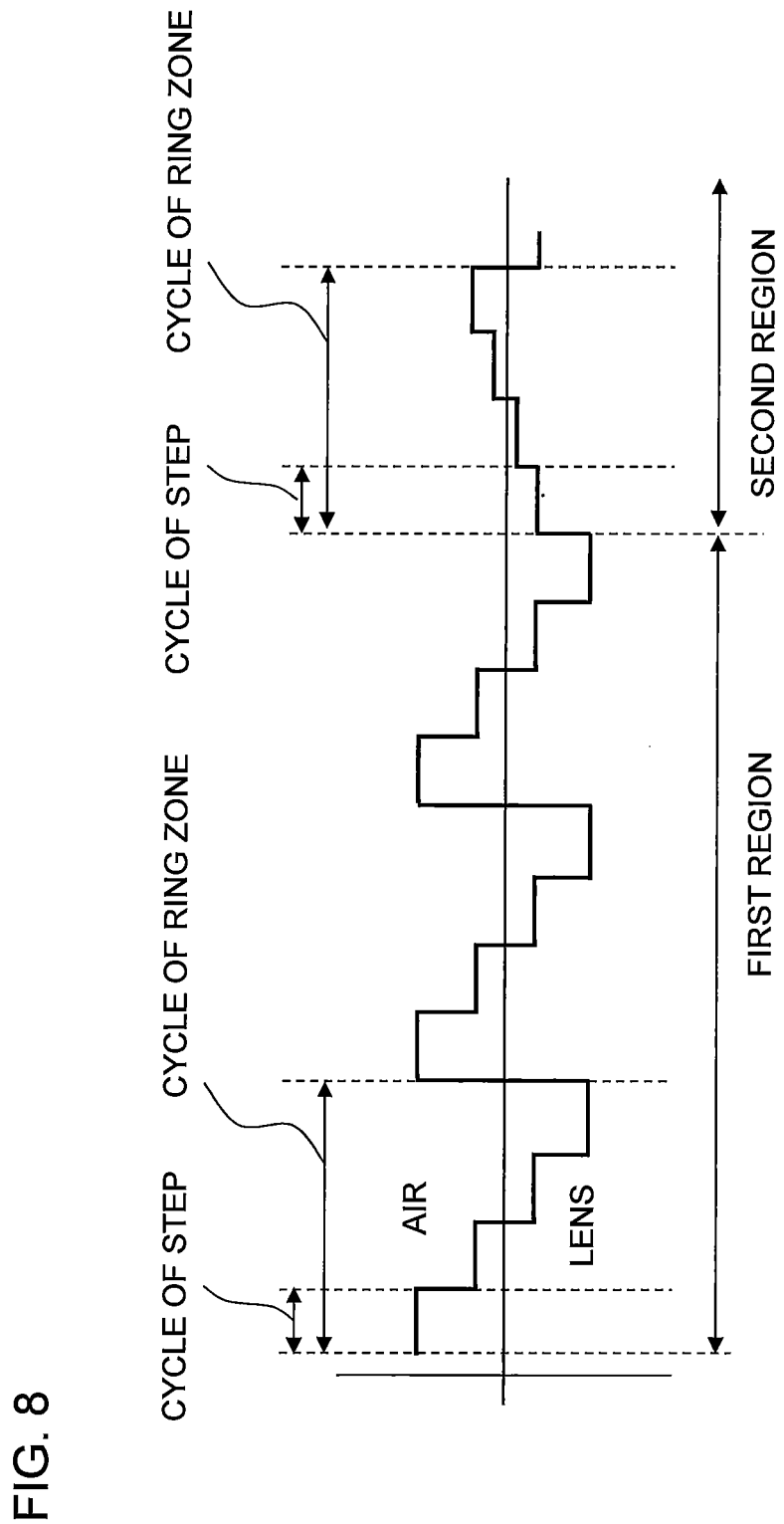

OBJECTIVE LENS ELEMENT AND OPTICAL HEAD DEVICE INCLUDING THE SAME

CROSS REFERENCE TO RELATED APPLICATION

The disclosure of Japanese Patent Application Nos. 2011-029371, filed on Feb. 15, 2011, and 2012-29063, filed on Feb. 14, 2012, is incorporated herein by reference.

BACKGROUND OF THE INVENTION

1. Field of the Invention

The present invention relates to an objective lens element used for performing at least one of recording, reproducing, and erasing of information on an optical information medium such as an optical disc, and an optical head device including the objective lens element.

2. Description of the Background Art

In recent years, research and development has been actively carried out concerning high-density optical discs that have an increased recording density and thus have an increased storage capacity. A standard of such a high-density optical disc is Blu-Ray (R) Disc (hereinafter, referred to as "BD") in which the image side numerical aperture (NA) of an objective lens element is set to about 0.85 and the thickness of a protective base plate formed on an information recording surface of an optical disc is set to about 0.1 mm.

In addition to the above BD standard, a standard (so-called DVD standard) in which a red laser beam with a wavelength of about 680 nm is used and the thickness of a protective base plate formed on an information recording surface of an optical disc is set to about 0.6 mm, and a standard (so-called CD standard) in which an infrared laser beam with a wavelength of about 780 nm is used and the thickness of a protective base plate is set to about 1.2 mm, have also been used. Various objective lens elements that are compatible with at least two of these three standards have been developed.

For example, an objective lens element that is compatible with two types of information storage media, BD and DVD, and an objective lens element that is compatible with three types of information storage media, BD, DVD, and CD, are known (for the latter, for example, see Japanese Laid-Open Patent Publication No. 2010-170694).

In the objective lens element that is compatible with two types of information storage media, BD and DVD, a first surface is divided into two regions which are concentric about a symmetry axis (optical axis), a compatible region which performs aberration compensation for two types of wavelengths for BD and DVD is formed in the region close to the optical axis, and an outer region optimized for BD is formed outside the compatible region. The compatible region has a diffraction structure and achieves spherical aberration compensation for two types of formats of BD and DVD by using a difference in diffraction angle caused by a difference in wavelength. It should be noted that the first surface refers to a surface located closer to a light source, among two optically functional surfaces of the objective lens element. In other words, the first surface is an incident surface of the objective lens element. In addition, a surface opposed to the first surface is referred to as a second surface. In other words, the second surface is an exit surface of the objective lens element.

In the objective lens element that is compatible with three types of information storage media, BD, DVD, and CD, a first surface is divided into three regions which are concentric about the optical axis, a compatible region which performs aberration compensation for three types of wavelengths for BD, DVD, and CD is formed in the region closest to the optical axis, another compatible region which performs aberration compensation for two types of wavelengths for BD and DVD is formed outside the compatible region, and an outer region optimized for BD is formed outside the other compatible region. The compatible region has a diffraction structure and achieves spherical aberration compensation for three types of formats of BD, DVD, and CD by using a difference in diffraction angle caused by a difference in wavelength.

However, when the objective lens element having the above configuration is used, it is necessary to increase the diffraction power of the compatible region in order to ensure a sufficient working distance (in particular, when DVD or CD is used) while aberration compensation is performed for a plurality of formats.

When the diffraction power is increased, the interval of the periodic diffraction structure in the compatible region narrows as distance from the optical axis of the objective lens element increases.

When the interval of the diffraction structure narrows, the diffraction efficiency decreases. As a result, an amount of light passing through the compatible region decreases. Thus, in the conventional objective lens element, performance sufficient to perform recording, reproducing, and erasing of information on an optical information medium such as an optical disc is not obtained.

Further, the interval of the diffraction structure narrows as distance from the optical axis increases. When the interval of the diffraction shape narrows, an amount of light at a peripheral portion of the compatible region greatly decreases. When DVD or CD is used, it is necessary to form a predetermined convergence spot only with light passing through the compatible region. Thus, when an amount of light which determines a numerical aperture for DVD or CD decreases, the numerical aperture effectively decreases. As a result, reproducing/recording performance deteriorates, since a convergence spot on the optical disc effectively enlarges.

SUMMARY OF THE INVENTION

Therefore, the present invention provides an objective lens element having improved diffraction efficiency at least one of a plurality of used wavelengths.

The present invention is directed to an objective lens element capable of converging each of light of a first wavelength and light of a second wavelength longer than the first wavelength, on an information recording surface of an optical disc. The objective lens element includes one surface including: a first region including an optical axis; and a second region surrounding the first region. A periodic first diffraction structure is formed on the first region. A periodic second diffraction structure that is different from the first diffraction structure is formed on the second region. The objective lens element satisfies the following condition formulas.

$$|A1-B1| < |A2-B2| \quad (1)$$

$$|B1| \geq |B2| \quad (2)$$

Here

A1 is a diffraction order at the first region to converge the light of the first wavelength on the information recording surface, B1 is a diffraction order at the first region to converge the light of the second wavelength on the information recording surface, A2 is a diffraction order at the second region to converge the light of the first wavelength on the information recording surface, and B2 is a diffraction order at the second region to converge the light of the second wavelength on the information recording surface.

Further, the present invention is directed to an objective lens element capable of converging each of light of a first wavelength, light of a second wavelength longer than the first wavelength, and light of a third wavelength longer than the second wavelength, on an information recording surface of an optical disc. The objective lens element satisfies the following conditions.

$$L1<0 \quad (3)$$

$$L2>0 \quad (4)$$

Here

L1 is the distance from an incident surface of the objective lens element to an object point of a light source of the second wavelength, and L2 is the distance from the incident surface of the objective lens element to an object point of a light source of the third wavelength.

According to the present invention, diffraction efficiency improves at least one of a plurality of used wavelengths.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a partially enlarged view showing a diffraction shape of an objective lens element according to Example 1;

DESCRIPTION OF THE PREFERRED EMBODIMENTS (First Embodiment)

<1. Configuration of Optical Head Device>

Figure 1:
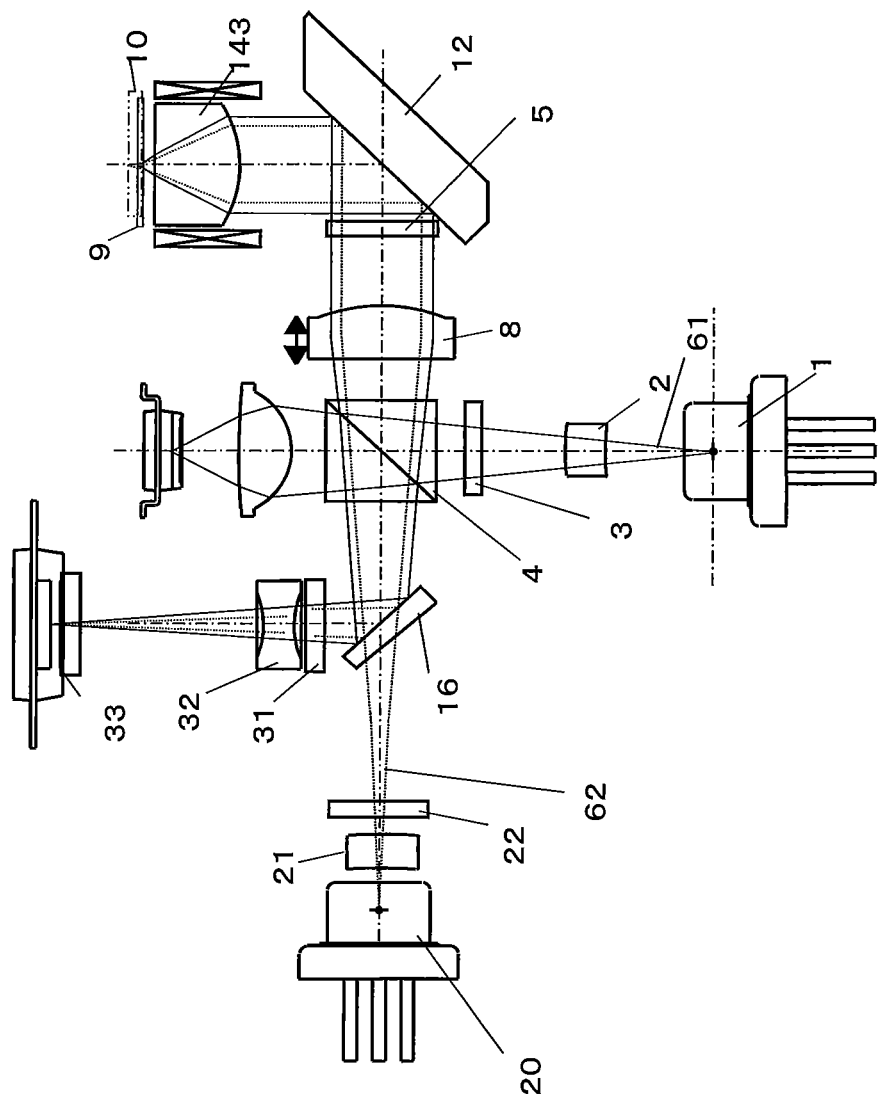
FIG. 1 is a schematic configuration diagram of an optical head device including an objective lens element according to a first embodiment.

FIG. 1 is a schematic configuration diagram of an optical head device including an objective lens element according to a first embodiment. A blue light beam 61 described below corresponds to a light of the wavelength λ1. The wavelength λ1 is an example of first wavelength. Further, a red light beam described below corresponds to a light of the wavelength λ2. The wavelength λ2 is an example of second wavelength.

The optical head device according to the first embodiment is configured to be compatible with the BD standard and the DVD standard.

A blue light beam 61 emitted from a laser beam source 1 passes through a relay lens 2 and a three-beam grating 3, is reflected by a beam splitter 4, and then is converted into a substantially parallel light beam by a collimating lens 8. The collimating lens 8 is movable in an optical axis direction. By moving in the optical axis direction, the collimating lens 8 compensates for a spherical aberration caused by an error of a base material thickness of an optical disc and a spherical aberration caused by a difference in base material thickness between information recording surfaces in a medium having multiple information recording surfaces. The blue light beam 61 having passed through the collimating lens 8 passes through a quarter wavelength plate 5, is reflected by an upward reflection mirror 12, is incident on the objective lens element 143, and is converged on an information recording surface of an optical disc 9 to form a desired spot thereon. The blue light beam 61 reflected by an information recording surface of an optical disc 9 passes through the objective lens element 143 again, is reflected by the upward reflection mirror 12, and passes through the quarter wavelength plate 5, the collimating lens 8, and the beam splitter 4 in order. The blue light beam 61 outputted from the beam splitter 4 is reflected by a beam splitter 16, is converged on a photodetector 33 by a detection lens 32, and is detected as an optical signal by the photodetector 33.

A red light beam 62 emitted from a laser beam source 20 passes through a three-beam grating 22, the beam splitter 16 and the beam splitter 4, is incident on the collimating lens 8, and is converted into diverging light. The collimating lens 8 can adjust the parallelism of the red light beam 62 by moving in the optical axis direction. In addition, similarly to the case where the optical disc 9 is used, by moving in the optical axis direction, the collimating lens 8 compensates for a spherical aberration caused by a difference in base material thickness of an optical disc, a temperature change, a wavelength change, and the like. The red light beam 62 having passed through the collimating lens 8 passes through the quarter wavelength plate 5, is reflected as diverging light by the upward reflection mirror 12, is incident on the objective lens element 143, and is converged on an information recording surface of an optical disc 10 to form a desired spot thereon. The red light beam 62 reflected by the information recording surface of the optical disc 10 passes through the objective lens element 143 again, is reflected by the upward reflection mirror 12, and passes through the quarter wavelength plate 5, the collimating lens 8, and the beam splitter 4 in order. The red light beam 62 outputted from the beam splitter 4 is reflected by the beam splitter 16, is converged on the photodetector 33 by the detection lens 32, and is detected as an optical signal by the photodetector 33.

<2. Description of Objective Lens Element>

Figure 2:
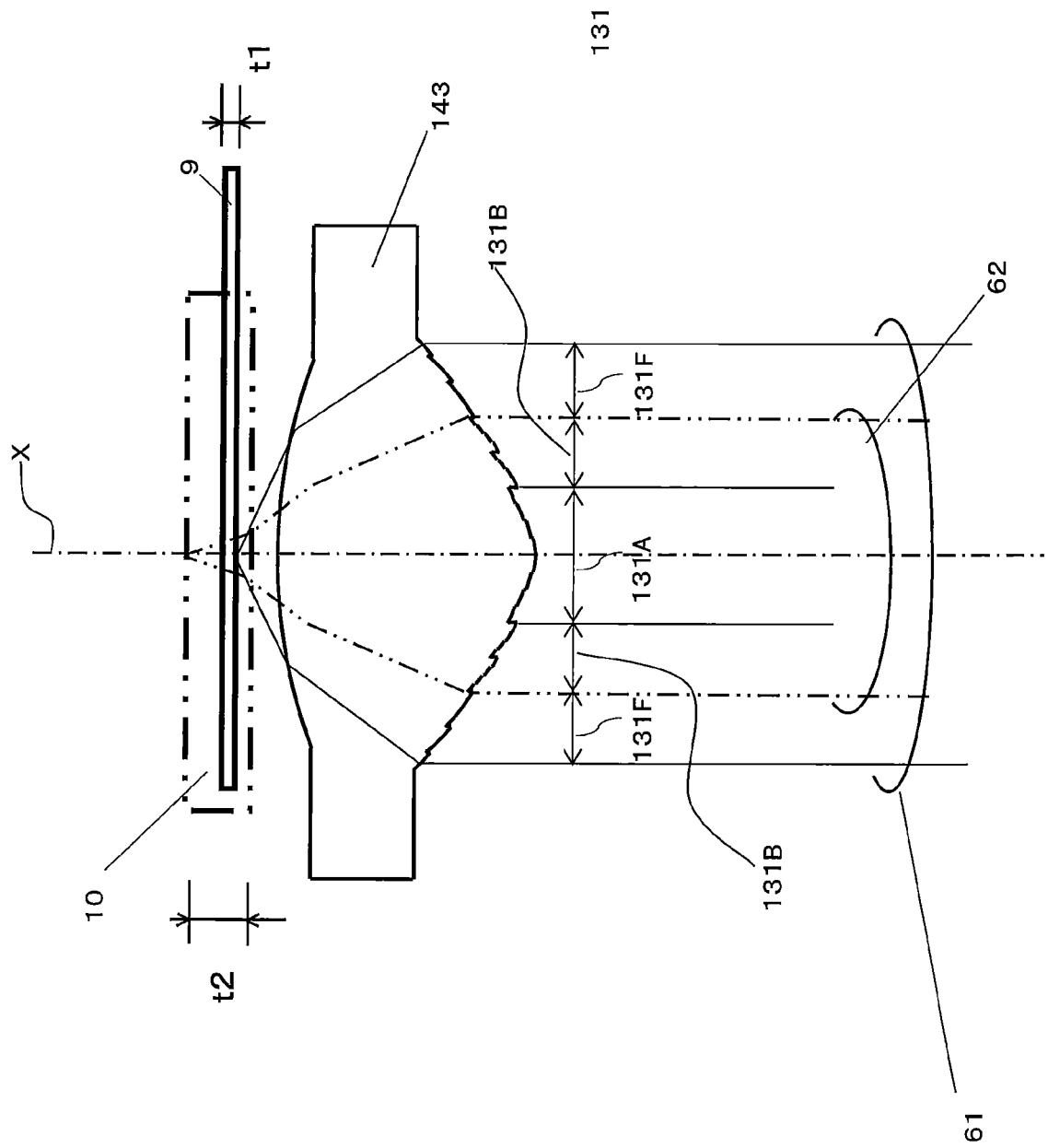
FIG. 2 is a schematic cross-sectional view of the objective lens element according to the first embodiment.

Next, the objective lens element 143 according to the present embodiment will be described. FIG. 2 is a schematic cross-sectional view of the objective lens element 143 according to the first embodiment.

The objective lens element 143 according to the first embodiment is compatible with the BD standard and the DVD standard, converges blue light of a wavelength $\lambda 1$ (about 400 nm) on an information recording surface through a base plate having a thickness of 0.1 mm to form a spot thereon, and converges red light of a wavelength $\lambda 2$ (about 680 nm) on an information recording surface through a base plate having a thickness of 0.6 mm to form a spot thereon.

An incident side optically functional surface of the objective lens element 143 is divided into three regions each having a center on the optical axis, namely, a first region 131A including the optical axis, a ring-shaped second region 131B surrounding the first region 131A, and a ring-shaped outer region 131F surrounding the second region 131B. A stair-like diffraction structure is provided on the first region 131A. A stair-like diffraction structure that is different from that provided on the first region 131A is provided on the second region 131B. A sawtooth-like diffraction structure is provided on the outer region 131F.

Each of the first region 131A and the second region 131B is a region which contributes to formation of spots of light with two wavelengths for BD and DVD. Meanwhile, the outer region 131F is a region dedicated for BD, which contributes to formation of a spot of only light for BD.

<3. Description of Diffraction Structure>

Figure 3:
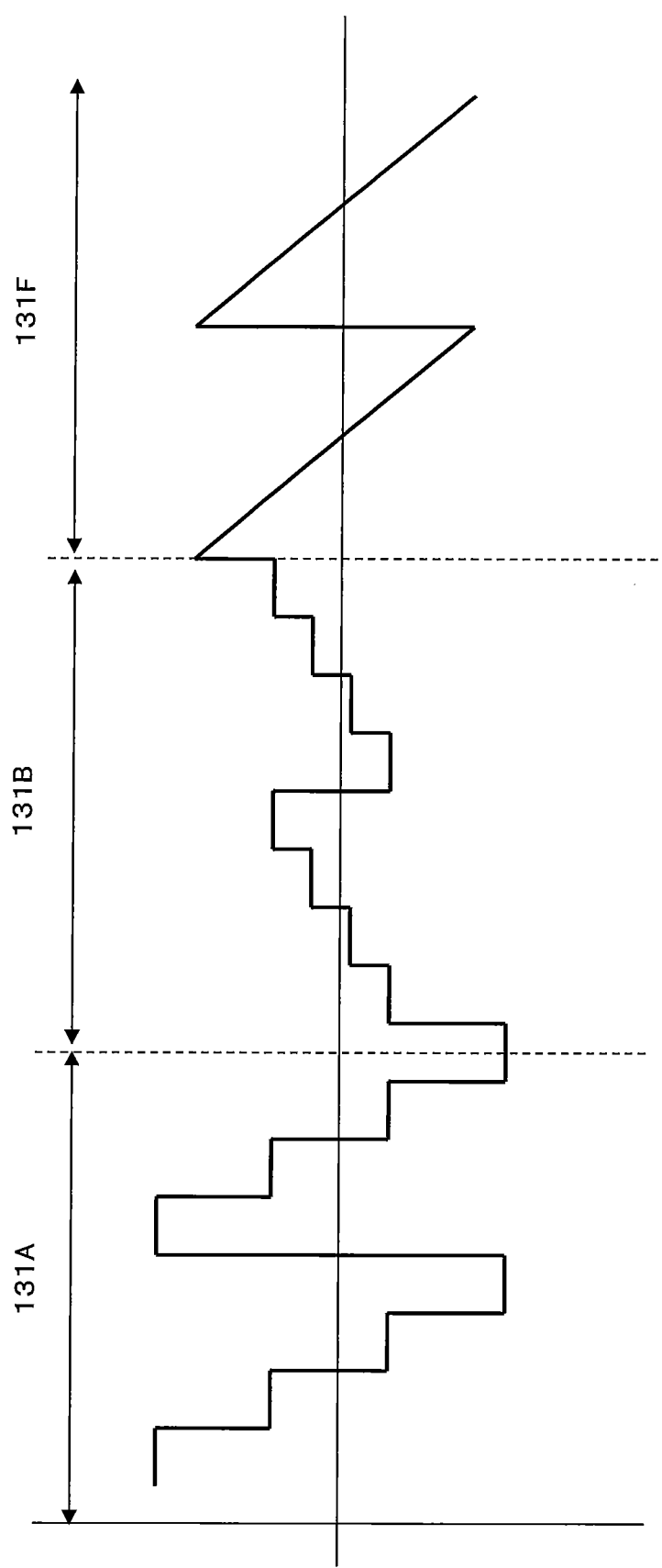
FIG. 3 is a partially enlarged view showing a diffraction shape of the objective lens element according to the first embodiment.

Next, the diffraction structure of the objective lens element 143 according to the present embodiment will be described. FIG. 3 is a partially enlarged view for illustrating the diffraction structure of the objective lens element 143. In FIG. 3, a broken line represents the surface shape of the diffraction structure, a portion below the broken line is a lens material such as glass, and a portion above the broken line is air. It should be noted that in later-described partially enlarged views of diffraction structures, similarly, a portion below a broken line is a lens material, and a portion above a broken line is air.

The objective lens element 143 according to the present embodiment mainly includes the first region 131A, the second region 131B, and the outer region 131F.

In the objective lens element 143 according to the present embodiment, the diffraction structure formed on the first region 131A, the diffraction structure formed on the second region 131B, and the diffraction structure formed on the outer region 131F have different shapes, respectively. The diffraction structure shown in FIG. 3 is an example and may be a diffraction structure of another shape. In addition, the shapes of connection portions between the diffraction structures which are shown in FIG. 3 are examples, and the shapes of the connection portions between the diffraction structures can be set as appropriate.

Hereinafter, each region will be described.

The stair-like diffraction structure provided on the first region 131A is a periodic structure in which one cycle is composed of 4-level steps whose height monotonically decreases step by step as distance from the optical axis of the objective lens element increases. Here, the level number indicates the number of portions substantially parallel to the base surface of the objective lens element, in one cycle of the periodic structure.

The step height of the stair-like diffraction structure of the first region 131A is set such that the diffraction efficiency of +1st order diffracted light is at its maximum when the blue light of the wavelength $\lambda 1$ is used and the diffraction efficiency of −1st order diffracted light is at its maximum when the red light of the wavelength $\lambda 2$ is used. Here, positive and negative of diffraction order will be described. First, a direction in which light incident on the first surface is refracted is set as a reference direction. When light incident on the first surface travels in a direction in which the light is converged toward the inner side of the reference direction (the optical axis side) by diffraction at the second surface, the diffraction order is positive. In addition, when light incident on the first surface travels in a direction in which the light is converged toward the outer side of the reference direction (the outer periphery side) by diffraction, the diffraction order is negative.

One cycle of the stair-like diffraction structure provided on the first region 131A does not necessarily have to be composed of 4-level steps and may be composed of steps other than 4-level steps.

The stair-like diffraction structure provided on the second region 131B is a periodic structure in which one cycle is composed of 4-level steps whose height monotonically increases step by step as distance from the optical axis of the objective lens element increases.

The step height of the stair-like diffraction structure of the second region 131B is set such that the diffraction efficiency of +2nd order diffracted light is at its maximum when the blue light of the wavelength $\lambda 1$ is used and the diffraction efficiency of −1st order diffracted light is at its maximum when the red light of the wavelength $\lambda 2$ is used. One cycle of the stair-like diffraction structure provided on the second region 131B does not necessarily have to be composed of 4-level steps and may be composed of steps other than 4-level steps. In addition, in the present embodiment, a value with which the diffraction efficiency at each wavelength is at its maximum is selected as the diffraction order, but a value with which the diffraction efficiency is not at its maximum may be used as the diffraction order.

The height of the sawtooth-like diffraction structure provided on the outer region 131F is set such that the diffraction efficiency of +3rd order diffracted light is at its maximum when the light of the wavelength $\lambda 1$ for BD is used. The diffraction order having the maximum diffraction efficiency may be a diffraction order other than +3rd order. However, the outer region 131F is a region dedicated for BD, and thus preferably has an aperture limiting function for adjusting an effective NA, with respect to light of a wavelength other than light for BD. In other words, it is desired that light of a wavelength other than the wavelength $\lambda 1$, which is incident on the outer region 131F, does not contribute to a spot and does not return as stray light onto the photodetector 33. The stray light refers to light which is reflected by a surface of an optical disc, a recording surface of the optical disc, an optical component on an optical path, a lens surface, or the like and which influences the intensity of signal light on the photodetector.

<4. Regarding Characteristic Portions>

The objective lens element 143 according to the present embodiment satisfies the following condition formulas (1) and (2).

$$|A1-B1| < |A2-B2| \tag{1}$$

$$|B1| \geq |B2| \tag{2}$$

Here,

A1 is the diffraction order at the first region to converge the light of the wavelength $\lambda 1$ on the information recording surface, B1 is the diffraction order at the first region to converge to the light of the wavelength $\lambda 2$ on the information recording surface, A2 is the diffraction order at the second region to converge the light of the wavelength $\lambda 1$ on the information recording surface, and B2 is the diffraction order at the second region to converge the light of the wavelength $\lambda 2$ on the information recording surface.

By selecting the diffraction order at the first region 131A and the diffraction order at the second region 131B such that the condition formulas (1) and (2) are satisfied, the width of each ring zone constituting the periodic structure of the second region 131B can be made larger than the width of each ring zone constituting the periodic structure of the first region 131A. As a result, the diffraction efficiency improves. The reason why the diffraction efficiency improves will be described below.

First, the working distances for BD and DVD will be described. The working distance is the distance between the objective lens element 143 and a surface of an information storage medium.

When the working distance is shortened, there is the possibility that the objective lens element 143 and the information storage medium will be brought into contact with each other. However, in the case of BD, when the working distance is lengthened, the focal distance increases, and thus the diameter of the objective lens element has to be increased in order to obtain a desired numerical aperture. In addition, when the working distance is long, deterioration of performance caused by a manufacturing error is great. Thus, it is difficult to lengthen the working distance when BD is used.

Meanwhile, regarding DVD, sufficient performance can be ensured even when the working distance is lengthened to some extent as compared to BD. Thus, the working distance when DVD is used can be set so as to be long to some extent, in order to prevent the objective lens element 143 and the information storage medium (here, DVD) from being brought into contact with each other.

In order to lengthen the working distance for DVD, it is necessary to increase diffraction power.

In order to increase the diffraction power, it is necessary to shorten the cycle of the diffraction structure. However, when the cycle of the diffraction structure is shortened, the diffraction efficiency decreases. In particular, the diffraction efficiency of light for DVD decreases. As a result, performance required for DVD cannot be realized.

Thus, in the present embodiment, in order to prevent the diffraction efficiency of light of at least one wavelength (here, the diffraction efficiency of light for DVD) from decreasing, the diffraction order for BD at the first region 131A is set to +1st order, the diffraction order for DVD at the first region 131A is set to −1st order, the diffraction order for BD at the second region 131B is set to +2nd order, and the diffraction order for DVD at the second region 131B is set to −1st order.

As described above, in the present embodiment, the diffraction order for the light for BD at the second region 131B is made higher than the diffraction order for the light for BD at the first region 131A, and the diffraction order for the light for DVD at the second region 131B is made the same as the diffraction order for the light for DVD at the first region 131A. In other words, the difference between the diffraction order for BD and the diffraction order for DVD at the second region 131B is made greater than the difference between the diffraction order for BD and the diffraction order for DVD at the first region 131A.

When a difference in diffraction order is great, the angular difference between diffracted light for BD and diffracted light for DVD also increases. In order to converge diffracted light for BD or diffracted light for DVD, which has passed through the first region 131A and the second region 131B, to form a desired spot in a state where a difference in diffraction order is great, it is necessary to decrease the angular difference between the diffracted light for BD and the diffracted light for DVD in the second region 131B. Thus, in order to decrease the angular difference between the diffracted light for BD and the diffracted light for DVD, the diffraction power of the second region 131B is decreased.

Since the diffraction power is decreased, the cycle of the diffraction structure can be widened. By widening the cycle of the diffraction structure, decrease of the diffraction efficiency can be prevented. In the case of the present embodiment, the diffraction efficiency of the light for DVD greatly improves.

(Second Embodiment)

<1. Description of Optical Head Device>

Figure 4:
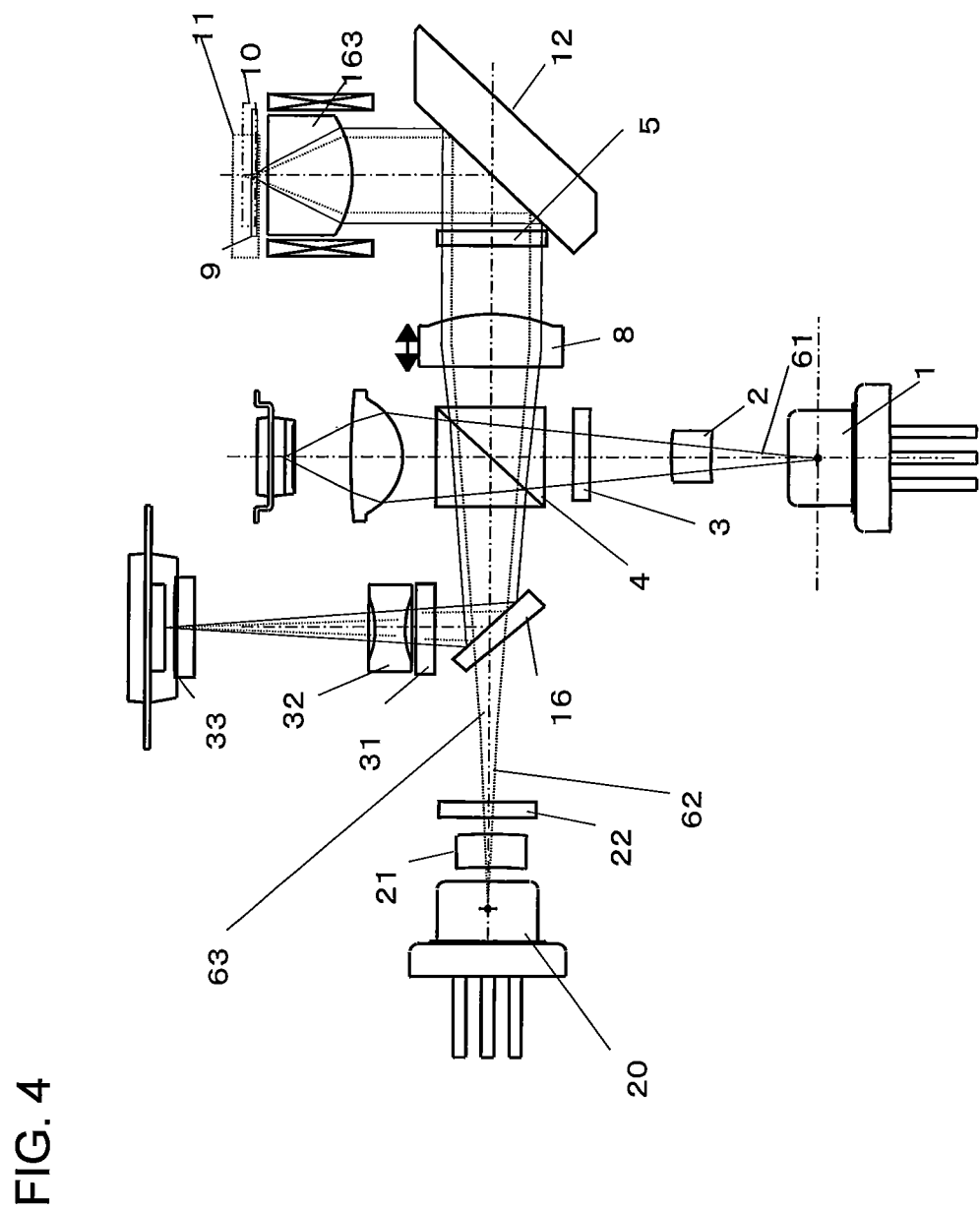
FIG. 4 is a schematic configuration diagram of an optical head device including an objective lens element according to a second embodiment.

FIG. 4 is a schematic configuration diagram of an optical head device including an objective lens element according to a second embodiment.

The optical head device according to the second embodiment is configured to be compatible with the BD standard, the DVD standard, and the CD standard. A blue light beam 61 described below corresponds to a light of the wavelength $\lambda 1$. The wavelength $\lambda 1$ is an example of first wavelength. Further, a red light beam described below corresponds to a light of the wavelength $\lambda 2$. The wavelength $\lambda 2$ is an example of second wavelength. Further, an infrared light beam 63 corresponds to the wavelength $\lambda 3$. The wavelength $\lambda 3$ is an example of third wavelength.

A blue light beam 61 emitted from a laser beam source 1 passes through a relay lens 2 and a three-beam grating 3, is reflected by a beam splitter 4, and then is converted into a substantially parallel light beam by a collimating lens 8. The collimating lens 8 is movable in an optical axis direction. By moving in the optical axis direction, the collimating lens 8 compensates for a spherical aberration caused by an error of a base material thickness of an optical disc and a spherical aberration caused by a difference in base material thickness between information recording surfaces in a medium having multiple information recording surfaces. The blue light beam 61 having passed through the collimating lens 8 passes through a quarter wavelength plate 5, is reflected by an upward reflection mirror 12, is incident on the objective lens element 163, and is converged on an information recording surface of an optical disc 9 to form a desired spot thereon. The blue light beam 61 reflected by the information recording surface of the optical disc 9 passes through the objective lens element 163 again, is reflected by the upward reflection mirror 12, and passes through the quarter wavelength plate 5, the collimating lens 8, and the beam splitter 4 in order. The blue light beam 61 outputted from the beam splitter 4 is reflected by a beam splitter 16, is converged on a photodetector 33 by a detection lens 32, and is detected as an optical signal by the photodetector 33.

A laser beam source 20 according to the present embodiment is a two-wavelength laser beam source which selectively emits red light and infrared light. A red light beam 62 emitted from a laser beam source 20 passes through a three-beam grating 22, the beam splitter 16, and the beam splitter 4, is incident on the collimating lens 8, and is converted into diverging light. The collimating lens 8 can adjust the parallelism of the red light beam 62 by moving in the optical axis direction. In addition, similarly to the case where the optical disc 9 is used, by moving in the optical axis direction, the collimating lens 8 compensates for a spherical aberration caused by a difference in base material thickness of an optical disc, a temperature change, a wavelength change, and the like. The red light beam 62 having passed through the collimating lens 8 passes through the quarter wavelength plate 5, is reflected as diverging light by the upward reflection mirror 12, is incident on the objective lens element 163, and is converged on an information recording surface of an optical disc 10 to form a desired spot thereon. The red light beam 62 reflected by the information recording surface of the optical disc 10 passes through the objective lens element 163 again, is reflected by the upward reflection mirror 12, and passes through the quarter wavelength plate 5, the collimating lens 8, and the beam splitter 4 in order. The red light beam 62 outputted from the beam splitter 4 is reflected by the beam splitter 16, is converged on the photodetector 33 by the detection lens 32, and is detected as an optical signal by the photodetector 33.

An infrared light beam 63 emitted from the laser beam source 20 passes through the three-beam grating 22, the beam splitter 16, and the beam splitter 4, is incident on the collimating lens 8, and is converted into diverging light. The infrared light beam 63 outputted from the collimating lens 8 passes through the quarter wavelength plate 5, is reflected by the upward reflection mirror 12, is incident on the objective lens element 163, and is converged on an information recording surface of an optical disc 11 to form a desired spot thereon. The infrared light beam 63 reflected by the information recording surface of the optical disc 11 passes through the objective lens element 163 again, is reflected by the upward reflection mirror 12, passes through the quarter wavelength plate 5, the collimating lens 8, and the beam splitter 4 in order, and is reflected by the beam splitter 16. Then, the infrared light beam 63 is converged by the detection lens 32 and detected as an optical signal by the photodetector 33.

<2. Description of Objective Lens Element>

Figure 5:
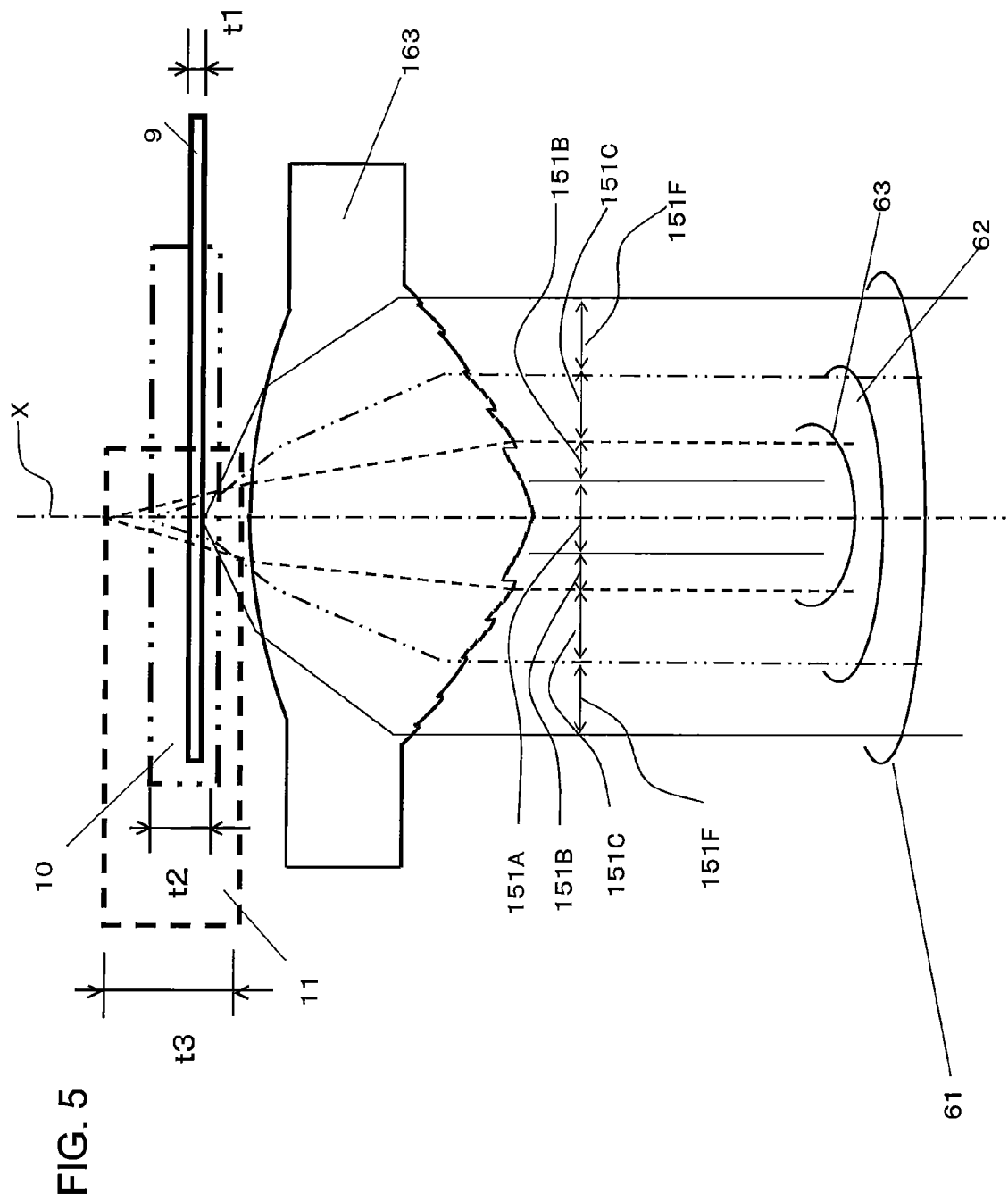
FIG. 5 is a schematic cross-sectional view of the objective lens element according to the second embodiment.

Next, the objective lens element 163 according to the present embodiment will be described. FIG. 5 is a schematic cross-sectional view of the objective lens element 163 according to the present embodiment.

The objective lens element 163 according to the second embodiment is compatible with the BD standard, the DVD standard, and the CD standard, converges blue light of a wavelength $\lambda 1$ (about 400 nm) on an information recording surface through a base plate having a thickness of 0.1 mm to form a spot thereon, converges red light of a wavelength $\lambda 2$ (about 680 nm) on an information recording surface through a base plate having a thickness of 0.6 mm to form a spot thereon, and converges infrared light of a wavelength $\lambda 3$ (about 780 nm) on an information recording surface through a base plate having a thickness of 1.2 mm to form a spot thereon.

An incident side optically functional surface of the objective lens element 163 is divided into four regions each having a center on the optical axis, namely, a first region 151A including the optical axis, a ring-shaped second region 151B surrounding the first region 151A, a ring-shaped third region 151C surrounding the second region 151B, and a ring-shaped outer region 151F surrounding the third region 151C. Stair-like diffraction structures that are different from each other are provided on the first region 151A, the second region 151B, and the third region 151C, respectively. A sawtooth-like diffraction structure is provided on the outer region 151F.

Each of the first region 151A and the second region 151B is a region which contributes to formation of spots of light with three wavelengths for BD, DVD, and CD. The third region 151C is a region which contributes to formation of spots of light with two wavelengths for BD and DVD. The outer region 151F is a region dedicated for BD, which contributes to formation of a spot of only light for BD.

<3. Description of Diffraction Structure>

Figure 6:
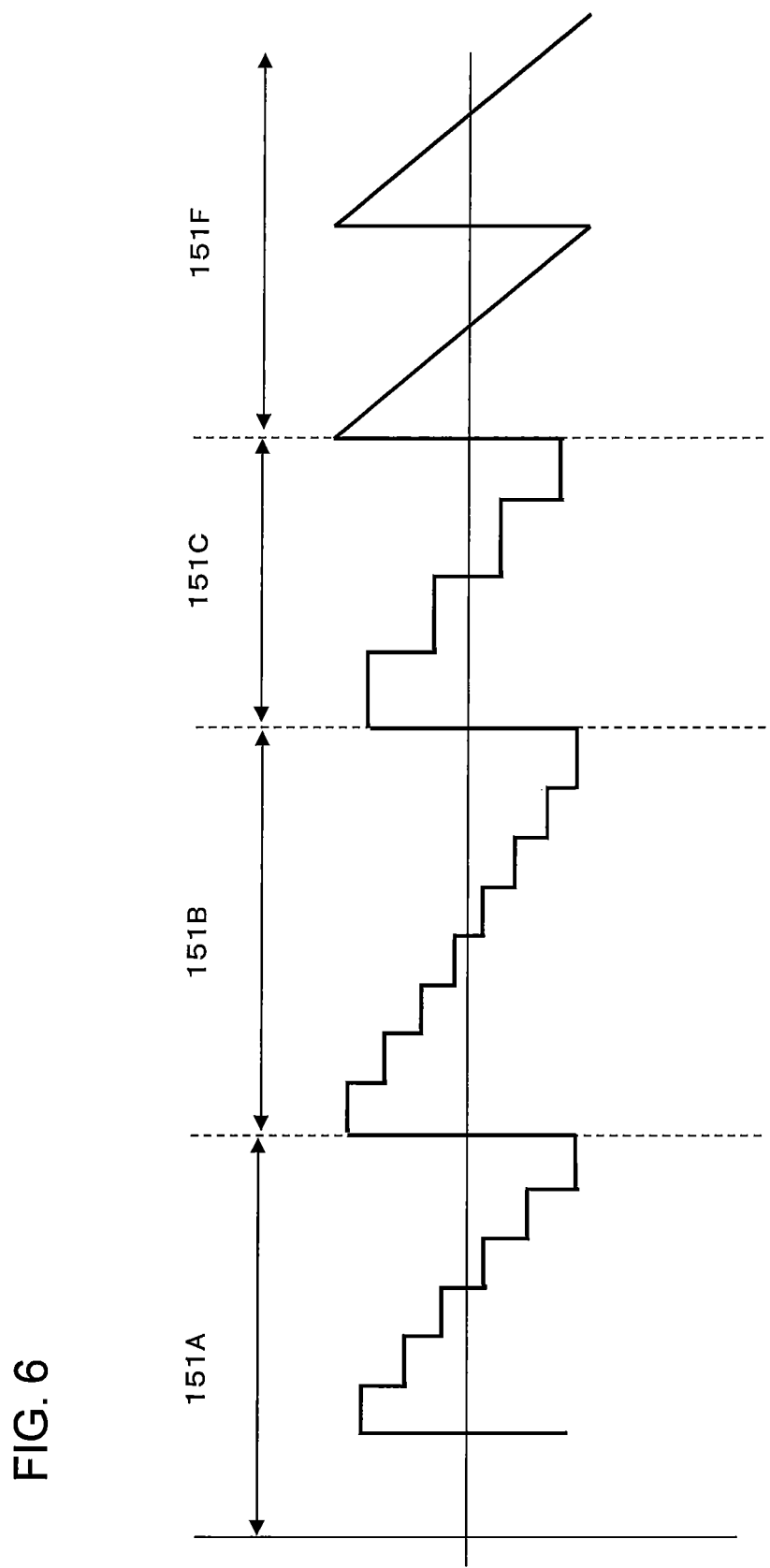
FIG. 6 is a partially enlarged view showing a diffraction shape of the objective lens element according to the second embodiment.

Next, the diffraction structure of the objective lens element 163 according to the present embodiment will be described. FIG. 6 is a partially enlarged view for illustrating the diffraction structure of the objective lens element 163.

The objective lens element 163 according to the present embodiment mainly includes the first region 151A, the second region 151B, the third region 151C, and the outer region 151F.

In the objective lens element 163 according to the present embodiment, the diffraction structure formed on the first region 151A, the diffraction structure formed on the second region 151B, the diffraction structure formed on the third region 151C, and the diffraction structure formed on the outer region 151F have different shapes, respectively. The diffraction structure shown in FIG. 6 is an example and may be a diffraction structure of another shape. In addition, the shapes of connection portions between the diffraction structures which are shown in FIG. 6 are examples, and the shapes of the connection portions between the diffraction structures can be set as appropriate.

Hereinafter, each region will be described.

The stair-like diffraction structure provided on the first region 151A is a periodic structure in which one cycle is composed of 6-level steps whose height monotonically decreases step by step as distance from the optical axis of the objective lens element 163 increases. Here, the level number indicates the number of portions substantially parallel to the base surface of the objective lens element 163, in one cycle of the periodic structure.

The step height of the stair-like diffraction structure of the first region 151A is set such that the diffraction efficiency of +2nd order diffracted light is at its maximum when the blue light of the wavelength $\lambda 1$ is used, the diffraction efficiency of −1st order diffracted light is at its maximum when the red light of the wavelength $\lambda 2$ is used, and the diffraction efficiency of −2nd order diffracted light is at its maximum when the infrared light of the wavelength $\lambda 3$ is used. Here, positive and negative of diffraction order will be described. First, a direction in which light incident on the first surface is refracted is set as a reference direction. When light incident on the first surface travels in a direction in which the light is converged toward the inner side of the reference direction (the optical axis side) by diffraction at the second surface, the diffraction order is positive.

One cycle of the stair-like diffraction structure provided on the first region 151A does not necessarily have to be composed of 6-level steps and may be composed of steps other than 6-level steps.

The stair-like diffraction structure provided on the second region 151B is a periodic structure in which one cycle is composed of 8-level steps whose height monotonically decreases step by step as distance from the optical axis of the objective lens element 163 increases. The step height of the stair-like diffraction structure of the second region 151B is set such that the diffraction efficiency of +2nd order diffracted light is at its maximum when the blue light of the wavelength $\lambda 1$ is used, the diffraction efficiency of −2nd order diffracted light is at its maximum when the red light of the wavelength $\lambda 2$ is used, and the diffraction efficiency of −3rd order diffracted light is at its maximum when the infrared light of the wavelength $\lambda 3$ is used. One cycle of the stair-like diffraction structure provided on the second region 151B does not necessarily have to be composed of 8-level steps and may be composed of steps other than 8-level steps. In addition, in the present embodiment, a value with which the diffraction efficiency at each wavelength is at its maximum is selected as the diffraction order, but a value with which the diffraction efficiency is not at its maximum may be used as the diffraction order.

The stair-like diffraction structure provided on the third region 151C is a periodic structure in which one cycle is composed of 4-level steps whose height monotonically decreases step by step as distance from the optical axis of the objective lens element 163 increases. The step height of the stair-like diffraction structure of the third region 151C is set such that the diffraction efficiency of +1st order diffracted light is at its maximum when the blue light of the wavelength $\lambda 1$ is used and the diffraction efficiency of −1st order diffracted light is at its maximum when the red light of the wavelength $\lambda 2$ is used. One cycle of the stair-like diffraction structure provided on the third region 151C does not necessarily have to be composed of 4-level steps and may be composed of steps other than 4-level steps. In addition, in the present embodiment, a value with which the diffraction efficiency at each wavelength is at its maximum is selected as the diffraction order, but a value with which the diffraction efficiency is not at its maximum may be used as the diffraction order.

The step height of the sawtooth-like diffraction structure provided on the outer region 151F is set such that the diffraction efficiency of +3rd order diffracted light is at its maximum when the blue light of the wavelength $\lambda 1$ is used. The diffraction order having the maximum diffraction efficiency may be a diffraction order other than +3rd order. However, the outer region 151F is a region dedicated for BD, and thus preferably has an aperture limiting function for adjusting an effective NA, with respect to light of a wavelength other than the light for BD. In other words, it is desired that light of a wavelength other than the wavelength $\lambda 1$, which is incident on the outer region 151F, does not contribute to a spot and does not return as stray light onto the photodetector 33. The stray light refers to light which is reflected by a surface of an optical disc, a recording surface of the optical disc, an optical component on an optical path, a lens surface, or the like and which influences the intensity of signal light on the photodetector.

<4. Regarding Characteristic Portions>

The objective lens element 163 according to the present embodiment satisfies the following condition formulas (1) and (2).

$$|A1-B1|<|A2-B2| \quad (1)$$

$$|B1|\geq|B2| \quad (2)$$

Here,

A1 is the diffraction order at the first region to converge the light of the wavelength $\lambda 3$ on the information recording surface, B1 is the diffraction order at the first region to converge the light of the wavelength $\lambda 3$ on the information recording surface, A2 is the diffraction order at the second region to converge the light of the wavelength $\lambda 3$ on the information recording surface, and B2 is the diffraction order at the second region to converge the light of the wavelength $\lambda 1$ on the information recording surface.

By selecting the diffraction order at the first region 131A and the diffraction order at the second region 131B such that the condition formulas (1) and (2) are satisfied, the width of each ring zone of the periodic structure of the second region 151B can be made larger than the width of each ring zone of the periodic structure of the first region 151A. As a result, the diffraction efficiency improves. The reason why the diffraction efficiency improves will be described below.

First, the working distances for BD and CD will be described. The working distance is the distance between the objective lens element 163 and a surface of an information storage medium.

When the working distance is shortened, there is the possibility that the objective lens element 163 and the information storage medium will be brought into contact with each other. However, in the case of BD, when the working distance is lengthened, the focal distance increases, and thus the diameter of the objective lens element has to be increased in order to obtain a desired numerical aperture. In addition, when the working distance is long, deterioration of performance caused by a manufacturing error is great. Thus, it is difficult to lengthen the working distance when BD is used.

Meanwhile, regarding CD, sufficient performance can be ensured even when the working distance is lengthened to some extent as compared to BD. Thus, the working distance when CD is used can be set so as to be long to some extent, in order to prevent the objective lens element 163 and the information storage medium (here, CD) from being brought into contact with each other.

In order to lengthen the working distance for CD, it is necessary to increase diffraction power.

In order to increase the diffraction power, it is necessary to shorten the cycle of the diffraction structure. However, when the cycle of the diffraction structure is shortened, the diffraction efficiency decreases. In particular, the diffraction efficiency of light for CD decreases. As a result, performance required for CD cannot be realized.

Thus, in the present embodiment, in order to prevent the diffraction efficiency of light of at least one wavelength (here, the diffraction efficiency of light for CD) from decreasing, the diffraction order for BD at the first region 151A is set to +2nd order, the diffraction order for CD at the first region 151A is set to −2nd order, the diffraction order for BD at the second region 151B is set to +2nd order, and the diffraction order for CD at the second region 151B is set to −3rd order.

As described above, in the present embodiment, the diffraction order for the light for BD at the second region 151B is made the same as the diffraction order for the light for BD at the first region 151A, and the absolute value of the diffraction order for the light for CD at the second region 151B is made higher than the absolute value of the diffraction order for the light for CD at the first region 151A. In other words, the difference between the diffraction order for BD and the diffraction order for CD at the second region 151B is made greater than the difference between the diffraction order for BD and the diffraction order for CD at the first region 151A.

When a difference in diffraction order is great, the angular difference between diffracted light for BD and diffracted light for CD also increases. In order to converge diffracted light for BD or diffracted light for CD, which has passed through the first region 151A and the second region 151B, to form a desired spot in a state where a difference in diffraction order is great, it is necessary to decrease the angular difference between the diffracted light for BD and the diffracted light for CD in the second region 151B. Thus, in order to decrease the angular difference between the diffracted light for BD and the diffracted light for DVD, the diffraction power of the second region 151B is decreased.

Since the diffraction power is decreased, the cycle of the diffraction structure can be widened. By widening the cycle of the diffraction structure, decrease of the diffraction efficiency can be prevented. This is because increase of the diffraction power can be suppressed by using diffracted light of a high order.

While the diffraction order of the light (the wavelength λ1) for BD at the first region 151A is +2nd and the diffraction order of the light (the wavelength λ3) for CD at the first region 151A is −2nd, the diffraction order of the light (the wavelength λ1) for BD at the second region 151B is +2nd and the diffraction order of the light (the wavelength λ3) for CD at the second region 151B is −3rd. The absolute value of the diffraction order of the light for CD is higher at the second region 151B than at the first region 151A, and thus the diffraction angle of the light for CD is higher at the second region 151B than at the first region 151A. However, in the case of BD, the diffraction orders at the first region 151A and the second region 151B are the same.

Since the difference between the diffraction orders of the light for BD and the light for CD is increased at the second region 151B compared to the first region 151A as described above, the diffraction power for ensuring the same working distance can be small. In other words, the interval of the periodic diffraction shape of the second region 151B is wider than the interval of the diffraction shape of the first region 151A. In the present embodiment, by providing such a configuration, the diffraction efficiency of the light for BD greatly improves.

In the second embodiment, the regions which contribute to formation of spots of light with the three wavelengths for BD, DVD, and CD have been described as an example. However, the second embodiment may be applied to a region which contributes to formation of spots of light with the two wavelengths for BD and DVD. In other words, where B1 is the diffraction order at the first region with respect to the light of the wavelength λ2 and B2 is the diffraction order at the second region with respect to the light of the wavelength λ2, it suffices that a diffraction order is selected such that the condition formulas (1) and (2) are satisfied.

In other words, the first region may be formed as a region which contributes to formation of spots of light with the three wavelengths for BD, DVD, and CD, each of the second region and the third region may be formed as a region which contributes to formation of spots of light with the two wavelengths for BD and DVD, and the outer region may be formed as a region dedicated for BD, which contributes to formation of a spot of only the light for BD. In this case, it suffices that each of the diffraction structures of the second region and the third region satisfies the condition formulas (1) and (2) in the first embodiment. By so doing, it is possible to improve the diffraction efficiency for either BD or DVD.

(Third Embodiment)

Figure 7A:
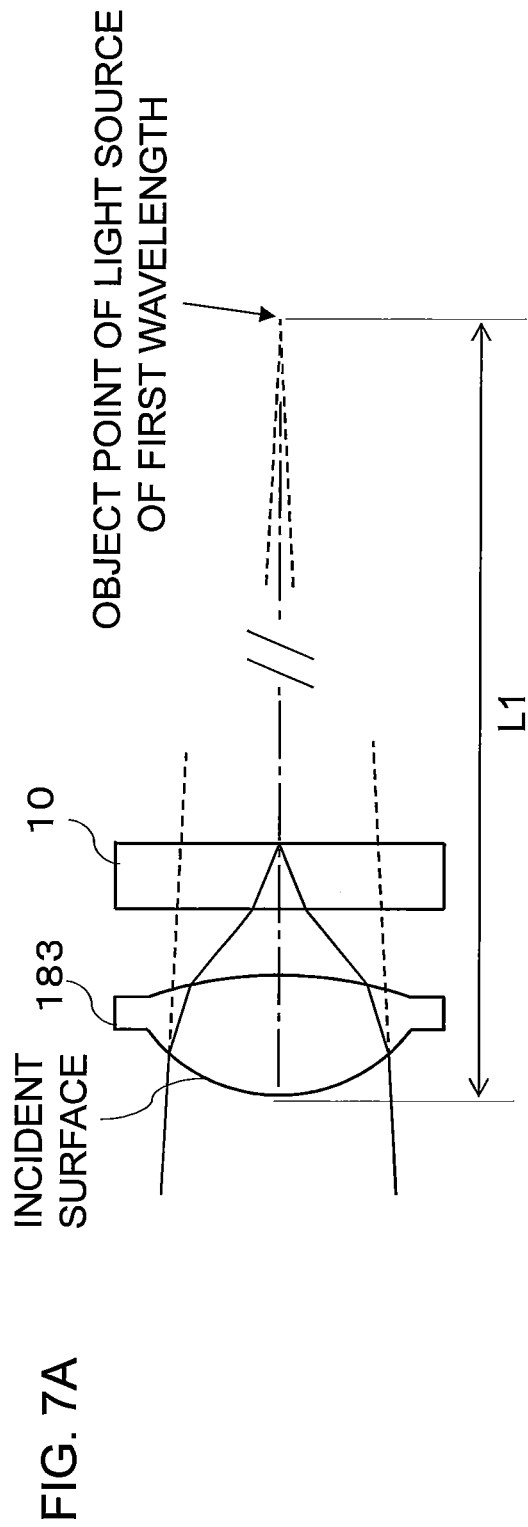
FIG. 7A is an optical path diagram of an objective lens element according to a third embodiment (when DVD is used)
Figure 7B:
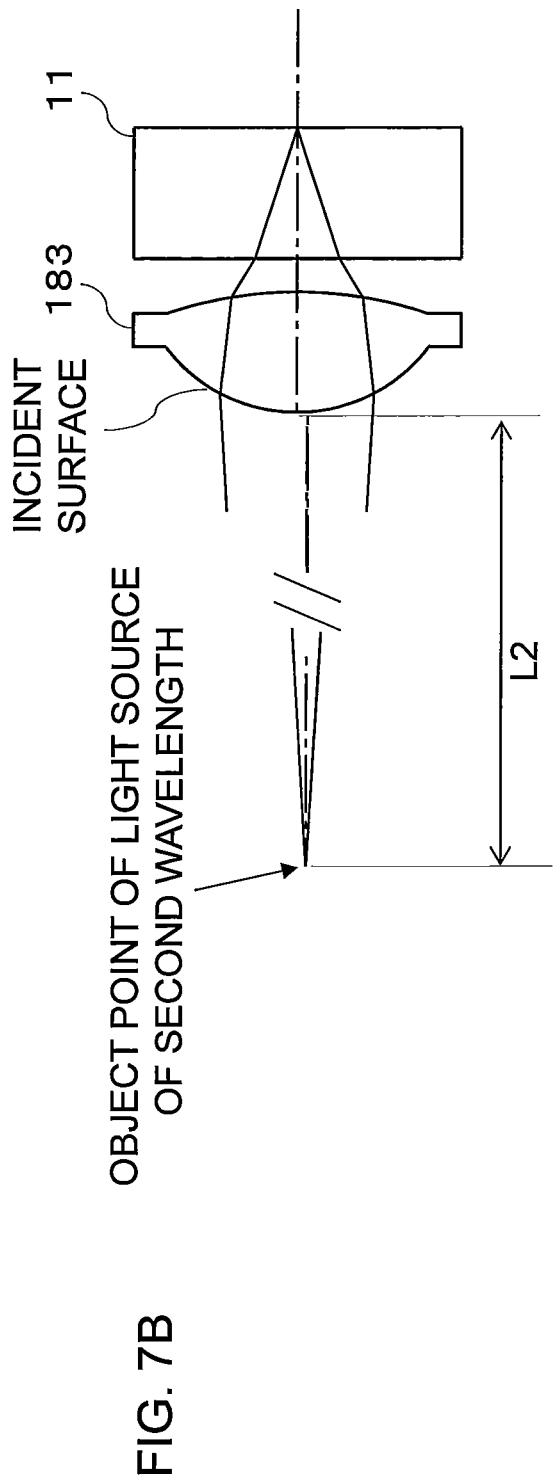
FIG. 7B is an optical path diagram of the objective lens element according to the third embodiment (when CD is used)
Figure 9:
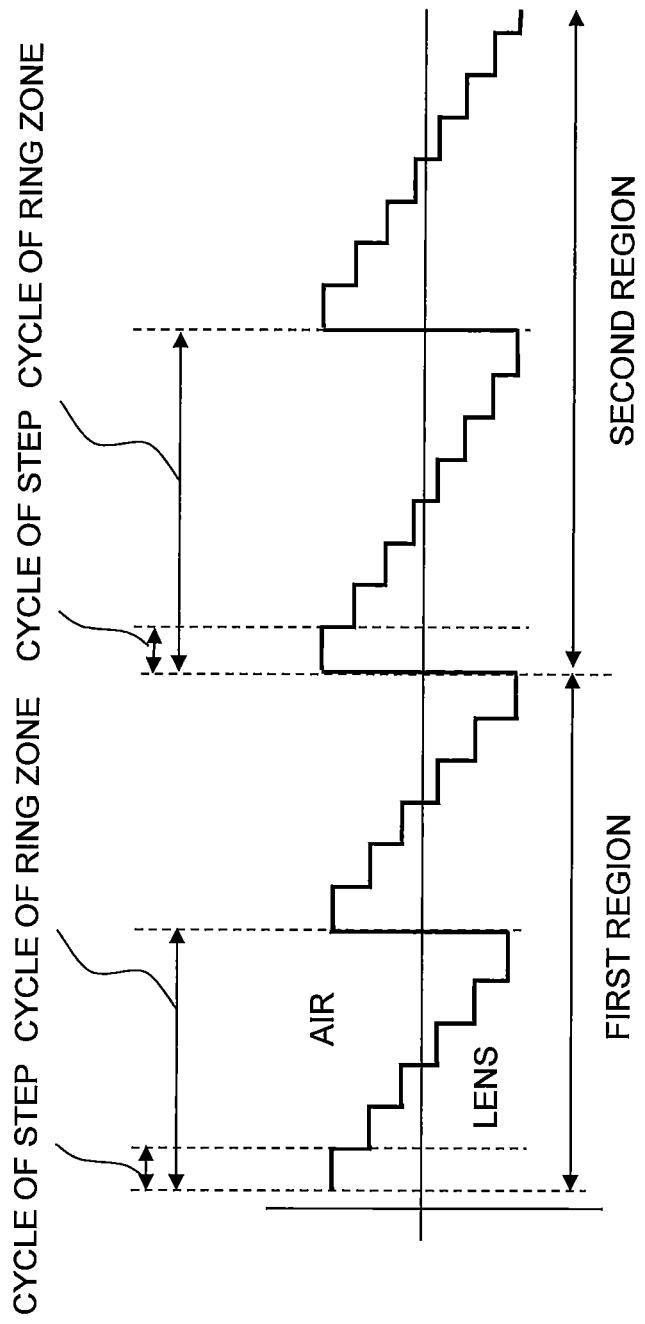
FIG. 9 is a partially enlarged view showing a diffraction shape of an objective lens element according to Example 2.
Figure 10:
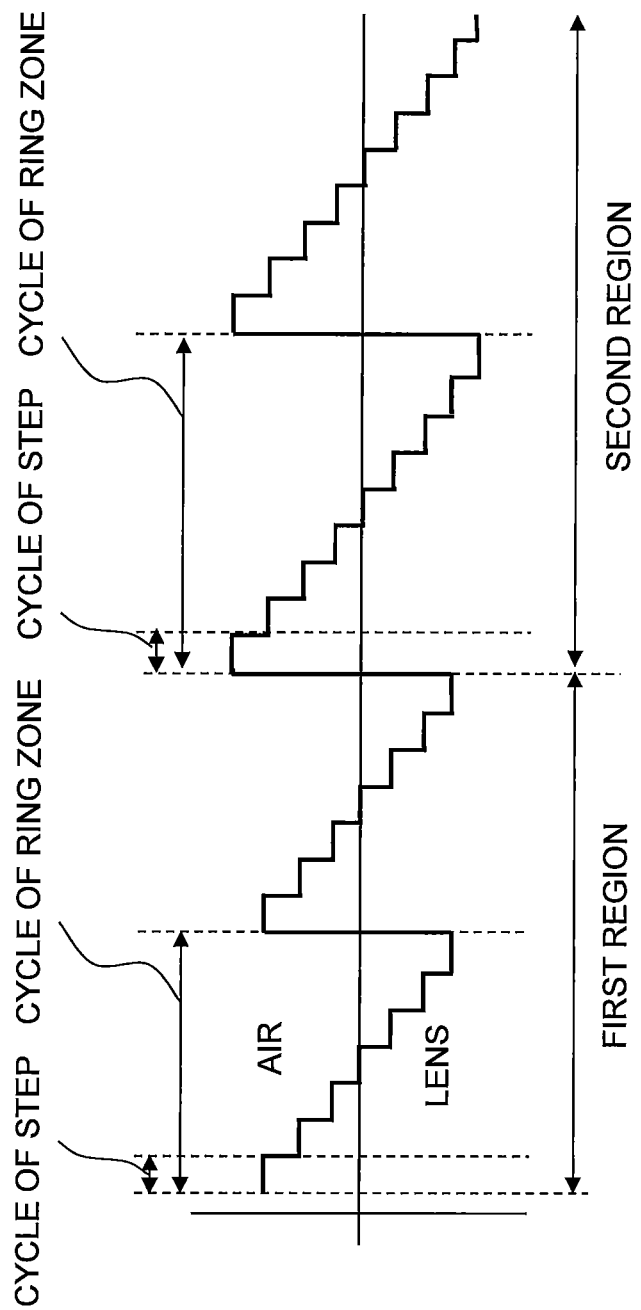
FIG. 10 is a partially enlarged view showing a diffraction shape of an objective lens element according to Example 3.
Figure 11:
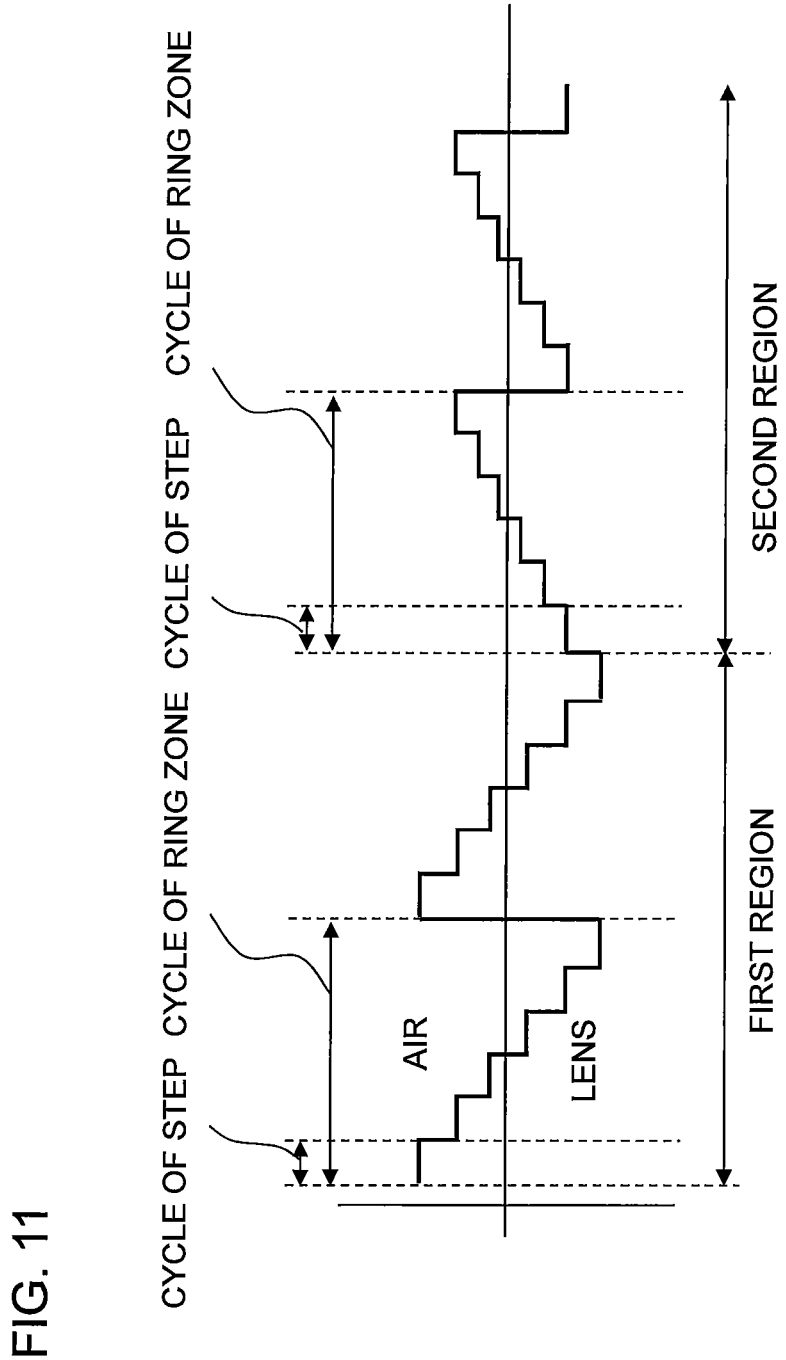
FIG. 11 is a partially enlarged view showing a diffraction shape of an objective lens element according to Example 4.
Figure 12:
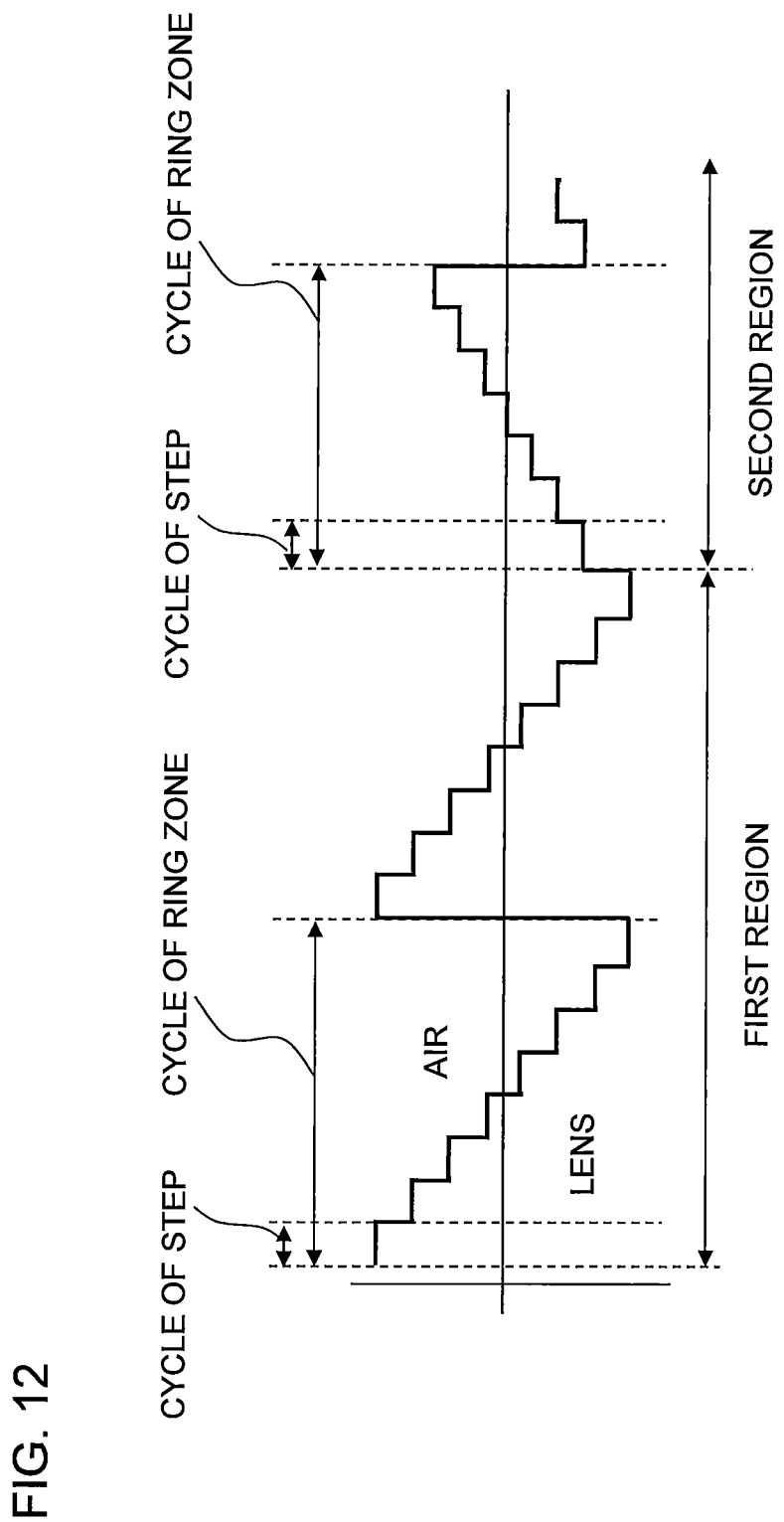
FIG. 12 is a partially enlarged view showing a diffraction shape of an objective lens element according to Example 5.

FIGS. 7A and 7B are optical path diagrams of an objective lens according to a third embodiment of the present invention. Specifically, FIG. 7A is an optical path diagram when DVD is used, and FIG. 7B is an optical path diagram when CD is used.

The objective lens element 183 according to the present embodiment is a BD/DVD/CD compatible lens. The objective lens element 183 can converge light of a wavelength λ1 for BD on an information recording surface through a base plate having a thickness t1 to form a spot thereon, can converge light of a wavelength λ2 for DVD on an information recording surface through a base plate having a thickness t2 to form a spot thereon, and can converge light of a wavelength λ3 for CD on an information recording surface through a base plate having a thickness t3 to form a spot thereon (λ1<λ2<λ3 and t1<t2<t3). Here, the objective lens element 183 is designed such that when the light for BD is used, a spherical aberration which occurs when a parallel light beam is incident on an incident surface thereof is small. In addition, the objective lens element 183 is designed such that: when the light for DVD is used, a spherical aberration which occurs when a converging light beam is incident on the incident surface is smaller than a spherical aberration which occurs when a parallel light beam of the same wavelength is incident on the incident surface; and when the light for CD is used, a spherical aberration which occurs when a diverging light beam is incident on the incident surface is smaller than a spherical aberration which occurs when a parallel light beam of the same wavelength is incident on the incident surface.

The objective lens element 183 according to the present embodiment satisfies the following conditions.

$$L1 < 0 \quad (3)$$

$$L2 > 0 \quad (4)$$

Here,

L1 is the distance from the incident surface of the objective lens element to an object point of a light source of the wavelength λ2, and L2 is the distance from the incident surface of the objective lens element to an object point of a light source of the wavelength λ3.

It should be noted that the object point distance is set so as to be positive when the object point is on the light source side (the left side in FIGS. 7A and 7B) of the incident surface of the objective lens element 183, and is set so as to be negative when the object point is on the optical disc side (the right side in FIGS. 7A and 7B) of the incident surface of the objective lens element 183.

According to the present embodiment, while the optical performance when the light for BD is used is optimized, optical performance for DVD and CD can also be ensured. Thus, the three-wavelength compatible objective lens element 183 having excellent optical performance can be realized.

EXAMPLES

Hereinafter, Examples of the present invention will be described with construction data and specific values of diffraction efficiencies. It should be noted that in each Example, a surface to which an aspheric coefficient is provided indicates a refractive optical surface having an aspherical shape or a surface (e.g., a diffractive surface) having a refraction function equal to that of an aspheric surface. The surface shape of an aspheric surface is defined by the following formula.

$$X = \frac{C_j h^2}{1 + \sqrt{1 - (1 + k_j)C_j^2 h^2}} + \sum A_{j,n} h^n$$

Here,

X is the distance from an on-the-aspheric-surface point at a height h relative to the optical axis to a tangential plane at the top of the aspheric surface, h is the height relative to the optical axis, $C_j$ is the radius of curvature at the top of an aspheric surface of a jth surface of a lens ($C_j = 1/R_j$), $k_j$ is the conic constant of the jth surface of the lens, and $A_{j,n}$ is the nth-order aspheric constant of the jth surface of the lens.

Further, a phase difference caused by a diffraction structure added to an optical surface is provided by the following formula.

$$\Phi(h) = M\Sigma P_{j,m} h^{2m}$$

Here, $\Phi(h)$ is a phase function, h is the height relative to the optical axis, $P_{j,m}$ is the 2mth-order phase function coefficient of the jth surface of the lens, and M is a diffraction order.

FIGS. 8 to 12 are partially enlarged views of diffraction structures of objective lens elements according to Examples 1 to 5, respectively. Specifically, FIGS. 8 to 12 each are an enlarged view of a compatible region composed of a first region and a second region. In FIGS. 8 to 12, a portion below a diffraction shape represented by a broken line is a lens material, and a portion above the diffraction shape is air.

Example 1

Example 1 corresponds to the first embodiment. The first surface of an objective lens element according to Example 1 is divided into a first region including a symmetry axis, a second region surrounding the first region, and an outer region surrounding the second region. A 4-level stair-like diffraction structure whose height monotonically decreases step by step as distance from the optical axis of the objective lens element increases is provided on the first region of the first surface. A 4-level stair-like diffraction structure whose height monotonically increases step by step as distance from the optical axis of the objective lens element increases is provided on the second region. A sawtooth-like diffraction structure is provided on the outer region. The second surface is also divided into a first region and an outer region, and different aspheric surfaces are provided on these regions, respectively. The objective lens element according to Example 1 is a BD/DVD compatible lens. With regard to designed values for BD, the wavelength is 408 nm; the focal length is 1.30 mm; the numerical aperture (NA) is 0.86; and the protective layer thickness of an information storage medium is 0.1 mm. With regard to designed values for DVD, the wavelength is 660 nm; the focal length is 1.45 mm; the NA is 0.6; and the protective layer thickness of an information storage medium is 0.6 mm.

Tables 1 and 2 show construction data of the objective lens element according to Example 1.

TABLE 1

|  | BD | DVD |
| --- | --- | --- |
| Wavelength | 0.408 | 0.660 |
| Effective diameter | 2.24 | 1.79 |
| NA | 0.86 | 0.60 |
| Working distance (WD) | 0.38 | 0.30 |
| Disc thickness (DT) | 0.10 | 0.60 |
| Focal length | 1.30 | 1.45 |
| First surface, Inner region Diffraction order | 1 | −1 |
| First surface, Middle region Diffraction order | 2 | −1 |
| First surface, Outer region Diffraction order | 3 | — |
| Object point (OP) | ∞ | 150 |

TABLE 1-continued

| Surface No. | Radius of curvature at the top | Thickness | Material | Remarks |
| --- | --- | --- | --- | --- |
| 0 |  | OP |  |  |
| 1 | 0.865865 | 1.561992 | n1 | Inner region (Diffractive surface), Middle region (Diffractive surface), Outer region (Diffractive surface) |
| 2 | −1.383884 | WD |  | Inner region (Aspheric surface), Outer region (Aspheric surface) |
| 3 | ∞ | DT | disc | Planar |
| 4 | ∞ |  |  | Planar |
| Wavelength |  | 0.408 |  | 0.660 |
| n1 |  | 1.52196 |  | 1.50413 |
| disc |  | 1.61642 |  | 1.57815 |

TABLE 2

| First surface | Inner region Diffractive surface |
| --- | --- |
| Region | 0 mm-0.86 mm |
|  | Aspherical constant |
| RD | 0.86586496 |
| k | −0.65493979 |
| A0 | 0 |
| A2 | 0 |
| A4 | 0.043157648 |
| A6 | 0.022669249 |
| A8 | −0.011628554 |
| A10 | 0.04337541 |
| A12 | −0.020193608 |
|  | Phase function |
| P2 | −286.87093 |
| P4 | 34.691426 |
| P6 | −35.053222 |

| First surface | Middle region Diffractive surface |
| --- | --- |
| Region | 0.86 mm-0.90 mm |
|  | Aspherical constant |
| RD | 0.6889239 |
| k | −1.123762 |
| A0 | 6.93E-02 |
| A2 | 0 |
| A4 | −0.72506052 |
| A6 | −0.36650133 |
| A8 | 1.2488416 |
| A10 | 5.7418087 |
| A12 | 1.2738183 |
| A14 | −39.026355 |
| A16 | 45.308213 |
| A18 | 8.1660937 |
| A20 | −37.137781 |
| A22 | 15.526237 |
|  | Phase function |
| P2 | −428.05758 |
| P4 | 306.21925 |
| P6 | −144.05443 |

| First surface | Outer region Diffractive surface |
| --- | --- |
| Region | 0.90 mm-1.12 mm |
|  | Aspherical constant |
| RD | 0.8865722 |
| k | −0.650895 |

TABLE 2-continued

| | |
|---|---|
| A0 | 7.76E−03 |
| A2 | 0 |
| A4 | 0.035157518 |
| A6 | 0.060338707 |
| A8 | 0.021728949 |
| A10 | −0.04642263 |
| A12 | −0.006640622 |
| A14 | 0.002299187 |
| A16 | 0.01567928 |
| A18 | 0.041621567 |
| A20 | −0.038273541 |
| | Phase function |
| P2 | −195.47933 |
| P4 | −107.2491 |

| | Inner region |
|---|---|
| Second surface | Aspheric surface |
| Region | 0 mm-0.51 mm |
| | Aspherical constant |
| RD | −1.383884 |
| k | −25.670907 |
| A0 | 0 |
| A2 | 0 |
| A4 | 0.43509192 |
| A6 | −0.82598537 |
| A8 | −0.64638874 |
| A10 | 5.2735825 |
| A12 | −6.8737179 |

| | Outer region |
|---|---|
| Second surface | Aspheric surface |
| Region | 0.51 mm-0.88 mm |
| | Aspherical constant |
| RD | −1.383884 |
| k | −33.488315 |
| A0 | −0.000255988 |
| A2 | 0 |
| A4 | 0.28103759 |
| A6 | −0.40400028 |
| A8 | −0.14767444 |
| A10 | 0.68091898 |
| A12 | −0.039113439 |
| A14 | −1.4783633 |
| A16 | 1.8259917 |
| A18 | −0.5551804 |
| A20 | −0.41580555 |
| A22 | 0.26520865 |

Tables 3A-3E show ring zone cycles of the stair-like step structure provided on the first region of the first surface, and cycles of steps arranged in each ring zone.

TABLE 3A

| | Cycle [μm] | | Cycle [μm] |
|---|---|---|---|
| First ring zone | 147.67 | First step | 74.02 |
| | | Second step | 30.70 |
| | | Third step | 23.58 |
| | | Fourth step | 19.89 |
| Second ring zone | 61.64 | First step | 17.54 |
| | | Second step | 15.88 |
| | | Third step | 14.61 |
| | | Fourth step | 13.61 |
| Third ring zone | 47.47 | First step | 12.80 |
| | | Second step | 12.11 |
| | | Third step | 11.53 |
| | | Fourth step | 11.03 |
| Fourth ring zone | 40.14 | First step | 10.58 |
| | | Second step | 10.19 |
| | | Third step | 9.84 |
| | | Fourth step | 9.53 |

TABLE 3A-continued

| | Cycle [μm] | | Cycle [μm] |
|---|---|---|---|
| Fifth ring zone | 35.47 | First step | 9.24 |
| | | Second step | 8.98 |
| | | Third step | 8.74 |
| | | Fourth step | 8.52 |
| Sixth ring zone | 32.15 | First step | 8.31 |
| | | Second step | 8.12 |
| | | Third step | 7.94 |
| | | Fourth step | 7.78 |
| Seventh ring zone | 29.64 | First step | 7.62 |
| | | Second step | 7.47 |
| | | Third step | 7.34 |
| | | Fourth step | 7.21 |
| Eighth ring zone | 27.64 | First step | 7.08 |
| | | Second step | 6.96 |
| | | Third step | 6.85 |
| | | Fourth step | 6.74 |

TABLE 3B

| | Cycle [μm] | | Cycle [μm] |
|---|---|---|---|
| Ninth ring zone | 26.00 | First step | 6.64 |
| | | Second step | 6.55 |
| | | Third step | 6.45 |
| | | Fourth step | 6.36 |
| Tenth ring zone | 24.63 | First step | 6.28 |
| | | Second step | 6.20 |
| | | Third step | 6.12 |
| | | Fourth step | 6.04 |
| Eleventh ring zone | 23.45 | First step | 5.97 |
| | | Second step | 5.90 |
| | | Third step | 5.83 |
| | | Fourth step | 5.76 |
| Twelfth ring zone | 22.42 | First step | 5.70 |
| | | Second step | 5.64 |
| | | Third step | 5.58 |
| | | Fourth step | 5.52 |
| Thirteenth ring zone | 21.52 | First step | 5.46 |
| | | Second step | 5.41 |
| | | Third step | 5.35 |
| | | Fourth step | 5.30 |
| Fourteenth ring zone | 20.71 | First step | 5.25 |
| | | Second step | 5.20 |
| | | Third step | 5.15 |
| | | Fourth step | 5.10 |
| Fifteenth ring zone | 19.97 | First step | 5.06 |
| | | Second step | 5.01 |
| | | Third step | 4.97 |
| | | Fourth step | 4.93 |
| Sixteenth ring zone | 19.31 | First step | 4.89 |
| | | Second step | 4.85 |
| | | Third step | 4.81 |
| | | Fourth step | 4.77 |

TABLE 3C

| | Cycle [μm] | | Cycle [μm] |
|---|---|---|---|
| Seventeenth ring zone | 18.70 | First step | 4.73 |
| | | Second step | 4.69 |
| | | Third step | 4.66 |
| | | Fourth step | 4.62 |
| Eighteenth ring zone | 18.13 | First step | 4.58 |
| | | Second step | 4.55 |
| | | Third step | 4.52 |
| | | Fourth step | 4.48 |
| Nineteenth ring zone | 17.61 | First step | 4.45 |
| | | Second step | 4.42 |
| | | Third step | 4.39 |
| | | Fourth step | 4.35 |

TABLE 3C-continued

| | Cycle [μm] | | Cycle [μm] |
|---|---|---|---|
| Twentieth ring zone | 17.12 | First step | 4.32 |
| | | Second step | 4.29 |
| | | Third step | 4.26 |
| | | Fourth step | 4.23 |
| Twenty-first ring zone | 16.66 | First step | 4.21 |
| | | Second step | 4.18 |
| | | Third step | 4.15 |
| | | Fourth step | 4.12 |
| Twenty-second ring zone | 16.22 | First step | 4.10 |
| | | Second step | 4.07 |
| | | Third step | 4.04 |
| | | Fourth step | 4.02 |
| Twenty-third ring zone | 15.81 | First step | 3.99 |
| | | Second step | 3.97 |
| | | Third step | 3.94 |
| | | Fourth step | 3.92 |
| Twenty-fourth ring zone | 15.42 | First step | 3.89 |
| | | Second step | 3.87 |
| | | Third step | 3.84 |
| | | Fourth step | 3.82 |

TABLE 3D

| | Cycle [μm] | | Cycle [μm] |
|---|---|---|---|
| Twenty-fifth ring zone | 15.05 | First step | 3.80 |
| | | Second step | 3.77 |
| | | Third step | 3.75 |
| | | Fourth step | 3.73 |
| Twenty-sixth ring zone | 14.70 | First step | 3.71 |
| | | Second step | 3.69 |
| | | Third step | 3.66 |
| | | Fourth step | 3.64 |
| Twenty-seventh ring zone | 14.36 | First step | 3.62 |
| | | Second step | 3.60 |
| | | Third step | 3.58 |
| | | Fourth step | 3.56 |
| Twenty-eighth ring zone | 14.04 | First step | 3.54 |
| | | Second step | 3.52 |
| | | Third step | 3.50 |
| | | Fourth step | 3.48 |
| Twenty-ninth ring zone | 13.73 | First step | 3.46 |
| | | Second step | 3.44 |
| | | Third step | 3.42 |
| | | Fourth step | 3.40 |
| Thirtieth ring zone | 13.43 | First step | 3.39 |
| | | Second step | 3.37 |
| | | Third step | 3.35 |
| | | Fourth step | 3.33 |
| Thirty-first ring zone | 13.14 | First step | 3.31 |
| | | Second step | 3.29 |
| | | Third step | 3.28 |
| | | Fourth step | 3.26 |
| Thirty-second ring zone | 12.86 | First step | 3.24 |
| | | Second step | 3.22 |
| | | Third step | 3.21 |
| | | Fourth step | 3.19 |

TABLE 3E

| | Cycle [μm] | | Cycle [μm] |
|---|---|---|---|
| Thirty-third ring zone | 12.60 | First step | 3.17 |
| | | Second step | 3.16 |
| | | Third step | 3.14 |
| | | Fourth step | 3.12 |

On the first region of Example 1, one ring zone cycle is composed of consecutive 4-level stair-like steps whose height monotonically decreases step by step as distance from the optical axis of the objective lens element increases. Each ring zone cycle in Tables 3A-3E indicate the width of a ring zone in a radial direction (in a direction perpendicular to the optical axis) as indicated by an arrow in FIG. 8. On the first region, a first ring zone, a second ring zone, a third ring zone, . . . , and a thirty-third ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 8. In each ring zone, the steps are referred to as a first step, a second step, a third step, and a fourth step in order from the optical axis side toward the outer periphery side.

Table 4 shows ring zone cycles of the stair-like step structure provided on the second region of the first surface, and cycles of steps arranged in each ring zone.

TABLE 4

| | Cycle [μm] | | Cycle [μm] |
|---|---|---|---|
| First ring zone | 17.06 | First step | 4.30 |
| | | Second step | 4.28 |
| | | Third step | 4.25 |
| | | Fourth step | 4.22 |
| Second ring zone | 16.62 | First step | 4.20 |
| | | Second step | 4.17 |
| | | Third step | 4.14 |
| | | Fourth step | 4.11 |

On the second region of Example 1, one ring zone cycle is composed of consecutive 4-level stair-like steps whose height monotonically increases step by step as distance from the optical axis of the objective lens element increases. Each ring zone cycle in Table 4 indicates the width of a ring zone in the radial direction (in the direction perpendicular to the optical axis) as indicated by an arrow in FIG. 8. On the second region, a first ring zone and a second ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 8. In each ring zone, the steps are referred to as a first step, a second step, a third step, and a fourth step in order from the optical axis side toward the outer periphery side.

Table 5 shows ring zone cycles of the sawtooth-like diffraction structure provided on the outer region of the first surface.

TABLE 5

| | Cycle [μm] |
|---|---|
| First ring zone | 40.40 |
| Second ring zone | 24.83 |
| Third ring zone | 23.62 |
| Fourth ring zone | 22.53 |
| Fifth ring zone | 21.55 |
| Sixth ring zone | 20.65 |
| Seventh ring zone | 19.84 |
| Eighth ring zone | 19.10 |
| Ninth ring zone | 18.41 |

On the outer region, a first ring zone, a second ring zone, a third ring zone, a fourth ring zone, . . . , a ninth ring zone are provided in order from the optical axis side toward the outer periphery side of the objective lens element.

Tables 6A-6E show step heights of the stair-like diffraction structure provided on the first region of the first surface. In one cycle of the stair-like diffraction structure, the height of each of the first to third steps is set such that a phase difference of 1.25 wavelengths is provided to light of the designed wavelength for BD, and the height of the fourth step is set such that a phase difference of 3.75 wavelengths is provided in the opposite direction.

TABLE 6A

|  |  | Depth [μm] |
|---|---|---|
| First ring zone | First step | 0.97848 |
|  | Second step | 0.97988 |
|  | Third step | 0.98128 |
|  | Fourth step | 2.94806 |
| Second ring zone | First step | 0.98411 |
|  | Second step | 0.98554 |
|  | Third step | 0.98699 |
|  | Fourth step | 2.96531 |
| Third ring zone | First step | 0.98990 |
|  | Second step | 0.99138 |
|  | Third step | 0.99286 |
|  | Fourth step | 2.98305 |
| Fourth ring zone | First step | 0.99585 |
|  | Second step | 0.99738 |
|  | Third step | 0.99890 |
|  | Fourth step | 3.00131 |
| Fifth ring zone | First step | 1.00198 |
|  | Second step | 1.00354 |
|  | Third step | 1.00511 |
|  | Fourth step | 3.02006 |
| Sixth ring zone | First step | 1.00828 |
|  | Second step | 1.00988 |
|  | Third step | 1.01150 |
|  | Fourth step | 3.03938 |
| Seventh ring zone | First step | 1.01476 |
|  | Second step | 1.01640 |
|  | Third step | 1.01806 |
|  | Fourth step | 3.05921 |
| Eighth ring zone | First step | 1.02143 |
|  | Second step | 1.02311 |
|  | Third step | 1.02483 |
|  | Fourth step | 3.07965 |

TABLE 6B

|  |  | Depth [μm] |
|---|---|---|
| Ninth ring zone | First step | 1.02828 |
|  | Second step | 1.03003 |
|  | Third step | 1.03178 |
|  | Fourth step | 3.10065 |
| Tenth ring zone | First step | 1.03534 |
|  | Second step | 1.03713 |
|  | Third step | 1.03894 |
|  | Fourth step | 3.12229 |
| Eleventh ring zone | First step | 1.04260 |
|  | Second step | 1.04444 |
|  | Third step | 1.04630 |
|  | Fourth step | 3.14453 |
| Twelfth ring zone | First step | 1.05006 |
|  | Second step | 1.05198 |
|  | Third step | 1.05389 |
|  | Fourth step | 3.16744 |
| Thirteenth ring zone | First step | 1.05776 |
|  | Second step | 1.05971 |
|  | Third step | 1.06169 |
|  | Fourth step | 3.19103 |
| Fourteenth ring zone | First step | 1.06568 |
|  | Second step | 1.06770 |
|  | Third step | 1.06973 |
|  | Fourth step | 3.21533 |
| Fifteenth ring zone | First step | 1.07384 |
|  | Second step | 1.07591 |
|  | Third step | 1.07800 |
|  | Fourth step | 3.24034 |

TABLE 6B-continued

|  |  | Depth [μm] |
|---|---|---|
| Sixteenth ring zone | First step | 1.08224 |
|  | Second step | 1.08438 |
|  | Third step | 1.08653 |
|  | Fourth step | 3.26610 |

TABLE 6C

|  |  | Depth [μm] |
|---|---|---|
| Seventeenth ring zone | First step | 1.09089 |
|  | Second step | 1.09309 |
|  | Third step | 1.09530 |
|  | Fourth step | 3.29261 |
| Eighteenth ring zone | First step | 1.09980 |
|  | Second step | 1.10206 |
|  | Third step | 1.10435 |
|  | Fourth step | 3.31999 |
| Nineteenth ring zone | First step | 1.10898 |
|  | Second step | 1.11131 |
|  | Third step | 1.11368 |
|  | Fourth step | 3.34815 |
| Twentieth ring zone | First step | 1.11844 |
|  | Second step | 1.12085 |
|  | Third step | 1.12329 |
|  | Fourth step | 3.37718 |
| Twenty-first ring zone | First step | 1.12820 |
|  | Second step | 1.13068 |
|  | Third step | 1.13319 |
|  | Fourth step | 3.40710 |
| Twenty-second ring zone | First step | 1.13825 |
|  | Second step | 1.14081 |
|  | Third step | 1.14339 |
|  | Fourth step | 3.43796 |
| Twenty-third ring zone | First step | 1.14861 |
|  | Second step | 1.15125 |
|  | Third step | 1.15390 |
|  | Fourth step | 3.46976 |
| Twenty-fourth ring zone | First step | 1.15929 |
|  | Second step | 1.16200 |
|  | Third step | 1.16474 |
|  | Fourth step | 3.50250 |

TABLE 6D

|  |  | Depth [μm] |
|---|---|---|
| Twenty-fifth ring zone | First step | 1.17029 |
|  | Second step | 1.17309 |
|  | Third step | 1.17591 |
|  | Fourth step | 3.53629 |
| Twenty-sixth ring zone | First step | 1.18163 |
|  | Second step | 1.18451 |
|  | Third step | 1.18741 |
|  | Fourth step | 3.57105 |
| Twenty-seventh ring zone | First step | 1.19330 |
|  | Second step | 1.19628 |
|  | Third step | 1.19928 |
|  | Fourth step | 3.60686 |
| Twenty-eighth ring zone | First step | 1.20533 |
|  | Second step | 1.20839 |
|  | Third step | 1.21148 |
|  | Fourth step | 3.64373 |
| Twenty-ninth ring zone | First step | 1.21771 |
|  | Second step | 1.22086 |
|  | Third step | 1.22404 |
|  | Fourth step | 3.68171 |
| Thirtieth ring zone | First step | 1.23045 |
|  | Second step | 1.23369 |
|  | Third step | 1.23696 |
|  | Fourth step | 3.72075 |

TABLE 6D-continued

|  |  | Depth [μm] |
|---|---|---|
| Thirty-first ring zone | First step | 1.24356 |
|  | Second step | 1.24689 |
|  | Third step | 1.25025 |
|  | Fourth step | 3.76088 |
| Thirty-second ring zone | First step | 1.25704 |
|  | Second step | 1.26046 |
|  | Third step | 1.26391 |
|  | Fourth step | 3.80216 |

TABLE 6E

|  |  | Depth [μm] |
|---|---|---|
| Thirty-third ring zone | First step | 1.27088 |
|  | Second step | 1.27440 |
|  | Third step | 1.27794 |

Table 7 shows step heights of the stair-like diffraction structure provided on the second region of the first surface. In one cycle of the stair-like diffraction structure, the height of each of the first to third steps is set such that a phase difference of 0.25 wavelength is provided to light of the designed wavelength for DVD, and the height of the fourth step is set such that a phase difference of 0.75 wavelength is provided in the opposite direction.

TABLE 7

|  |  | Depth [μm] |
|---|---|---|
| First ring zone | First step | 0.43228 |
|  | Second step | 0.43394 |
|  | Third step | 0.43562 |
|  | Fourth step | 1.31194 |
| Second ring zone | First step | 0.43903 |
|  | Second step | 0.44076 |
|  | Third step | 0.44252 |
|  | Fourth step | 1.33292 |

Table 8 shows step heights of the sawtooth-like diffraction structure provided on the outer region of the first surface. The step heights of the sawtooth-like diffraction structure are set such that a phase difference of 3 wavelengths is provided to the light of the designed wavelength for BD, and +3rd order diffracted light is used.

TABLE 8

|  | Depth [μm] |
|---|---|
| First ring zone | 3.36561 |
| Second ring zone | 3.45768 |
| Third ring zone | 3.54477 |
| Fourth ring zone | 3.61974 |
| Fifth ring zone | 3.67212 |
| Sixth ring zone | 3.68745 |
| Seventh ring zone | 3.64692 |
| Eighth ring zone | 3.52776 |
| Ninth ring zone | 3.30591 |

Table 9 shows diffraction efficiencies at the thirty-third ring zone of the first region and at the second ring zone of the second region. The second ring zone of the second region is an outermost region which contributes to formation of a spot of the light for DVD in the present example.

TABLE 9

|  |  |  | Diffraction efficiency(%) |
|---|---|---|---|
| BD | Inner region | First ring zone | 80 |
|  |  | Thirty-third ring zone | 61 |
|  | Middle region | Second ring zone | 29 |
| DVD | Inner region | First ring zone | 78 |
|  |  | Thirty-third ring zone | 58 |
|  | Middle region | Second ring zone | 72 |

The ring zone cycle of the thirty-third ring zone of the first region is about 13 μm, and the diffraction efficiency of the light for DVD is about 58%. Meanwhile, the ring zone cycle of the first ring zone of the first region is about 148 μm, and the diffraction efficiency of the light for DVD is about 78%. Thus, the diffraction efficiency of the light for DVD at the thirty-third ring zone of the first region is much lower than the diffraction efficiency at the first ring zone. When the present invention is not applied, the diameter of a spot on a recording surface is increased with this diffraction efficiency, and recording/reproducing performance of DVD deteriorates.

In contrast, the ring zone cycle of the second ring zone of the second region is about 17 μm. The diffraction efficiency of the light for DVD at the second ring zone of the second region is about 72% and is greatly improved as compared to that at the thirty-third ring zone of the first region. Thus, enlargement of a beam spot formed when the light for DVD is incident is suppressed. As a result, the recording/reproducing performance improves.

Example 2

Example 2 corresponds to the second embodiment. The first surface of an objective lens element according to Example 2 is divided into a first region including a symmetry axis, a second region surrounding the first region, a third region surrounding the second region, and an outer region surrounding the third region. A 6-level stair-like diffraction structure whose height monotonically decreases step by step as distance from the optical axis of the objective lens element increases is provided on the first region of the first surface. An 8-level stair-like diffraction structure whose height monotonically decreases step by step as distance from the optical axis of the objective lens element increases is provided on the second region. A 4-level stair-like diffraction structure whose height monotonically decreases step by step as distance from the optical axis of the objective lens element increases is provided on the third region. A sawtooth-like diffraction structure is provided on the outer region. The second surface is an aspheric surface. The objective lens element according to Example 2 is a BD/DVD/CD compatible lens. With regard to designed values for BD, the wavelength is 405 nm; the focal length is 1.20 mm; and the protective layer thickness of an information storage medium is 0.085 mm. With regard to designed values for DVD, the wavelength is 650 nm; the focal length is 1.45 mm; and the protective layer thickness of an information storage medium is 0.6 mm. With regard to designed values for CD, the wavelength is 780 nm; the focal length is 1.64 mm; and the protective layer thickness of an information storage medium is 1.2 mm.

Tables 10 and 11 show construction data of the objective lens element according to Example 2.

TABLE 10

|  | BD | DVD | CD |
|---|---|---|---|
| Wavelength | 0.405 | 0.650 | 0.780 |
| Effective diameter | 1.66 | 1.66 | 1.66 |
| Working distance (WD) | 0.47 | 0.44 | 0.30 |
| Disc thickness (DT) | 0.085 | 0.60 | 1.20 |
| Focal length | 1.20 | 1.45 | 1.64 |
| First surface, First region Diffraction order | 2 | −1 | −2 |
| First surface, Second region Diffraction order | 2 | −2 | −3 |
| First surface, Third region Diffraction order | 1 | −1 | — |
| First surface, Outer region Diffraction order | 3 | — | — |
| Object point (OP) | ∞ | ∞ | 400 |

| Surface No. | Radius of curvature at the top | Thickness | Material | Remarks |
|---|---|---|---|---|
| 0 |  | OP |  |  |
| 1 | 0.80094682 | 1.16723 | n1 | First region (Diffractive surface), Second region (Diffractive surface), Third region (Diffractive surface), Outer region (Diffractive surface) |
| 2 | −2.36979 | WD |  | Aspheric surface |
| 3 | ∞ | DT | disc | Planar |
| 4 | ∞ |  |  | Planar |

| Wavelength | 0.405 | 0.650 | 0.780 |
|---|---|---|---|
| n1 | 1.52550 | 1.50746 | 1.50385 |
| disc | 1.61913 | 1.57881 | 1.57180 |

TABLE 11

| First surface | First region Diffractive surface |
|---|---|
| Region | 0 mm–0.76 mm |
|  | Aspherical constant |
| RD | 0.80094682 |
| k | −0.99630763 |
| A0 | 0 |
| A2 | 0 |
| A4 | 0.15911155 |
| A6 | 0.10260604 |
| A8 | 0.012767725 |
| A10 | −1.9922639 |
| A12 | 9.054756 |
| A14 | −14.670648 |
| A16 | 8.6186121 |
|  | Phase function |
| P2 | −307.57297 |
| P4 | −18.255432 |
| P6 | 13.625204 |

| First surface | Second region Diffractive surface |
|---|---|
| Region | 0.76 mm–0.82 mm |
|  | Aspherical constant |
| RD | 0.38100041 |
| k | −1.8508273 |
| A0 | −1.21E−01 |
| A2 | 0 |
| A4 | −0.035003385 |
| A6 | 0.99082251 |
| A8 | −1.8892425 |
| A10 | −2.4967727 |

TABLE 11-continued

| A12 | 17.673196 |
|---|---|
| A14 | −25.890832 |
| A16 | 12.211077 |
| A18 | 0.7497486 |
|  | Phase function |
| P2 | −291.36683 |
| P4 | −215.20791 |
| P6 | 306.73161 |

| Second surface | Aspherical constant |
|---|---|
| RD | −2.36979 |
| k | 16.74851 |
| A0 | 0 |
| A2 | 0 |
| A4 | 1.5488076 |
| A6 | −10.726282 |
| A8 | 36.424214 |
| A10 | 553.29212 |
| A12 | −7238.9707 |
| A14 | 37431.492 |
| A16 | −93807.005 |
| A18 | 94316.616 |

Tables 12A–12F show ring zone cycles of the stair-like step structure provided on the first region of the first surface, and cycles of steps arranged in each ring zone.

TABLE 12A

|  | Cycle [μm] |  | Cycle [μm] |
|---|---|---|---|
| First ring zone | 142.39 | First step | 58.34 |
|  |  | Second step | 24.16 |
|  |  | Third step | 18.53 |
|  |  | Fourth step | 15.62 |
|  |  | Fifth step | 13.76 |
|  |  | Sixth step | 12.43 |
| Second ring zone | 59.05 | First step | 11.43 |
|  |  | Second step | 10.64 |
|  |  | Third step | 9.99 |
|  |  | Fourth step | 9.44 |
|  |  | Fifth step | 8.98 |
|  |  | Sixth step | 8.58 |
| Third ring zone | 45.24 | First step | 8.22 |
|  |  | Second step | 7.91 |
|  |  | Third step | 7.63 |
|  |  | Fourth step | 7.38 |
|  |  | Fifth step | 7.15 |
|  |  | Sixth step | 6.94 |
| Fourth ring zone | 38.08 | First step | 6.75 |
|  |  | Second step | 6.57 |
|  |  | Third step | 6.41 |
|  |  | Fourth step | 6.26 |
|  |  | Fifth step | 6.11 |
|  |  | Sixth step | 5.98 |
| Fifth ring zone | 33.50 | First step | 5.86 |
|  |  | Second step | 5.74 |
|  |  | Third step | 5.63 |
|  |  | Fourth step | 5.52 |
|  |  | Fifth step | 5.42 |
|  |  | Sixth step | 5.33 |

TABLE 12B

|  | Cycle [μm] |  | Cycle [μm] |
|---|---|---|---|
| Sixth ring zone | 30.25 | First step | 5.24 |
|  |  | Second step | 5.16 |
|  |  | Third step | 5.07 |
|  |  | Fourth step | 5.00 |
|  |  | Fifth step | 4.92 |
|  |  | Sixth step | 4.85 |

TABLE 12B-continued

|  | Cycle [μm] |  | Cycle [μm] |
|---|---|---|---|
| Seventh ring zone | 27.78 | First step | 4.78 |
|  |  | Second step | 4.72 |
|  |  | Third step | 4.66 |
|  |  | Fourth step | 4.60 |
|  |  | Fifth step | 4.54 |
|  |  | Sixth step | 4.48 |
| Eighth ring zone | 25.83 | First step | 4.43 |
|  |  | Second step | 4.38 |
|  |  | Third step | 4.33 |
|  |  | Fourth step | 4.28 |
|  |  | Fifth step | 4.23 |
|  |  | Sixth step | 4.19 |
| Ninth ring zone | 24.23 | First step | 4.14 |
|  |  | Second step | 4.10 |
|  |  | Third step | 4.06 |
|  |  | Fourth step | 4.02 |
|  |  | Fifth step | 3.98 |
|  |  | Sixth step | 3.94 |
| Tenth ring zone | 22.90 | First step | 3.90 |
|  |  | Second step | 3.87 |
|  |  | Third step | 3.83 |
|  |  | Fourth step | 3.80 |
|  |  | Fifth step | 3.76 |
|  |  | Sixth step | 3.73 |

TABLE 12C

|  | Cycle [μm] |  | Cycle [μm] |
|---|---|---|---|
| Eleventh ring zone | 21.76 | First step | 3.70 |
|  |  | Second step | 3.67 |
|  |  | Third step | 3.64 |
|  |  | Fourth step | 3.61 |
|  |  | Fifth step | 3.58 |
|  |  | Sixth step | 3.55 |
| Twelfth ring zone | 20.77 | First step | 3.53 |
|  |  | Second step | 3.50 |
|  |  | Third step | 3.47 |
|  |  | Fourth step | 3.45 |
|  |  | Fifth step | 3.42 |
|  |  | Sixth step | 3.40 |
| Thirteenth ring zone | 19.91 | First step | 3.38 |
|  |  | Second step | 3.35 |
|  |  | Third step | 3.33 |
|  |  | Fourth step | 3.31 |
|  |  | Fifth step | 3.28 |
|  |  | Sixth step | 3.26 |
| Fourteenth ring zone | 19.15 | First step | 3.24 |
|  |  | Second step | 3.22 |
|  |  | Third step | 3.20 |
|  |  | Fourth step | 3.18 |
|  |  | Fifth step | 3.16 |
|  |  | Sixth step | 3.14 |
| Fifteenth ring zone | 18.47 | First step | 3.12 |
|  |  | Second step | 3.10 |
|  |  | Third step | 3.09 |
|  |  | Fourth step | 3.07 |
|  |  | Fifth step | 3.05 |
|  |  | Sixth step | 3.03 |

TABLE 12D

|  | Cycle [μm] |  | Cycle [μm] |
|---|---|---|---|
| Sixteenth ring zone | 17.85 | First step | 3.02 |
|  |  | Second step | 3.00 |
|  |  | Third step | 2.98 |
|  |  | Fourth step | 2.97 |
|  |  | Fifth step | 2.95 |
|  |  | Sixth step | 2.94 |
| Seventeenth ring zone | 17.30 | First step | 2.92 |
|  |  | Second step | 2.90 |
|  |  | Third step | 2.89 |

TABLE 12D-continued

|  | Cycle [μm] |  | Cycle [μm] |
|---|---|---|---|
|  |  | Fourth step | 2.88 |
|  |  | Fifth step | 2.86 |
|  |  | Sixth step | 2.85 |
| Eighteenth ring zone | 16.79 | First step | 2.83 |
|  |  | Second step | 2.82 |
|  |  | Third step | 2.80 |
|  |  | Fourth step | 2.79 |
|  |  | Fifth step | 2.78 |
|  |  | Sixth step | 2.77 |
| Nineteenth ring zone | 16.33 | First step | 2.75 |
|  |  | Second step | 2.74 |
|  |  | Third step | 2.73 |
|  |  | Fourth step | 2.71 |
|  |  | Fifth step | 2.70 |
|  |  | Sixth step | 2.69 |
| Twentieth ring zone | 15.90 | First step | 2.68 |
|  |  | Second step | 2.67 |
|  |  | Third step | 2.66 |
|  |  | Fourth step | 2.64 |
|  |  | Fifth step | 2.63 |
|  |  | Sixth step | 2.62 |

TABLE 12E

|  | Cycle [μm] |  | Cycle [μm] |
|---|---|---|---|
| Twenty-first ring zone | 15.51 | First step | 2.61 |
|  |  | Second step | 2.60 |
|  |  | Third step | 2.59 |
|  |  | Fourth step | 2.58 |
|  |  | Fifth step | 2.57 |
|  |  | Sixth step | 2.56 |
| Twenty-second ring zone | 15.15 | First step | 2.55 |
|  |  | Second step | 2.54 |
|  |  | Third step | 2.53 |
|  |  | Fourth step | 2.52 |
|  |  | Fifth step | 2.51 |
|  |  | Sixth step | 2.50 |
| Twenty-third ring zone | 14.81 | First step | 2.49 |
|  |  | Second step | 2.48 |
|  |  | Third step | 2.47 |
|  |  | Fourth step | 2.46 |
|  |  | Fifth step | 2.45 |
|  |  | Sixth step | 2.45 |
| Twenty-fourth ring zone | 14.49 | First step | 2.44 |
|  |  | Second step | 2.43 |
|  |  | Third step | 2.42 |
|  |  | Fourth step | 2.41 |
|  |  | Fifth step | 2.40 |
|  |  | Sixth step | 2.39 |
| Twenty-fifth ring zone | 14.20 | First step | 2.39 |
|  |  | Second step | 2.38 |
|  |  | Third step | 2.37 |
|  |  | Fourth step | 2.36 |
|  |  | Fifth step | 2.35 |
|  |  | Sixth step | 2.35 |

TABLE 12F

|  | Cycle [μm] |  | Cycle [μm] |
|---|---|---|---|
| Twenty-sixth ring zone | 13.92 | First step | 2.34 |
|  |  | Second step | 2.33 |
|  |  | Third step | 2.32 |
|  |  | Fourth step | 2.32 |
|  |  | Fifth step | 2.31 |
|  |  | Sixth step | 2.30 |
| Twenty-seventh ring zone | 13.67 | First step | 2.30 |
|  |  | Second step | 2.29 |
|  |  | Third step | 2.28 |
|  |  | Fourth step | 2.27 |
|  |  | Fifth step | 2.27 |
|  |  | Sixth step | 2.26 |

TABLE 12F-continued

| | Cycle [μm] | | Cycle [μm] |
|---|---|---|---|
| Twenty-eighth ring zone | 13.42 | First step | 2.25 |
| | | Second step | 2.25 |
| | | Third step | 2.24 |
| | | Fourth step | 2.23 |
| | | Fifth step | 2.23 |

On the first region of Example 2, one ring zone cycle is composed of consecutive 6-level stair-like steps whose height monotonically decreases step by step as distance from the optical axis of the objective lens element increases. Each ring zone cycle in Tables 12A-12F indicate the width of a ring zone in a radial direction (in a direction perpendicular to the optical axis) as indicated by an arrow in FIG. 9. On the first region, a first ring zone, a second ring zone, a third ring zone, . . . , and a twenty-eighth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 9. In each ring zone, the steps are referred to as a first step, a second step, a third step, . . . , and a sixth step in order from the optical axis side toward the outer periphery side.

Table 13 shows ring zone cycles of the stair-like step structure provided on the second region of the first surface, and cycles of steps arranged in each ring zone.

TABLE 13

| | Cycle [μm] | | Cycle [μm] |
|---|---|---|---|
| First ring zone | 19.67 | First step | 2.25 |
| | | Second step | 2.26 |
| | | Third step | 2.28 |
| | | Fourth step | 2.30 |
| | | Fifth step | 2.31 |
| | | Sixth step | 2.33 |
| | | Seventh step | 2.35 |
| | | Eighth step | 2.37 |
| Second ring zone | 19.91 | First step | 2.40 |
| | | Second step | 2.42 |
| | | Third step | 2.44 |
| | | Fourth step | 2.47 |
| | | Fifth step | 2.50 |
| | | Sixth step | 2.53 |
| | | Seventh step | 2.56 |
| | | Eighth step | 2.59 |
| Third ring zone | 22.25 | First step | 2.63 |
| | | Second step | 2.67 |
| | | Third step | 2.71 |
| | | Fourth step | 2.75 |
| | | Fifth step | 2.80 |
| | | Sixth step | 2.85 |
| | | Seventh step | 2.90 |
| | | Eighth step | 2.96 |

On the second region of Example 2, one ring zone cycle is composed of consecutive 8-level stair-like steps whose height monotonically decreases step by step as distance from the optical axis of the objective lens element increases. Each ring zone cycle in Table 13 indicates the width of a ring zone in the radial direction (in the direction perpendicular to the optical axis) as indicated by an arrow in FIG. 9. On the second region, a first ring zone, a second ring zone, and a third ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 9. In each ring zone, the steps are referred to as a first step, a second step, a third step, . . . , and an eighth step in order from the optical axis side toward the outer periphery side.

Tables 14A-14F show step heights of the stair-like diffraction structure provided on the first region of Example 2. In one cycle of the stair-like diffraction structure, the height of each of the first to fifth steps is set such that a phase difference of 1.33 wavelengths is provided to light of the designed wavelength for BD, and the height of the sixth step is set such that a phase difference of 6.65 wavelengths is provided in the opposite direction.

TABLE 14A

| | | Depth [μm] |
|---|---|---|
| First ring zone | First step | 1.02853 |
| | Second step | 1.02972 |
| | Third step | 1.03090 |
| | Fourth step | 1.03210 |
| | Fifth step | 1.03331 |
| | Sixth step | 5.17257 |
| Second ring zone | First step | 1.03574 |
| | Second step | 1.03695 |
| | Third step | 1.03818 |
| | Fourth step | 1.03942 |
| | Fifth step | 1.04066 |
| | Sixth step | 5.20950 |
| Third ring zone | First step | 1.04315 |
| | Second step | 1.04442 |
| | Third step | 1.04569 |
| | Fourth step | 1.04695 |
| | Fifth step | 1.04823 |
| | Sixth step | 5.24755 |
| Fourth ring zone | First step | 1.05079 |
| | Second step | 1.05210 |
| | Third step | 1.05339 |
| | Fourth step | 1.05470 |
| | Fifth step | 1.05602 |
| | Sixth step | 5.28668 |
| Fifth ring zone | First step | 1.05866 |
| | Second step | 1.05999 |
| | Third step | 1.06133 |
| | Fourth step | 1.06268 |
| | Fifth step | 1.06403 |
| | Sixth step | 5.32693 |

TABLE 14B

| | | Depth [μm] |
|---|---|---|
| Sixth ring zone | First step | 1.06675 |
| | Second step | 1.06812 |
| | Third step | 1.06949 |
| | Fourth step | 1.07088 |
| | Fifth step | 1.07227 |
| | Sixth step | 5.36832 |
| Seventh ring zone | First step | 1.07506 |
| | Second step | 1.07648 |
| | Third step | 1.07789 |
| | Fourth step | 1.07932 |
| | Fifth step | 1.08074 |
| | Sixth step | 5.41085 |
| Eighth ring zone | First step | 1.08362 |
| | Second step | 1.08506 |
| | Third step | 1.08651 |
| | Fourth step | 1.08798 |
| | Fifth step | 1.08945 |
| | Sixth step | 5.45464 |
| Ninth ring zone | First step | 1.09241 |
| | Second step | 1.09389 |
| | Third step | 1.09538 |
| | Fourth step | 1.09689 |
| | Fifth step | 1.09839 |
| | Sixth step | 5.49956 |

TABLE 14B-continued

| | | Depth [μm] |
|---|---|---|
| Tenth ring zone | First step | 1.10143 |
| | Second step | 1.10296 |
| | Third step | 1.10451 |
| | Fourth step | 1.10604 |
| | Fifth step | 1.10760 |
| | Sixth step | 5.54581 |

TABLE 14C

| | | Depth [μm] |
|---|---|---|
| Eleventh ring zone | First step | 1.11074 |
| | Second step | 1.11231 |
| | Third step | 1.11389 |
| | Fourth step | 1.11548 |
| | Fifth step | 1.11708 |
| | Sixth step | 5.59347 |
| Twelfth ring zone | First step | 1.12031 |
| | Second step | 1.12193 |
| | Third step | 1.12357 |
| | Fourth step | 1.12521 |
| | Fifth step | 1.12686 |
| | Sixth step | 5.64266 |
| Thirteenth ring zone | First step | 1.13020 |
| | Second step | 1.13188 |
| | Third step | 1.13357 |
| | Fourth step | 1.13528 |
| | Fifth step | 1.13698 |
| | Sixth step | 5.69351 |
| Fourteenth ring zone | First step | 1.14043 |
| | Second step | 1.14218 |
| | Third step | 1.14393 |
| | Fourth step | 1.14569 |
| | Fifth step | 1.14746 |
| | Sixth step | 5.74623 |
| Fifteenth ring zone | First step | 1.15105 |
| | Second step | 1.15286 |
| | Third step | 1.15467 |
| | Fourth step | 1.15651 |
| | Fifth step | 1.15835 |
| | Sixth step | 5.80108 |

TABLE 14D

| | | Depth [μm] |
|---|---|---|
| Sixteenth ring zone | First step | 1.16208 |
| | Second step | 1.16396 |
| | Third step | 1.16586 |
| | Fourth step | 1.16777 |
| | Fifth step | 1.16969 |
| | Sixth step | 5.85814 |
| Seventeenth ring zone | First step | 1.17359 |
| | Second step | 1.17555 |
| | Third step | 1.17752 |
| | Fourth step | 1.17952 |
| | Fifth step | 1.18153 |
| | Sixth step | 5.91772 |
| Eighteenth ring zone | First step | 1.18558 |
| | Second step | 1.18764 |
| | Third step | 1.18972 |
| | Fourth step | 1.19180 |
| | Fifth step | 1.19390 |
| | Sixth step | 5.98010 |
| Nineteenth ring zone | First step | 1.19815 |
| | Second step | 1.20030 |
| | Third step | 1.20247 |
| | Fourth step | 1.20466 |
| | Fifth step | 1.20686 |
| | Sixth step | 6.04542 |

TABLE 14D-continued

| | | Depth [μm] |
|---|---|---|
| Twentieth ring zone | First step | 1.21131 |
| | Second step | 1.21358 |
| | Third step | 1.21584 |
| | Fourth step | 1.21814 |
| | Fifth step | 1.22045 |
| | Sixth step | 6.11394 |

TABLE 14E

| | | Depth [μm] |
|---|---|---|
| Twenty-first ring zone | First step | 1.22513 |
| | Second step | 1.22751 |
| | Third step | 1.22991 |
| | Fourth step | 1.23232 |
| | Fifth step | 1.23474 |
| | Sixth step | 6.18599 |
| Twenty-second ring zone | First step | 1.23968 |
| | Second step | 1.24218 |
| | Third step | 1.24470 |
| | Fourth step | 1.24725 |
| | Fifth step | 1.24982 |
| | Sixth step | 6.26203 |
| Twenty-third ring zone | First step | 1.25502 |
| | Second step | 1.25767 |
| | Third step | 1.26034 |
| | Fourth step | 1.26303 |
| | Fifth step | 1.26575 |
| | Sixth step | 6.34248 |
| Twenty-fourth ring zone | First step | 1.27128 |
| | Second step | 1.27408 |
| | Third step | 1.27692 |
| | Fourth step | 1.27980 |
| | Fifth step | 1.28269 |
| | Sixth step | 6.42813 |
| Twenty-fifth ring zone | First step | 1.28860 |
| | Second step | 1.29161 |
| | Third step | 1.29465 |
| | Fourth step | 1.29773 |
| | Fifth step | 1.30085 |
| | Sixth step | 6.52004 |

TABLE 14F

| | | Depth [μm] |
|---|---|---|
| Twenty-sixth ring zone | First step | 1.30721 |
| | Second step | 1.31046 |
| | Third step | 1.31375 |
| | Fourth step | 1.31708 |
| | Fifth step | 1.32048 |
| | Sixth step | 6.61961 |
| Twenty-seventh ring zone | First step | 1.32741 |
| | Second step | 1.33097 |
| | Third step | 1.33459 |
| | Fourth step | 1.33825 |
| | Fifth step | 1.34200 |
| | Sixth step | 6.72898 |
| Twenty-eighth ring zone | First step | 1.34968 |
| | Second step | 1.35362 |
| | Third step | 1.35765 |
| | Fourth step | 1.36175 |
| | Fifth step | 1.36594 |

Table 15 shows step heights of the stair-like diffraction structure provided on the second region of Example 2. In one cycle of the stair-like diffraction structure, the height of each of the first to seventh steps is set such that a phase difference of 1.25 wavelengths is provided to the light of the designed wavelength for BD, and the height of the eighth step is set such that a phase difference of 8.75 wavelengths is provided in the opposite direction.

TABLE 15

|  |  | Depth [μm] |
| --- | --- | --- |
| First ring zone | First step | 1.31640 |
|  | Second step | 1.32066 |
|  | Third step | 1.32509 |
|  | Fourth step | 1.32966 |
|  | Fifth step | 1.33443 |
|  | Sixth step | 1.33936 |
|  | Seventh step | 1.34451 |
|  | Eighth step | 9.44913 |
| Second ring zone | First step | 1.35549 |
|  | Second step | 1.36134 |
|  | Third step | 1.36748 |
|  | Fourth step | 1.37393 |
|  | Fifth step | 1.38069 |
|  | Sixth step | 1.38783 |
|  | Seventh step | 1.39535 |
|  | Eighth step | 9.82310 |
| Third ring zone | First step | 1.41174 |
|  | Second step | 1.42069 |
|  | Third step | 1.43023 |
|  | Fourth step | 1.44041 |
|  | Fifth step | 1.45131 |
|  | Sixth step | 1.46303 |
|  | Seventh step | 1.47563 |
|  | Eighth step | 10.42484 |

It should be noted that although not shown, the 4-level stair-like diffraction structure whose height monotonically decreases step by step as distance from the optical axis of the objective lens element increases is provided on the third region of Example 2. Further, the sawtooth-like diffraction structure is provided on the outer region of Example 2.

Table 16 shows diffraction efficiencies at the twenty-eighth ring zone of the first region and at the third ring zone of the second region. The third ring zone of the second region is an outermost region which contributes to formation of a spot of light for CD in the present example.

TABLE 16

|  |  |  | Diffraction efficiency (%) |
| --- | --- | --- | --- |
| BD | Inner region | First ring zone | 67 |
|  |  | Twenty-ninth ring zone | 44 |
|  | Middle region | Third ring zone | 60 |
| DVD | Inner region | First ring zone | 71 |
|  |  | Twenty-ninth ring zone | 56 |
|  | Middle region | Third ring zone | 34 |
| CD | Inner region | First ring zone | 65 |
|  |  | Twenty-ninth ring zone | 30 |
|  | Middle region | Third ring zone | 19 |

The ring zone cycle of the twenty-eighth ring zone of the first region is about 13 μm, and the diffraction efficiency of the light for BD is about 44%. Meanwhile, the ring zone cycle of the first ring zone of the first region is about 142 μm, and the diffraction efficiency of the light for BD is about 67%. Thus, the diffraction efficiency of the light for BD at the twenty-eighth ring zone of the first region is much lower than the diffraction efficiency at the first ring zone. When the present invention is not applied, an amount of light in reproducing/recording on BD is insufficient with this diffraction efficiency.

In contrast, the ring zone cycle of the third ring zone of the second region is about 22 μm. The diffraction efficiency of the light for BD at the third ring zone of the second region is about 60% and is greatly improved as compared to the diffraction efficiency at the twenty-eighth ring zone of the first region. Thus, insufficiency of the light amount in reproducing/recording on BD is suppressed.

Example 3

The first surface of an objective lens element according to Example 3 is divided into a first region including a symmetry axis, a second region surrounding the first region, a third region surrounding the second region, and an outer region surrounding the third region. A 7-level stair-like diffraction structure whose height monotonically decreases step by step as distance from the optical axis of the objective lens element increases is provided on the first region of the first surface. A 9-level stair-like diffraction structure whose height monotonically decreases step by step as distance from the optical axis of the objective lens element increases is provided on the second region. A 4-level stair-like diffraction structure whose height monotonically decreases step by step as distance from the optical axis of the objective lens element increases is provided on the third region. A sawtooth-like diffraction structure is provided on the outer region. The second surface is an aspheric surface. The objective lens element according to Example 3 is a BD/DVD/CD compatible lens. With regard to designed values for BD, the wavelength is 408 nm; the focal length is 1.30 mm; and the protective layer thickness of an information storage medium is 0.087 mm. With regard to designed values for DVD, the wavelength is 660 nm; the focal length is 1.57 mm; and the protective layer thickness of an information storage medium is 0.6 mm. With regard to designed values for CD, the wavelength is 785 nm; the focal length is 1.75 mm; and the protective layer thickness of an information storage medium is 1.2 mm.

Tables 17 and 18 show construction data of the objective lens element according to Example 3.

TABLE 17

|  | BD | DVD | CD |
| --- | --- | --- | --- |
| Wavelength | 0.408 | 0.660 | 0.785 |
| Effective diameter | 1.66 | 1.66 | 1.66 |
| Working distance (WD) | 0.49 | 0.46 | 0.30 |
| Disc thickness (DT) | 0.087 | 0.60 | 1.20 |
| Focal length | 1.30 | 1.57 | 1.75 |
| First surface, First region Diffraction order | 1 | −2 | −3 |
| First surface, Second region Diffraction order | 1 | −3 | −4 |
| First surface, Third region Diffraction order | 1 | −1 | — |
| First surface, _Outer region Diffraction order | 3 | — | — |
| Object point (OP) | ∞ | ∞ | ∞ |

| Surface No. | Radius of curvature at the top | Thickness | Material | Remarks |
| --- | --- | --- | --- | --- |
| 0 |  | OP |  |  |
| 1 | 0.80042572 | 1.284183 | n1 | First region (Diffractive surface), Second region (Diffractive surface), Third region (Diffractive surface), Outer region (Diffractive surface) |
| 2 | −2.757568 | WD |  | Aspheric surface |
| 3 | ∞ | DT | disc | Planar |
| 4 | ∞ |  |  | Planar |
| Wavelength | 0.408 | 0.660 | 0.785 |  |
| n1 | 1.52505 | 1.50711 | 1.50374 |  |
| disc | 1.61805 | 1.57812 | 1.57160 |  |

TABLE 18

| First surface | First region Diffractive surface |
|---|---|
| Region | 0 mm-0.71 mm |

| Aspherical constant | |
|---|---|
| RD | 0.80042572 |
| k | −0.97591321 |
| A0 | 0 |
| A2 | 0 |
| A4 | 0.20000627 |
| A6 | −1.0643006 |
| A8 | 8.1610405 |
| A10 | −35.521826 |
| A12 | 88.358799 |
| A14 | −115.97361 |
| A16 | 62.150855 |

| Phase function | |
|---|---|
| P2 | −224.64389 |
| P4 | −50.652842 |
| P6 | −2.6251858 |

| First surface | Second region Diffractive surface |
|---|---|
| Region | 0.71 mm-0.83 mm |

| Aspherical constant | |
|---|---|
| RD | 0.84517215 |
| k | −0.68523888 |
| A0 | −8.41E−03 |
| A2 | 0 |
| A4 | 0.28575967 |
| A6 | −0.42240361 |
| A8 | 1.5410588 |
| A10 | −4.7704736 |
| A12 | 6.8216812 |
| A14 | −4.5550413 |
| A16 | 1.3664987 |

| Phase function | |
|---|---|
| P2 | −226.34345 |
| P4 | −171.83969 |
| P6 | 245.90644 |

| Second surface | Aspherical constant |
|---|---|
| RD | −2.757568 |
| k | 4.138653 |
| A0 | 0 |
| A2 | 0 |
| A4 | 0.68975206 |
| A6 | −8.8967286 |
| A8 | 82.669118 |
| A10 | −419.18394 |
| A12 | 1083.2938 |
| A14 | −1248.8704 |
| A16 | 480.15496 |

Tables 19A-19E show ring zone cycles of the stair-like step structure provided on the first region of the first surface, and cycles of steps arranged in each ring zone.

TABLE 19A

| | Cycle [μm] | | Cycle [μm] |
|---|---|---|---|
| First ring zone | 166.13 | First step | 63.18 |
| | | Second step | 26.13 |
| | | Third step | 20.02 |
| | | Fourth step | 16.86 |
| | | Fifth step | 14.83 |
| | | Sixth step | 13.39 |
| | | Seventh step | 12.30 |
| Second ring zone | 68.33 | First step | 11.43 |
| | | Second step | 10.72 |
| | | Third step | 10.13 |
| | | Fourth step | 9.62 |
| | | Fifth step | 9.18 |
| | | Sixth step | 8.79 |
| | | Seventh step | 8.45 |
| Third ring zone | 51.95 | First step | 8.14 |
| | | Second step | 7.87 |
| | | Third step | 7.61 |
| | | Fourth step | 7.38 |
| | | Fifth step | 7.17 |
| | | Sixth step | 6.98 |
| | | Seventh step | 6.80 |
| Fourth ring zone | 43.41 | First step | 6.63 |
| | | Second step | 6.47 |
| | | Third step | 6.32 |
| | | Fourth step | 6.19 |
| | | Fifth step | 6.06 |
| | | Sixth step | 5.93 |
| | | Seventh step | 5.82 |

TABLE 19B

| | Cycle [μm] | | Cycle [μm] |
|---|---|---|---|
| Fifth ring zone | 37.91 | First step | 5.71 |
| | | Second step | 5.60 |
| | | Third step | 5.50 |
| | | Fourth step | 5.41 |
| | | Fifth step | 5.32 |
| | | Sixth step | 5.23 |
| | | Seventh step | 5.15 |
| Sixth ring zone | 33.99 | First step | 5.07 |
| | | Second step | 4.99 |
| | | Third step | 4.92 |
| | | Fourth step | 4.85 |
| | | Fifth step | 4.78 |
| | | Sixth step | 4.72 |
| | | Seventh step | 4.65 |
| Seventh ring zone | 30.99 | First step | 4.59 |
| | | Second step | 4.54 |
| | | Third step | 4.48 |
| | | Fourth step | 4.42 |
| | | Fifth step | 4.37 |
| | | Sixth step | 4.32 |
| | | Seventh step | 4.27 |
| Eighth ring zone | 28.61 | First step | 4.22 |
| | | Second step | 4.18 |
| | | Third step | 4.13 |
| | | Fourth step | 4.09 |
| | | Fifth step | 4.04 |
| | | Sixth step | 4.00 |
| | | Seventh step | 3.96 |

TABLE 19C

| | Cycle [μm] | | Cycle [μm] |
|---|---|---|---|
| Ninth ring zone | 26.66 | First step | 3.92 |
| | | Second step | 3.88 |
| | | Third step | 3.84 |
| | | Fourth step | 3.81 |
| | | Fifth step | 3.77 |
| | | Sixth step | 3.74 |
| | | Seventh step | 3.70 |

TABLE 19C-continued

|  | Cycle [μm] |  | Cycle [μm] |
|---|---|---|---|
| Tenth ring zone | 25.02 | First step | 3.67 |
|  |  | Second step | 3.64 |
|  |  | Third step | 3.60 |
|  |  | Fourth step | 3.57 |
|  |  | Fifth step | 3.54 |
|  |  | Sixth step | 3.51 |
|  |  | Seventh step | 3.48 |
| Eleventh ring zone | 23.61 | First step | 3.45 |
|  |  | Second step | 3.43 |
|  |  | Third step | 3.40 |
|  |  | Fourth step | 3.37 |
|  |  | Fifth step | 3.35 |
|  |  | Sixth step | 3.32 |
|  |  | Seventh step | 3.29 |
| Twelfth ring zone | 22.39 | First step | 3.27 |
|  |  | Second step | 3.25 |
|  |  | Third step | 3.22 |
|  |  | Fourth step | 3.20 |
|  |  | Fifth step | 3.17 |
|  |  | Sixth step | 3.15 |
|  |  | Seventh step | 3.13 |

TABLE 19D

|  | Cycle [μm] |  | Cycle [μm] |
|---|---|---|---|
| Thirteenth ring zone | 21.32 | First step | 3.11 |
|  |  | Second step | 3.09 |
|  |  | Third step | 3.07 |
|  |  | Fourth step | 3.04 |
|  |  | Fifth step | 3.02 |
|  |  | Sixth step | 3.00 |
|  |  | Seventh step | 2.98 |
| Fourteenth ring zone | 20.36 | First step | 2.96 |
|  |  | Second step | 2.95 |
|  |  | Third step | 2.93 |
|  |  | Fourth step | 2.91 |
|  |  | Fifth step | 2.89 |
|  |  | Sixth step | 2.87 |
|  |  | Seventh step | 2.85 |
| Fifteenth ring zone | 19.51 | First step | 2.84 |
|  |  | Second step | 2.82 |
|  |  | Third step | 2.80 |
|  |  | Fourth step | 2.79 |
|  |  | Fifth step | 2.77 |
|  |  | Sixth step | 2.75 |
|  |  | Seventh step | 2.74 |
| Sixteenth ring zone | 18.73 | First step | 2.72 |
|  |  | Second step | 2.71 |
|  |  | Third step | 2.69 |
|  |  | Fourth step | 2.68 |
|  |  | Fifth step | 2.66 |
|  |  | Sixth step | 2.65 |
|  |  | Seventh step | 2.63 |

TABLE 19E

|  | Cycle [μm] |  | Cycle [μm] |
|---|---|---|---|
| Seventeenth ring zone | 18.03 | First step | 2.62 |
|  |  | Second step | 2.60 |
|  |  | Third step | 2.59 |
|  |  | Fourth step | 2.58 |
|  |  | Fifth step | 2.56 |
|  |  | Sixth step | 2.55 |
|  |  | Seventh step | 2.54 |
| Eighteenth ring zone | 17.39 | First step | 2.52 |
|  |  | Second step | 2.51 |
|  |  | Third step | 2.50 |
|  |  | Fourth step | 2.48 |
|  |  | Fifth step | 2.47 |
|  |  | Sixth step | 2.46 |
|  |  | Seventh step | 2.45 |

TABLE 19E-continued

|  | Cycle [μm] |  | Cycle [μm] |
|---|---|---|---|
| Nineteenth ring zone | 16.80 | First step | 2.43 |
|  |  | Second step | 2.42 |
|  |  | Third step | 2.41 |
|  |  | Fourth step | 2.40 |
|  |  | Fifth step | 2.39 |
|  |  | Sixth step | 2.38 |
|  |  | Seventh step | 2.37 |
| Twentieth ring zone | 16.25 | First step | 2.35 |
|  |  | Second step | 2.34 |
|  |  | Third step | 2.33 |
|  |  | Fourth step | 2.32 |
|  |  | Fifth step | 2.31 |
|  |  | Sixth step | 2.30 |
|  |  | Seventh step | 2.29 |

On the first region of Example 3, one ring zone cycle is composed of consecutive 7-level stair-like steps whose height monotonically decreases step by step as distance from the optical axis of the objective lens element increases. Each ring zone cycle in Tables 19A-19E indicate the width of a ring zone in a radial direction (in a direction perpendicular to the optical axis) as indicated by an arrow in FIG. 10. On the second region, a first ring zone, a second ring zone, a third ring zone, . . . , and a twentieth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 10. In each ring zone, the steps are referred to as a first step, a second step, a third step, . . . , and a seventh step in order from the optical axis side toward the outer periphery side.

Tables 20A and 20B show ring zone cycles of the stair-like step structure provided on the second region of the first surface, and cycles of steps arranged in each ring zone.

TABLE 20A

|  | Cycle [μm] |  | Cycle [μm] |
|---|---|---|---|
| First ring zone | 21.12 | First step | 2.32 |
|  |  | Second step | 2.32 |
|  |  | Third step | 2.33 |
|  |  | Fourth step | 2.34 |
|  |  | Fifth step | 2.35 |
|  |  | Sixth step | 2.35 |
|  |  | Seventh step | 2.36 |
|  |  | Eighth step | 2.37 |
|  |  | Ninth step | 2.38 |
| Second ring zone | 21.98 | First step | 2.39 |
|  |  | Second step | 2.40 |
|  |  | Third step | 2.41 |
|  |  | Fourth step | 2.43 |
|  |  | Fifth step | 2.44 |
|  |  | Sixth step | 2.45 |
|  |  | Seventh step | 2.47 |
|  |  | Eighth step | 2.48 |
|  |  | Ninth step | 2.50 |
| Third ring zone | 23.35 | First step | 2.51 |
|  |  | Second step | 2.53 |
|  |  | Third step | 2.55 |
|  |  | Fourth step | 2.57 |
|  |  | Fifth step | 2.59 |
|  |  | Sixth step | 2.61 |
|  |  | Seventh step | 2.63 |
|  |  | Eighth step | 2.66 |
|  |  | Ninth step | 2.68 |

TABLE 20B

| | Cycle [μm] | | Cycle [μm] |
|---|---|---|---|
| Fourth ring zone | 25.62 | First step | 2.71 |
| | | Second step | 2.74 |
| | | Third step | 2.77 |
| | | Fourth step | 2.80 |
| | | Fifth step | 2.84 |
| | | Sixth step | 2.88 |
| | | Seventh step | 2.92 |
| | | Eighth step | 2.96 |
| | | Ninth step | 3.00 |
| Fifth ring zone | 29.92 | First step | 3.05 |
| | | Second step | 3.11 |
| | | Third step | 3.17 |
| | | Fourth step | 3.23 |
| | | Fifth step | 3.30 |
| | | Sixth step | 3.38 |
| | | Seventh step | 3.46 |
| | | Eighth step | 3.56 |
| | | Ninth step | 3.66 |

On the second region of Example 3, one ring zone cycle is composed of consecutive 9-level stair-like steps whose height monotonically decreases step by step as distance from the optical axis of the objective lens element increases. Each ring zone cycle in Tables 20A and 20B indicate the width of a ring zone in the radial direction (in the direction perpendicular to the optical axis) as indicated by an arrow in FIG. 10. On the second region, a first ring zone, a second ring zone, a third ring zone, . . . , and a fifth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 10. In each ring zone, the steps are referred to as a first step, a second step, a third step, . . . , and a ninth step in order from the optical axis side toward the outer periphery side.

Tables 21A-21E show step heights of the stair-like diffraction structure provided on the first region of Example 3. In one cycle of the stair-like diffraction structure, the height of each of the first to sixth steps is set such that a phase difference of 1.14 wavelengths is provided to light of the designed wavelength for BD, and the height of the seventh step is set such that a phase difference of 6.84 wavelengths is provided in the opposite direction.

TABLE 21A

| | | Depth [μm] |
|---|---|---|
| First ring zone | First step | 0.88924 |
| | Second step | 0.89029 |
| | Third step | 0.89135 |
| | Fourth step | 0.89241 |
| | Fifth step | 0.89347 |
| | Sixth step | 0.89453 |
| | Seventh step | 5.37365 |
| Second ring zone | First step | 0.89668 |
| | Second step | 0.89776 |
| | Third step | 0.89884 |
| | Fourth step | 0.89993 |
| | Fifth step | 0.90100 |
| | Sixth step | 0.90210 |
| | Seventh step | 5.41912 |
| Third ring zone | First step | 0.90428 |
| | Second step | 0.90538 |
| | Third step | 0.90648 |
| | Fourth step | 0.90758 |
| | Fifth step | 0.90869 |
| | Sixth step | 0.90978 |
| | Seventh step | 5.46535 |
| Fourth ring zone | First step | 0.91201 |
| | Second step | 0.91312 |
| | Third step | 0.91424 |
| | Fourth step | 0.91536 |
| | Fifth step | 0.91648 |
| | Sixth step | 0.91761 |
| | Seventh step | 5.51246 |

TABLE 21B

| | | Depth [μm] |
|---|---|---|
| Fifth ring zone | First step | 0.91987 |
| | Second step | 0.92101 |
| | Third step | 0.92215 |
| | Fourth step | 0.92329 |
| | Fifth step | 0.92444 |
| | Sixth step | 0.92558 |
| | Seventh step | 5.56040 |
| Sixth ring zone | First step | 0.92789 |
| | Second step | 0.92904 |
| | Third step | 0.93020 |
| | Fourth step | 0.93136 |
| | Fifth step | 0.93253 |
| | Sixth step | 0.93369 |
| | Seventh step | 5.60916 |
| Seventh ring zone | First step | 0.93603 |
| | Second step | 0.93720 |
| | Third step | 0.93838 |
| | Fourth step | 0.93956 |
| | Fifth step | 0.94075 |
| | Sixth step | 0.94192 |
| | Seventh step | 5.65867 |
| Eighth ring zone | First step | 0.94430 |
| | Second step | 0.94550 |
| | Third step | 0.94669 |
| | Fourth step | 0.94789 |
| | Fifth step | 0.94909 |
| | Sixth step | 0.95029 |
| | Seventh step | 5.70894 |

TABLE 21C

| | | Depth [μm] |
|---|---|---|
| Ninth ring zone | First step | 0.95270 |
| | Second step | 0.95391 |
| | Third step | 0.95513 |
| | Fourth step | 0.95634 |
| | Fifth step | 0.95755 |
| | Sixth step | 0.95877 |
| | Seventh step | 5.75997 |
| Tenth ring zone | First step | 0.96123 |
| | Second step | 0.96245 |
| | Third step | 0.96369 |
| | Fourth step | 0.96492 |
| | Fifth step | 0.96616 |
| | Sixth step | 0.96740 |
| | Seventh step | 5.81188 |
| Eleventh ring zone | First step | 0.96989 |
| | Second step | 0.97114 |
| | Third step | 0.97240 |
| | Fourth step | 0.97365 |
| | Fifth step | 0.97491 |
| | Sixth step | 0.97618 |
| | Seventh step | 5.86462 |

TABLE 21C-continued

|  |  | Depth [μm] |
|---|---|---|
| Twelfth ring zone | First step | 0.97872 |
|  | Second step | 0.97999 |
|  | Third step | 0.98127 |
|  | Fourth step | 0.98255 |
|  | Fifth step | 0.98383 |
|  | Sixth step | 0.98511 |
|  | Seventh step | 5.91839 |

TABLE 21D

|  |  | Depth [μm] |
|---|---|---|
| Thirteenth ring zone | First step | 0.98769 |
|  | Second step | 0.98899 |
|  | Third step | 0.99028 |
|  | Fourth step | 0.99159 |
|  | Fifth step | 0.99289 |
|  | Sixth step | 0.99419 |
|  | Seventh step | 5.97304 |
| Fourteenth ring zone | First step | 0.99681 |
|  | Second step | 0.99812 |
|  | Third step | 0.99944 |
|  | Fourth step | 1.00075 |
|  | Fifth step | 1.00208 |
|  | Sixth step | 1.00339 |
|  | Seventh step | 6.02832 |
| Fifteenth ring zone | First step | 1.00603 |
|  | Second step | 1.00736 |
|  | Third step | 1.00869 |
|  | Fourth step | 1.01001 |
|  | Fifth step | 1.01134 |
|  | Sixth step | 1.01268 |
|  | Seventh step | 6.08401 |
| Sixteenth ring zone | First step | 1.01533 |
|  | Second step | 1.01666 |
|  | Third step | 1.01799 |
|  | Fourth step | 1.01933 |
|  | Fifth step | 1.02066 |
|  | Sixth step | 1.02200 |
|  | Seventh step | 6.14004 |

TABLE 21E

|  |  | Depth [μm] |
|---|---|---|
| Seventeenth ring zone | First step | 1.02468 |
|  | Second step | 1.02603 |
|  | Third step | 1.02736 |
|  | Fourth step | 1.02871 |
|  | Fifth step | 1.03007 |
|  | Sixth step | 1.03143 |
|  | Seventh step | 6.19675 |
| Eighteenth ring zone | First step | 1.03416 |
|  | Second step | 1.03555 |
|  | Third step | 1.03693 |
|  | Fourth step | 1.03832 |
|  | Fifth step | 1.03974 |
|  | Sixth step | 1.04116 |
|  | Seventh step | 6.25559 |
| Nineteenth ring zone | First step | 1.04405 |
|  | Second step | 1.04552 |
|  | Third step | 1.04702 |
|  | Fourth step | 1.04854 |
|  | Fifth step | 1.05009 |
|  | Sixth step | 1.05165 |
|  | Seventh step | 6.31958 |
| Twentieth ring zone | First step | 1.05490 |
|  | Second step | 1.05659 |
|  | Third step | 1.05830 |
|  | Fourth step | 1.06008 |
|  | Fifth step | 1.06190 |
|  | Sixth step | 1.06379 |

Tables 22A and 22B show step heights of the stair-like diffraction structure provided on the second region of Example 3. In one cycle of the stair-like diffraction structure, the height of each of the first to eighth steps is set such that a phase difference of 1.11 wavelengths is provided to the light of the designed wavelength for BD, and the height of the ninth step is set such that a phase difference of 8.88 wavelengths is provided in the opposite direction.

TABLE 22A

|  |  | Depth [μm] |
|---|---|---|
| First ring zone | First step | 1.03439 |
|  | Second step | 1.03557 |
|  | Third step | 1.03676 |
|  | Fourth step | 1.03797 |
|  | Fifth step | 1.03919 |
|  | Sixth step | 1.04044 |
|  | Seventh step | 1.04170 |
|  | Eighth step | 1.04298 |
|  | Ninth step | 8.35422 |
| Second ring zone | First step | 1.04560 |
|  | Second step | 1.04695 |
|  | Third step | 1.04832 |
|  | Fourth step | 1.04972 |
|  | Fifth step | 1.05114 |
|  | Sixth step | 1.05259 |
|  | Seventh step | 1.05408 |
|  | Eighth step | 1.05560 |
|  | Ninth step | 8.45731 |
| Third ring zone | First step | 1.05875 |
|  | Second step | 1.06039 |
|  | Third step | 1.06208 |
|  | Fourth step | 1.06380 |
|  | Fifth step | 1.06559 |
|  | Sixth step | 1.06742 |
|  | Seventh step | 1.06932 |
|  | Eighth step | 1.07127 |
|  | Ninth step | 8.58643 |

TABLE 22B

|  |  | Depth [μm] |
|---|---|---|
| Fourth ring zone | First step | 1.07540 |
|  | Second step | 1.07758 |
|  | Third step | 1.07984 |
|  | Fourth step | 1.08219 |
|  | Fifth step | 1.08465 |
|  | Sixth step | 1.08722 |
|  | Seventh step | 1.08990 |
|  | Eighth step | 1.09272 |
|  | Ninth step | 8.76536 |
| Fifth ring zone | First step | 1.09878 |
|  | Second step | 1.10206 |
|  | Third step | 1.10554 |
|  | Fourth step | 1.10922 |
|  | Fifth step | 1.11314 |
|  | Sixth step | 1.11733 |
|  | Seventh step | 1.12181 |
|  | Eighth step | 1.12663 |
|  | Ninth step | 9.05467 |

It should be noted that although not shown, the 4-level stair-like diffraction structure whose height monotonically decreases step by step as distance from the optical axis of the objective lens element increases is provided on the third region of Example 3. The sawtooth-like diffraction structure is provided on the outer region of Example 3.

Table 23 shows diffraction efficiencies at the twentieth ring zone of the first region and at the fifth ring zone of the second region. The fifth ring zone of the second region is an outermost region which contributes to formation of a spot of light for CD in the present example.

TABLE 23

|  |  |  | Diffraction efficiency(%) |
|---|---|---|---|
| BD | Inner region | First ring zone | 89 |
|  |  | Twentieth ring zone | 43 |
|  | Middle region | Fifth ring zone | 58 |
| DVD | Inner region | First ring zone | 62 |
|  |  | Twentieth ring zone | 26 |
|  | Middle region | Fifth ring zone | 12 |
| CD | Inner region | First ring zone | 50 |
|  |  | Twentieth ring zone | 21 |
|  | Middle region | Fifth ring zone | 6 |

The ring zone cycle of the twentieth ring zone of the first region is about 16 μm, and the diffraction efficiency of the light for BD is about 43%. Meanwhile, the ring zone cycle of the first ring zone of the first region is about 166 μm, and the diffraction efficiency of the light for BD at the first ring zone is about 89%. Thus, the diffraction efficiency of the light for BD at the twentieth ring zone of the first region is much lower than the diffraction efficiency at the first ring zone. When the present invention is not applied, an amount of light in reproducing/recording on BD is insufficient with this diffraction efficiency. In contrast, the ring zone cycle of the fifth ring zone of the second region is about 13 μm. The diffraction efficiency of the light for BD at the fifth ring zone of the second region is about 58% and is greatly improved as compared to the diffraction efficiency at the twentieth ring zone of the first region. Thus, insufficiency of the light amount in reproducing/recording on BD is suppressed.

Example 4

The first surface of an objective lens element according to Example 4 is divided into a first region including a symmetry axis, a second region surrounding the first region, and an outer region surrounding the second region. A 6-level stair-like diffraction structure whose height monotonically decreases step by step as distance from the optical axis of the objective lens element increases is provided on the first region of the first surface. A 6-level stair-like diffraction structure whose height monotonically increases step by step as distance from the optical axis of the objective lens element increases is provided on the second region. A sawtooth-like diffraction structure is provided on the outer region. The second surface is provided with an aspheric surface. The objective lens element according to Example 4 is a BD/DVD compatible lens. With regard to designed values for BD, the wavelength is 408 nm; the focal length is 1.22 mm; and the protective layer thickness of an information storage medium is 0.1 mm. With regard to designed values for DVD, the wavelength is 660 nm; the focal length is 1.40 mm; and the protective layer thickness of an information storage medium is 0.6 mm.

Tables 24 and 25 show construction data of the objective lens element according to Example 4.

TABLE 24

|  | BD | DVD |
|---|---|---|
| Wavelength | 0.408 | 0.660 |
| Effective diameter | 1.68 | 1.68 |
| Working distance (WD) | 0.40 | 0.40 |
| Disc thickness (DT) | 0.10 | 0.60 |
| Focal length | 1.22 | 1.40 |
| First surface, First region Diffraction order | 2 | −1 |
| First surface, Second region Diffraction order | 1 | −3 |
| First surface, _Outer region Diffraction order | 3 | — |
| Object point (OP) | ∞ | ∞ |

| Surface No. | Radius of curvature at the top | Thickness | Material | Remarks |
|---|---|---|---|---|
| 0 |  | OP |  |  |
| 1 | 0.81915814 | 1.296403 | n1 | First region ( Diffractive surface), Second region ( Diffractive surface), Outer region ( Diffractive surface) |
| 2 | −2.029534 | WD |  | Aspheric surface |
| 3 | ∞ | DT | disc | Planar |
| 4 | ∞ |  |  | Planar |
| Wavelength | 0.408 | 0.660 |  |  |
| n1 | 1.52505 | 1.50711 |  |  |
| disc | 1.61642 | 1.57815 |  |  |

TABLE 25

| First surface | First region Diffractive surface | First surface | Second region Diffractive surface | Second surface | Aspherical constant |
|---|---|---|---|---|---|
| Region | 0 mm- 0.69 mm | Region | 0.69 mm- 0.84 mm | RD | −2.029534 |
|  | Aspherical constant |  | Aspherical constant | k | 13.40262 |
| RD | 0.81915814 | RD | 0.30439226 | A0 | 0 |
| k | −1.0331387 | k | −1.5749807 | A2 | 0 |
| A0 | 0 | A0 | −1.81E−01 | A4 | 1.7105509 |
| A2 | 0 | A2 | 0 | A6 | −14.232857 |
| A4 | 0.15889713 | A4 | −0.22148822 | A8 | 145.08836 |
| A6 | −0.026375804 | A6 | 0.81109812 | A10 | −740.00426 |
| A8 | 0.54253097 | A8 | −1.9054705 | A12 | 2202.1175 |
| A10 | −1.7713649 | A10 | −1.9178654 | A14 | −16617.021 |
| A12 | 3.6778599 | A12 | 18.412031 | A16 | 143605.41 |
| A14 | −3.8852706 | A14 | −27.313249 | A18 | −530438.03 |
| A16 | 1.7582532 | A16 | 12.802057 | A20 | 685600.44 |
|  | Phase function |  | Phase function |  |  |
| P2 | −334.63934 | P2 | −720.17443 |  |  |
| P4 | −2.2724443 | P4 | 1117.5096 |  |  |
| P6 | −12.706397 | P6 | −677.1287 |  |  |

Tables 26A-26F show ring zone cycles of the stair-like step structure provided on the first region of the first surface, and cycles of steps arranged in each ring zone.

TABLE 26A

|  | Cycle [μm] |  | Cycle [μm] |
|---|---|---|---|
| First ring zone | 136.29 | First step | 55.94 |
|  |  | Second step | 23.17 |
|  |  | Third step | 17.78 |
|  |  | Fourth step | 14.99 |
|  |  | Fifth step | 13.20 |
|  |  | Sixth step | 11.94 |
| Second ring zone | 56.73 | First step | 10.98 |
|  |  | Second step | 10.22 |
|  |  | Third step | 9.59 |
|  |  | Fourth step | 9.07 |
|  |  | Fifth step | 8.63 |
|  |  | Sixth step | 8.25 |
| Third ring zone | 43.52 | First step | 7.91 |
|  |  | Second step | 7.61 |
|  |  | Third step | 7.34 |
|  |  | Fourth step | 7.10 |
|  |  | Fifth step | 6.88 |
|  |  | Sixth step | 6.68 |
| Fourth ring zone | 36.68 | First step | 6.50 |
|  |  | Second step | 6.33 |
|  |  | Third step | 6.17 |
|  |  | Fourth step | 6.03 |
|  |  | Fifth step | 5.89 |
|  |  | Sixth step | 5.76 |
| Fifth ring zone | 32.30 | First step | 5.64 |
|  |  | Second step | 5.53 |
|  |  | Third step | 5.43 |
|  |  | Fourth step | 5.33 |
|  |  | Fifth step | 5.23 |
|  |  | Sixth step | 5.14 |

TABLE 26B

|  | Cycle [μm] |  | Cycle [μm] |
|---|---|---|---|
| Sixth ring zone | 29.18 | First step | 5.06 |
|  |  | Second step | 4.97 |
|  |  | Third step | 4.90 |
|  |  | Fourth step | 4.82 |
|  |  | Fifth step | 4.75 |
|  |  | Sixth step | 4.68 |
| Seventh ring zone | 26.82 | First step | 4.62 |
|  |  | Second step | 4.56 |
|  |  | Third step | 4.50 |
|  |  | Fourth step | 4.44 |
|  |  | Fifth step | 4.38 |
|  |  | Sixth step | 4.33 |
| Eighth ring zone | 24.95 | First step | 4.28 |
|  |  | Second step | 4.23 |
|  |  | Third step | 4.18 |
|  |  | Fourth step | 4.13 |
|  |  | Fifth step | 4.09 |
|  |  | Sixth step | 4.04 |
| Ninth ring zone | 23.42 | First step | 4.00 |
|  |  | Second step | 3.96 |
|  |  | Third step | 3.92 |
|  |  | Fourth step | 3.88 |
|  |  | Fifth step | 3.84 |
|  |  | Sixth step | 3.81 |
| Tenth ring zone | 22.13 | First step | 3.77 |
|  |  | Second step | 3.74 |
|  |  | Third step | 3.70 |
|  |  | Fourth step | 3.67 |
|  |  | Fifth step | 3.64 |
|  |  | Sixth step | 3.61 |

TABLE 26C

|  | Cycle [μm] |  | Cycle [μm] |
|---|---|---|---|
| Eleventh ring zone | 21.03 | First step | 3.58 |
|  |  | Second step | 3.55 |
|  |  | Third step | 3.52 |
|  |  | Fourth step | 3.49 |
|  |  | Fifth step | 3.46 |
|  |  | Sixth step | 3.44 |
| Twelfth ring zone | 20.08 | First step | 3.41 |
|  |  | Second step | 3.38 |
|  |  | Third step | 3.36 |
|  |  | Fourth step | 3.33 |
|  |  | Fifth step | 3.31 |
|  |  | Sixth step | 3.28 |
| Thirteenth ring zone | 19.24 | First step | 3.26 |
|  |  | Second step | 3.24 |
|  |  | Third step | 3.22 |
|  |  | Fourth step | 3.19 |
|  |  | Fifth step | 3.17 |
|  |  | Sixth step | 3.15 |
| Fourteenth ring zone | 18.49 | First step | 3.13 |
|  |  | Second step | 3.11 |
|  |  | Third step | 3.09 |
|  |  | Fourth step | 3.07 |
|  |  | Fifth step | 3.05 |
|  |  | Sixth step | 3.03 |
| Fifteenth ring zone | 17.82 | First step | 3.01 |
|  |  | Second step | 3.00 |
|  |  | Third step | 2.98 |
|  |  | Fourth step | 2.96 |
|  |  | Fifth step | 2.94 |
|  |  | Sixth step | 2.93 |

TABLE 26D

|  | Cycle [μm] |  | Cycle [μm] |
|---|---|---|---|
| Sixteenth ring zone | 17.22 | First step | 2.91 |
|  |  | Second step | 2.89 |
|  |  | Third step | 2.88 |
|  |  | Fourth step | 2.86 |
|  |  | Fifth step | 2.85 |
|  |  | Sixth step | 2.83 |
| Seventeenth ring zone | 16.67 | First step | 2.81 |
|  |  | Second step | 2.80 |
|  |  | Third step | 2.78 |
|  |  | Fourth step | 2.77 |
|  |  | Fifth step | 2.76 |
|  |  | Sixth step | 2.74 |
| Eighteenth ring zone | 16.16 | First step | 2.73 |
|  |  | Second step | 2.71 |
|  |  | Third step | 2.70 |
|  |  | Fourth step | 2.69 |
|  |  | Fifth step | 2.67 |
|  |  | Sixth step | 2.66 |
| Nineteenth ring zone | 15.70 | First step | 2.65 |
|  |  | Second step | 2.63 |
|  |  | Third step | 2.62 |
|  |  | Fourth step | 2.61 |
|  |  | Fifth step | 2.60 |
|  |  | Sixth step | 2.59 |
| Twentieth ring zone | 15.27 | First step | 2.57 |
|  |  | Second step | 2.56 |
|  |  | Third step | 2.55 |
|  |  | Fourth step | 2.54 |
|  |  | Fifth step | 2.53 |
|  |  | Sixth step | 2.52 |

TABLE 26E

|  | Cycle [μm] |  | Cycle [μm] |
| --- | --- | --- | --- |
| Twenty-first ring zone | 14.87 | First step | 2.51 |
|  |  | Second step | 2.49 |
|  |  | Third step | 2.48 |
|  |  | Fourth step | 2.47 |
|  |  | Fifth step | 2.46 |
|  |  | Sixth step | 2.45 |
| Twenty-second ring zone | 14.50 | First step | 2.44 |
|  |  | Second step | 2.43 |
|  |  | Third step | 2.42 |
|  |  | Fourth step | 2.41 |
|  |  | Fifth step | 2.40 |
|  |  | Sixth step | 2.39 |
| Twenty-third ring zone | 14.15 | First step | 2.38 |
|  |  | Second step | 2.37 |
|  |  | Third step | 2.36 |
|  |  | Fourth step | 2.35 |
|  |  | Fifth step | 2.34 |
|  |  | Sixth step | 2.34 |
| Twenty-fourth ring zone | 13.82 | First step | 2.33 |
|  |  | Second step | 2.32 |
|  |  | Third step | 2.31 |
|  |  | Fourth step | 2.30 |
|  |  | Fifth step | 2.29 |
|  |  | Sixth step | 2.28 |
| Twenty-fifth ring zone | 13.52 | First step | 2.27 |
|  |  | Second step | 2.27 |
|  |  | Third step | 2.26 |
|  |  | Fourth step | 2.25 |
|  |  | Fifth step | 2.24 |
|  |  | Sixth step | 2.23 |

TABLE 26F

|  | Cycle [μm] |  | Cycle [μm] |
| --- | --- | --- | --- |
| Twenty-sixth ring zone | 13.23 | First step | 2.22 |
|  |  | Second step | 2.22 |
|  |  | Third step | 2.21 |
|  |  | Fourth step | 2.20 |
|  |  | Fifth step | 2.19 |
|  |  | Sixth step | 2.18 |

On the first region of Example 4, one ring zone cycle is composed of consecutive 6-level stair-like steps whose height monotonically decreases step by step as distance from the optical axis of the objective lens element increases. Each ring zone cycle in Tables 26A-26F indicate the width of a ring zone in a radial direction (in a direction perpendicular to the optical axis) as indicated by an arrow in FIG. 11. On the first region, a first ring zone, a second ring zone, a third ring zone, . . . , and a twenty-sixth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 11. In each ring zone, the steps are referred to as a first step, a second step, a third step, . . . , and a sixth step in order from the optical axis side toward the outer periphery side.

Tables 27A and 27B show ring zone cycles of the stair-like step structure provided on the second region of the first surface, and cycles of steps arranged in each ring zone.

TABLE 27A

|  | Cycle [μm] |  | Cycle [μm] |
| --- | --- | --- | --- |
| First ring zone | 20.01 | First step | 3.29 |
|  |  | Second step | 3.31 |
|  |  | Third step | 3.33 |
|  |  | Fourth step | 3.35 |
|  |  | Fifth step | 3.36 |
|  |  | Sixth step | 3.37 |
| Second ring zone | 20.29 | First step | 3.38 |
|  |  | Second step | 3.38 |
|  |  | Third step | 3.39 |
|  |  | Fourth step | 3.39 |
|  |  | Fifth step | 3.38 |
|  |  | Sixth step | 3.38 |
| Third ring zone | 19.97 | First step | 3.37 |
|  |  | Second step | 3.36 |
|  |  | Third step | 3.34 |
|  |  | Fourth step | 3.32 |
|  |  | Fifth step | 3.30 |
|  |  | Sixth step | 3.28 |
| Fourth ring zone | 19.04 | First step | 3.25 |
|  |  | Second step | 3.22 |
|  |  | Third step | 3.19 |
|  |  | Fourth step | 3.16 |
|  |  | Fifth step | 3.13 |
|  |  | Sixth step | 3.09 |
| Fifth ring zone | 17.69 | First step | 3.05 |
|  |  | Second step | 3.01 |
|  |  | Third step | 2.97 |
|  |  | Fourth step | 2.93 |
|  |  | Fifth step | 2.89 |
|  |  | Sixth step | 2.84 |

TABLE 27B

|  | Cycle [μm] |  | Cycle [μm] |
| --- | --- | --- | --- |
| Sixth ring zone | 16.14 | First step | 2.80 |
|  |  | Second step | 2.76 |
|  |  | Third step | 2.71 |
|  |  | Fourth step | 2.67 |
|  |  | Fifth step | 2.62 |
|  |  | Sixth step | 2.58 |
| Seventh ring zone | 14.61 | First step | 2.54 |
|  |  | Second step | 2.50 |
|  |  | Third step | 2.45 |
|  |  | Fourth step | 2.41 |
|  |  | Fifth step | 2.37 |
|  |  | Sixth step | 2.33 |

On the second region of Example 4, one ring zone cycle is composed of consecutive 6-level stair-like steps whose height monotonically increases step by step as distance from the optical axis of the objective lens element increases. Each ring zone cycle in Tables 27A and 27B indicate the width of a ring zone in the radial direction (in the direction perpendicular to the optical axis) as indicated by an arrow in FIG. 11. On the second region, a first ring zone, a second ring zone, a third ring zone, . . . , and a seventh ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 11. In each ring zone, the steps are referred to as a first step, a second step, a third step, . . . , and a sixth step in order from the optical axis side toward the outer periphery side.

Tables 28A-28F show step heights of the stair-like diffraction structure provided on the first region of Example 4. In one cycle of the stair-like diffraction structure, the height of each of the first to fifth steps is set such that a phase difference of 1.33 wavelengths is provided to light of the designed wavelength for BD, and the height of the sixth step is set such that a phase difference of 6.65 wavelengths is provided in the opposite direction.

TABLE 28A

|  |  | Depth [μm] |
|---|---|---|
| First ring zone | First step | 1.03458 |
|  | Second step | 1.03566 |
|  | Third step | 1.03674 |
|  | Fourth step | 1.03783 |
|  | Fifth step | 1.03892 |
|  | Sixth step | 5.20003 |
| Second ring zone | First step | 1.04111 |
|  | Second step | 1.04221 |
|  | Third step | 1.04332 |
|  | Fourth step | 1.04444 |
|  | Fifth step | 1.04555 |
|  | Sixth step | 5.23335 |
| Third ring zone | First step | 1.04780 |
|  | Second step | 1.04893 |
|  | Third step | 1.05006 |
|  | Fourth step | 1.05121 |
|  | Fifth step | 1.05235 |
|  | Sixth step | 5.26747 |
| Fourth ring zone | First step | 1.05465 |
|  | Second step | 1.05581 |
|  | Third step | 1.05698 |
|  | Fourth step | 1.05813 |
|  | Fifth step | 1.05932 |
|  | Sixth step | 5.30244 |
| Fifth ring zone | First step | 1.06167 |
|  | Second step | 1.06286 |
|  | Third step | 1.06405 |
|  | Fourth step | 1.06525 |
|  | Fifth step | 1.06645 |
|  | Sixth step | 5.33829 |

TABLE 28B

|  |  | Depth [μm] |
|---|---|---|
| Sixth ring zone | First step | 1.06887 |
|  | Second step | 1.07009 |
|  | Third step | 1.07132 |
|  | Fourth step | 1.07254 |
|  | Fifth step | 1.07378 |
|  | Sixth step | 5.37506 |
| Seventh ring zone | First step | 1.07625 |
|  | Second step | 1.07750 |
|  | Third step | 1.07876 |
|  | Fourth step | 1.08001 |
|  | Fifth step | 1.08129 |
|  | Sixth step | 5.41277 |
| Eighth ring zone | First step | 1.08383 |
|  | Second step | 1.08511 |
|  | Third step | 1.08640 |
|  | Fourth step | 1.08769 |
|  | Fifth step | 1.08899 |
|  | Sixth step | 5.45147 |
| Ninth ring zone | First step | 1.09161 |
|  | Second step | 1.09293 |
|  | Third step | 1.09424 |
|  | Fourth step | 1.09557 |
|  | Fifth step | 1.09690 |
|  | Sixth step | 5.49124 |
| Tenth ring zone | First step | 1.09959 |
|  | Second step | 1.10095 |
|  | Third step | 1.10230 |
|  | Fourth step | 1.10366 |
|  | Fifth step | 1.10503 |
|  | Sixth step | 5.53207 |

TABLE 28C

|  |  | Depth [μm] |
|---|---|---|
| Eleventh ring zone | First step | 1.10780 |
|  | Second step | 1.10918 |
|  | Third step | 1.11058 |
|  | Fourth step | 1.11197 |
|  | Fifth step | 1.11338 |
|  | Sixth step | 5.57403 |
| Twelfth ring zone | First step | 1.11623 |
|  | Second step | 1.11765 |
|  | Third step | 1.11909 |
|  | Fourth step | 1.12053 |
|  | Fifth step | 1.12197 |
|  | Sixth step | 5.61719 |
| Thirteenth ring zone | First step | 1.12490 |
|  | Second step | 1.12636 |
|  | Third step | 1.12784 |
|  | Fourth step | 1.12933 |
|  | Fifth step | 1.13082 |
|  | Sixth step | 5.66161 |
| Fourteenth ring zone | First step | 1.13383 |
|  | Second step | 1.13534 |
|  | Third step | 1.13686 |
|  | Fourth step | 1.13839 |
|  | Fifth step | 1.13992 |
|  | Sixth step | 5.70736 |
| Fifteenth ring zone | First step | 1.14302 |
|  | Second step | 1.14457 |
|  | Third step | 1.14614 |
|  | Fourth step | 1.14772 |
|  | Fifth step | 1.14931 |
|  | Sixth step | 5.75444 |

TABLE 28D

|  |  | Depth [μm] |
|---|---|---|
| Sixteenth ring zone | First step | 1.15250 |
|  | Second step | 1.15411 |
|  | Third step | 1.15572 |
|  | Fourth step | 1.15734 |
|  | Fifth step | 1.15898 |
|  | Sixth step | 5.80312 |
| Seventeenth ring zone | First step | 1.16227 |
|  | Second step | 1.16394 |
|  | Third step | 1.16560 |
|  | Fourth step | 1.16729 |
|  | Fifth step | 1.16898 |
|  | Sixth step | 5.85333 |
| Eighteenth ring zone | First step | 1.17238 |
|  | Second step | 1.17410 |
|  | Third step | 1.17581 |
|  | Fourth step | 1.17756 |
|  | Fifth step | 1.17930 |
|  | Sixth step | 5.90527 |
| Nineteenth ring zone | First step | 1.18282 |
|  | Second step | 1.18460 |
|  | Third step | 1.18639 |
|  | Fourth step | 1.18818 |
|  | Fifth step | 1.18999 |
|  | Sixth step | 5.95907 |
| Twentieth ring zone | First step | 1.19364 |
|  | Second step | 1.19548 |
|  | Third step | 1.19733 |
|  | Fourth step | 1.19919 |
|  | Fifth step | 1.20107 |
|  | Sixth step | 6.01479 |

TABLE 28E

|  |  | Depth [μm] |
|---|---|---|
| Twenty-first ring zone | First step | 1.20485 |
|  | Second step | 1.20676 |
|  | Third step | 1.20868 |
|  | Fourth step | 1.21062 |
|  | Fifth step | 1.21256 |
|  | Sixth step | 6.07258 |
| Twenty-second ring zone | First step | 1.21648 |
|  | Second step | 1.21848 |
|  | Third step | 1.22047 |
|  | Fourth step | 1.22248 |
|  | Fifth step | 1.22450 |
|  | Sixth step | 6.13270 |
| Twenty-third ring zone | First step | 1.22859 |
|  | Second step | 1.23065 |
|  | Third step | 1.23274 |
|  | Fourth step | 1.23483 |
|  | Fifth step | 1.23693 |
|  | Sixth step | 6.19527 |
| Twenty-fourth ring zone | First step | 1.24118 |
|  | Second step | 1.24334 |
|  | Third step | 1.24551 |
|  | Fourth step | 1.24769 |
|  | Fifth step | 1.24988 |
|  | Sixth step | 6.26044 |
| Twenty-fifth ring zone | First step | 1.25432 |
|  | Second step | 1.25657 |
|  | Third step | 1.25883 |
|  | Fourth step | 1.26111 |
|  | Fifth step | 1.26339 |
|  | Sixth step | 6.32854 |

TABLE 28F

|  |  | Depth [μm] |
|---|---|---|
| Twenty-sixth ring zone | First step | 1.26804 |
|  | Second step | 1.27039 |
|  | Third step | 1.27276 |
|  | Fourth step | 1.27514 |
|  | Fifth step | 1.27754 |

Tables 29A and 29B show step heights of the stair-like diffraction structure provided on the second region of Example 4. In one cycle of the stair-like diffraction structure, the height of each of the first to fifth steps is set such that a phase difference of 0.84 wavelength is provided to the light of the designed wavelength for BD, and the height of the sixth step is set such that a phase difference of 4.20 wavelengths is provided in the opposite direction.

TABLE 29A

|  |  | Depth [μm] |
|---|---|---|
| First ring zone | First step | 0.81238 |
|  | Second step | 0.81451 |
|  | Third step | 0.81673 |
|  | Fourth step | 0.81903 |
|  | Fifth step | 0.82142 |
|  | Sixth step | 4.11949 |
| Second ring zone | First step | 0.82647 |
|  | Second step | 0.82912 |
|  | Third step | 0.83186 |
|  | Fourth step | 0.83468 |
|  | Fifth step | 0.83760 |
|  | Sixth step | 4.20298 |
| Third ring zone | First step | 0.84367 |
|  | Second step | 0.84683 |
|  | Third step | 0.85006 |
|  | Fourth step | 0.85337 |
|  | Fifth step | 0.85676 |
|  | Sixth step | 4.30105 |
| Fourth ring zone | First step | 0.86373 |
|  | Second step | 0.86732 |
|  | Third step | 0.87096 |
|  | Fourth step | 0.87467 |
|  | Fifth step | 0.87842 |
|  | Sixth step | 4.41118 |
| Fifth ring zone | First step | 0.88611 |
|  | Second step | 0.89002 |
|  | Third step | 0.89399 |
|  | Fourth step | 0.89799 |
|  | Fifth step | 0.90205 |
|  | Sixth step | 4.53079 |

TABLE 29B

|  |  | Depth [μm] |
|---|---|---|
| Sixth ring zone | First step | 0.91030 |
|  | Second step | 0.91449 |
|  | Third step | 0.91873 |
|  | Fourth step | 0.92301 |
|  | Fifth step | 0.92734 |
|  | Sixth step | 4.65856 |
| Seventh ring zone | First step | 0.93614 |
|  | Second step | 0.94061 |
|  | Third step | 0.94513 |
|  | Fourth step | 0.94971 |
|  | Fifth step | 0.95434 |
|  | Sixth step | 4.79518 |

It should be noted that although not shown, the sawtooth-like diffraction structure is provided on the outer region of Example 4.

Table 30 shows diffraction efficiencies at the twenty-sixth ring zone of the first region and at the eighth ring zone of the second region. The eighth ring zone of the second region is an outermost region which contributes to formation of a spot of light for DVD in the present example.

TABLE 30

|  |  |  | Diffraction efficiency (%) |
|---|---|---|---|
| BD | Inner region | First ring zone | 67 |
|  |  | Twenty-sixth ring zone | 46 |
|  | Middle region | Eighth ring zone | 63 |
| DVD | Inner region | First ring zone | 75 |
|  |  | Twenty-sixth ring zone | 54 |
|  | Middle region | Eighth ring zone | 14 |

The ring zone cycle of the twenty-sixth ring zone of the first region is about 13 μm, and the diffraction efficiency of the light for BD is about 46%. Meanwhile, the ring zone cycle of the first ring zone of the first region is about 136 μm, and the diffraction efficiency of the light for BD is about 67%. Thus, the diffraction efficiency of the light for BD at the twenty-sixth ring zone of the first region is much lower than the diffraction efficiency at the first ring zone. When the present invention is not applied, an amount of light in reproducing/recording on BD is insufficient with this diffraction efficiency.

In contrast, the ring zone cycle of the eighth ring zone of the second region is about 13 μm. The diffraction efficiency of the light for BD at the eighth ring zone of the second region is about 63% and is greatly improved as compared to the diffraction efficiency at the twenty-sixth ring zone of the first region. Thus, insufficiency of the light amount in reproducing/recording on BD is suppressed.

Example 5

The first surface of an objective lens element according to Example 5 is divided into a first region including a symmetry axis, a second region surrounding the first region, and an outer region surrounding the second region. An 8-level stair-like diffraction structure whose height monotonically decreases step by step as distance from the optical axis of the objective lens element increases is provided on the first region of the first surface. A 7-level stair-like diffraction structure whose height monotonically increases step by step as distance from the optical axis of the objective lens element increases is provided on the second region. A sawtooth-like diffraction structure is provided on the outer region. The second surface is provided with an aspheric surface. The objective lens element according to Example 4 is a BD/DVD compatible lens. With regard to designed values for BD, the wavelength is 408 nm; the focal length is 1.09 mm; and the protective layer thickness of an information storage medium is 0.1 mm. With regard to designed values for DVD, the wavelength is 660 nm; the focal length is 1.32 mm; and the protective layer thickness of an information storage medium is 0.6 mm.

Tables 31 and 32 show construction data of the objective lens element according to Example 5.

TABLE 31

|  | BD | DVD |
| --- | --- | --- |
| Wavelength | 0.408 | 0.660 |
| Effective diameter | 1.68 | 1.68 |
| Working distance (WD) | 0.40 | 0.40 |
| Disc thickness (DT) | 0.10 | 0.60 |
| Focal length | 1.09 | 1.32 |
| First surface, First region Diffraction order | 2 | −2 |
| First surface, Second region Diffraction order | 5 | −1 |
| First surface, _Outer region Diffraction order | 3 | — |
| Object point (OP) | ∞ | ∞ |

| Surface No. | Radius of curvature at the top | Thickness | Material | Remarks |
| --- | --- | --- | --- | --- |
| 0 |  | OP |  |  |
| 1 | 0.72399814 | 1.125319 | n1 | First region (Diffractive surface), Second region (Diffractive surface), Outer region (Diffractive surface) |
| 2 | −1.738506 | WD |  | Aspheric surface |
| 3 | ∞ | DT | disc | Planar |
| 4 | ∞ |  |  | Planar |

| Wavelength | 0.408 | 0.660 |
| --- | --- | --- |
| n1 | 1.52505 | 1.50711 |
| disc | 1.61642 | 1.57815 |

TABLE 32

| First surface | First region Diffractive surface |
| --- | --- |
| Region | 0 mm-0.69 mm |
| Aspherical constant | |
| RD | 0.72399814 |
| k | −0.80565617 |
| A0 | 0 |
| A2 | 0 |
| A4 | 0.2220808 |
| A6 | −0.54716594 |
| A8 | 3.0481241 |
| A10 | −7.4996866 |
| A12 | 7.6042347 |
| A14 | 2.8548542 |
| A16 | −7.5452063 |
| Phase function | |
| P2 | −247.8751 |
| P4 | 30.793671 |
| P6 | −97.513681 |

| First surface | Second region Diffractive surface |
| --- | --- |
| Region | 0.69 mm-0.84 mm |
| Aspherical constant | |
| RD | 0.15483052 |
| k | −1.4090207 |
| A0 | −2.39E−01 |
| A2 | 0 |
| A4 | −1.0390761 |
| A6 | 0.25086182 |
| A8 | −0.018007854 |
| A10 | 2.3606036 |
| A12 | 16.318267 |
| A14 | −44.689687 |
| A16 | 29.696786 |
| Phase function | |
| P2 | −490.42048 |
| P4 | 646.10183 |
| P6 | −342.89035 |

| Second surface | Aspherical constant |
| --- | --- |
| RD | −1.738506 |
| k | 8.591035 |
| A0 | 0 |
| A2 | 0 |
| A4 | 2.1245151 |
| A6 | −7.4983864 |
| A8 | −66.676749 |
| A10 | 1288.8438 |
| A12 | −5781.1044 |
| A14 | −13127.483 |
| A16 | 196387.57 |
| A18 | −611177.23 |
| A20 | 639839.55 |

Tables 33A-33E shows ring zone cycles of the stair-like step structure provided on the first region of the first surface, and cycles of steps arranged in each ring zone.

TABLE 33A

|  | Cycle [μm] |  | Cycle [μm] |
|---|---|---|---|
| First ring zone | 158.94 | First step | 56.30 |
|  |  | Second step | 23.34 |
|  |  | Third step | 17.92 |
|  |  | Fourth step | 15.11 |
|  |  | Fifth step | 13.32 |
|  |  | Sixth step | 12.05 |
|  |  | Seventh step | 11.09 |
|  |  | Eighth step | 10.32 |
| Second ring zone | 66.32 | First step | 9.70 |
|  |  | Second step | 9.18 |
|  |  | Third step | 8.73 |
|  |  | Fourth step | 8.35 |
|  |  | Fifth step | 8.01 |
|  |  | Sixth step | 7.71 |
|  |  | Seventh step | 7.44 |
|  |  | Eighth step | 7.20 |
| Third ring zone | 51.00 | First step | 6.98 |
|  |  | Second step | 6.78 |
|  |  | Third step | 6.59 |
|  |  | Fourth step | 6.42 |
|  |  | Fifth step | 6.27 |
|  |  | Sixth step | 6.12 |
|  |  | Seventh step | 5.98 |
|  |  | Eighth step | 5.86 |
| Fourth ring zone | 43.04 | First step | 5.74 |
|  |  | Second step | 5.62 |
|  |  | Third step | 5.52 |
|  |  | Fourth step | 5.41 |
|  |  | Fifth step | 5.32 |
|  |  | Sixth step | 5.23 |
|  |  | Seventh step | 5.14 |
|  |  | Eighth step | 5.06 |

TABLE 33B

|  | Cycle [μm] |  | Cycle [μm] |
|---|---|---|---|
| Fifth ring zone | 37.90 | First step | 4.98 |
|  |  | Second step | 4.91 |
|  |  | Third step | 4.83 |
|  |  | Fourth step | 4.76 |
|  |  | Fifth step | 4.70 |
|  |  | Sixth step | 4.63 |
|  |  | Seventh step | 4.57 |
|  |  | Eighth step | 4.51 |
| Sixth ring zone | 34.21 | First step | 4.46 |
|  |  | Second step | 4.40 |
|  |  | Third step | 4.35 |
|  |  | Fourth step | 4.30 |
|  |  | Fifth step | 4.25 |
|  |  | Sixth step | 4.20 |
|  |  | Seventh step | 4.15 |
|  |  | Eighth step | 4.11 |
| Seventh ring zone | 31.36 | First step | 4.06 |
|  |  | Second step | 4.02 |
|  |  | Third step | 3.98 |
|  |  | Fourth step | 3.94 |
|  |  | Fifth step | 3.90 |
|  |  | Sixth step | 3.86 |
|  |  | Seventh step | 3.82 |
|  |  | Eighth step | 3.79 |
| Eighth ring zone | 29.07 | First step | 3.75 |
|  |  | Second step | 3.72 |
|  |  | Third step | 3.68 |
|  |  | Fourth step | 3.65 |
|  |  | Fifth step | 3.62 |
|  |  | Sixth step | 3.58 |
|  |  | Seventh step | 3.55 |
|  |  | Eighth step | 3.52 |

TABLE 33C

|  | Cycle [μm] |  | Cycle [μm] |
|---|---|---|---|
| Ninth ring zone | 27.15 | First step | 3.49 |
|  |  | Second step | 3.46 |
|  |  | Third step | 3.43 |
|  |  | Fourth step | 3.41 |
|  |  | Fifth step | 3.38 |
|  |  | Sixth step | 3.35 |
|  |  | Seventh step | 3.33 |
|  |  | Eighth step | 3.30 |
| Tenth ring zone | 25.51 | First step | 3.27 |
|  |  | Second step | 3.25 |
|  |  | Third step | 3.22 |
|  |  | Fourth step | 3.20 |
|  |  | Fifth step | 3.18 |
|  |  | Sixth step | 3.15 |
|  |  | Seventh step | 3.13 |
|  |  | Eighth step | 3.11 |
| Eleventh ring zone | 24.08 | First step | 3.08 |
|  |  | Second step | 3.06 |
|  |  | Third step | 3.04 |
|  |  | Fourth step | 3.02 |
|  |  | Fifth step | 3.00 |
|  |  | Sixth step | 2.98 |
|  |  | Seventh step | 2.96 |
|  |  | Eighth step | 2.94 |
| Twelfth ring zone | 22.80 | First step | 2.92 |
|  |  | Second step | 2.90 |
|  |  | Third step | 2.88 |
|  |  | Fourth step | 2.86 |
|  |  | Fifth step | 2.84 |
|  |  | Sixth step | 2.82 |
|  |  | Seventh step | 2.80 |
|  |  | Eighth step | 2.79 |

TABLE 33D

|  | Cycle [μm] |  | Cycle [μm] |
|---|---|---|---|
| Thirteenth ring zone | 21.66 | First step | 2.77 |
|  |  | Second step | 2.75 |
|  |  | Third step | 2.73 |
|  |  | Fourth step | 2.72 |
|  |  | Fifth step | 2.70 |
|  |  | Sixth step | 2.68 |
|  |  | Seventh step | 2.67 |
|  |  | Eighth step | 2.65 |
| Fourteenth ring zone | 20.62 | First step | 2.63 |
|  |  | Second step | 2.62 |
|  |  | Third step | 2.60 |
|  |  | Fourth step | 2.59 |
|  |  | Fifth step | 2.57 |
|  |  | Sixth step | 2.55 |
|  |  | Seventh step | 2.54 |
|  |  | Eighth step | 2.52 |
| Fifteenth ring zone | 19.67 | First step | 2.51 |
|  |  | Second step | 2.49 |
|  |  | Third step | 2.48 |
|  |  | Fourth step | 2.47 |
|  |  | Fifth step | 2.45 |
|  |  | Sixth step | 2.44 |
|  |  | Seventh step | 2.42 |
|  |  | Eighth step | 2.41 |
| Sixteenth ring zone | 18.80 | First step | 2.40 |
|  |  | Second step | 2.38 |
|  |  | Third step | 2.37 |
|  |  | Fourth step | 2.36 |
|  |  | Fifth step | 2.34 |
|  |  | Sixth step | 2.33 |
|  |  | Seventh step | 2.32 |
|  |  | Eighth step | 2.30 |

TABLE 33E

|  | Cycle [μm] |  | Cycle [μm] |
|---|---|---|---|
| Seventeenth ring zone | 17.99 | First step | 2.29 |
|  |  | Second step | 2.28 |
|  |  | Third step | 2.27 |
|  |  | Fourth step | 2.25 |
|  |  | Fifth step | 2.24 |
|  |  | Sixth step | 2.23 |
|  |  | Seventh step | 2.22 |
|  |  | Eighth step | 2.21 |
| Eighteenth ring zone | 17.24 | First step | 2.20 |
|  |  | Second step | 2.18 |
|  |  | Third step | 2.17 |
|  |  | Fourth step | 2.16 |
|  |  | Fifth step | 2.15 |
|  |  | Sixth step | 2.14 |
|  |  | Seventh step | 2.13 |
|  |  | Eighth step | 2.12 |
| Nineteenth ring zone | 16.54 | First step | 2.10 |
|  |  | Second step | 2.09 |
|  |  | Third step | 2.08 |
|  |  | Fourth step | 2.07 |
|  |  | Fifth step | 2.06 |
|  |  | Sixth step | 2.05 |
|  |  | Seventh step | 2.04 |
|  |  | Eighth step | 2.03 |
| Twentieth ring zone | 15.89 | First step | 2.02 |
|  |  | Second step | 2.01 |
|  |  | Third step | 2.00 |
|  |  | Fourth step | 1.99 |
|  |  | Fifth step | 1.98 |
|  |  | Sixth step | 1.97 |
|  |  | Seventh step | 1.96 |
|  |  | Eighth step | 1.95 |

On the first region of Example 5, one ring zone cycle is composed of consecutive 8-level stair-like steps whose height monotonically decreases step by step as distance from the optical axis of the objective lens element increases. Each ring zone cycle in Tables 33A-33E indicate the width of a ring zone in a radial direction (in a direction perpendicular to the optical axis) as indicated by an arrow in FIG. 12. On the first region, a first ring zone, a second ring zone, a third ring zone, . . . , and a twentieth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 12. In each ring zone, the steps are referred to as a first step, a second step, a third step, . . . , and an eighth step in order from the optical axis side toward the outer periphery side.

Tables 34A and 34B show ring zone cycles of the stair-like step structure provided on the second region of the first surface, and cycles of steps arranged in each ring zone.

TABLE 34A

|  | Cycle [μm] |  | Cycle [μm] |
|---|---|---|---|
| First ring zone | 22.81 | First step | 3.78 |
|  |  | Second step | 3.12 |
|  |  | Third step | 3.14 |
|  |  | Fourth step | 3.16 |
|  |  | Fifth step | 3.18 |
|  |  | Sixth step | 3.20 |
|  |  | Seventh step | 3.22 |
| Second ring zone | 23.06 | First step | 3.24 |
|  |  | Second step | 3.26 |
|  |  | Third step | 3.28 |
|  |  | Fourth step | 3.30 |
|  |  | Fifth step | 3.31 |
|  |  | Sixth step | 3.33 |
|  |  | Seventh step | 3.34 |

TABLE 34A-continued

|  | Cycle [μm] |  | Cycle [μm] |
|---|---|---|---|
| Third ring zone | 23.64 | First step | 3.35 |
|  |  | Second step | 3.36 |
|  |  | Third step | 3.37 |
|  |  | Fourth step | 3.38 |
|  |  | Fifth step | 3.39 |
|  |  | Sixth step | 3.39 |
|  |  | Seventh step | 3.39 |
| Fourth ring zone | 23.64 | First step | 3.39 |
|  |  | Second step | 3.39 |
|  |  | Third step | 3.39 |
|  |  | Fourth step | 3.38 |
|  |  | Fifth step | 3.37 |
|  |  | Sixth step | 3.36 |
|  |  | Seventh step | 3.35 |

TABLE 34B

|  | Cycle [μm] |  | Cycle [μm] |
|---|---|---|---|
| Fifth ring zone | 22.92 | First step | 3.33 |
|  |  | Second step | 3.32 |
|  |  | Third step | 3.30 |
|  |  | Fourth step | 3.28 |
|  |  | Fifth step | 3.26 |
|  |  | Sixth step | 3.23 |
|  |  | Seventh step | 3.21 |

On the second region of Example 5, one ring zone cycle is composed of consecutive 7-level stair-like steps whose height monotonically increases step by step as distance from the optical axis of the objective lens element increases. Each ring zone cycle in Tables 34A and 34B indicate the width of a ring zone in the radial direction (in the direction perpendicular to the optical axis) as indicated by an arrow in FIG. 12. On the second region, a first ring zone, a second ring zone, a third ring zone, . . . , and a fifth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 12. In each ring zone, the steps are referred to as a first step, a second step, a third step, . . . , and a seventh step in order from the optical axis side toward the outer periphery side.

Tables 35A-35E show step heights of the stair-like diffraction structure provided on the first region of Example 5. In one cycle of the stair-like diffraction structure, the height of each of the first to seventh steps is set such that a phase difference of 1.25 wavelengths is provided to light of the designed wavelength for BD, and the height of the eighth step is set such that a phase difference of 8.75 wavelengths is provided in the opposite direction.

TABLE 35A

|  |  | Depth [μm] |
|---|---|---|
| First ring zone | First step | 0.97255 |
|  | Second step | 0.97376 |
|  | Third step | 0.97499 |
|  | Fourth step | 0.97621 |
|  | Fifth step | 0.97746 |
|  | Sixth step | 0.97871 |
|  | Seventh step | 0.97996 |
|  | Eighth step | 6.86866 |

TABLE 35A-continued

|  |  | Depth [μm] |
|---|---|---|
| Second ring zone | First step | 0.98251 |
|  | Second step | 0.98380 |
|  | Third step | 0.98509 |
|  | Fourth step | 0.98639 |
|  | Fifth step | 0.98770 |
|  | Sixth step | 0.98901 |
|  | Seventh step | 0.99034 |
|  | Eighth step | 6.94173 |
| Third ring zone | First step | 0.99301 |
|  | Second step | 0.99436 |
|  | Third step | 0.99573 |
|  | Fourth step | 0.99709 |
|  | Fifth step | 0.99846 |
|  | Sixth step | 0.99985 |
|  | Seventh step | 1.00124 |
|  | Eighth step | 7.01846 |
| Fourth ring zone | First step | 1.00404 |
|  | Second step | 1.00545 |
|  | Third step | 1.00688 |
|  | Fourth step | 1.00830 |
|  | Fifth step | 1.00974 |
|  | Sixth step | 1.01119 |
|  | Seventh step | 1.01265 |
|  | Eighth step | 7.09879 |

TABLE 35B

|  |  | Depth [μm] |
|---|---|---|
| Fifth ring zone | First step | 1.01559 |
|  | Second step | 1.01706 |
|  | Third step | 1.01855 |
|  | Fourth step | 1.02005 |
|  | Fifth step | 1.02156 |
|  | Sixth step | 1.02308 |
|  | Seventh step | 1.02460 |
|  | Eighth step | 7.18296 |
| Sixth ring zone | First step | 1.02768 |
|  | Second step | 1.02923 |
|  | Third step | 1.03079 |
|  | Fourth step | 1.03236 |
|  | Fifth step | 1.03394 |
|  | Sixth step | 1.03553 |
|  | Seventh step | 1.03713 |
|  | Eighth step | 7.27116 |
| Seventh ring zone | First step | 1.04035 |
|  | Second step | 1.04198 |
|  | Third step | 1.04361 |
|  | Fourth step | 1.04526 |
|  | Fifth step | 1.04691 |
|  | Sixth step | 1.04858 |
|  | Seventh step | 1.05025 |
|  | Eighth step | 7.36356 |
| Eighth ring zone | First step | 1.05364 |
|  | Second step | 1.05534 |
|  | Third step | 1.05705 |
|  | Fourth step | 1.05878 |
|  | Fifth step | 1.06050 |
|  | Sixth step | 1.06225 |
|  | Seventh step | 1.06400 |
|  | Eighth step | 7.46034 |

TABLE 35C

|  |  | Depth [μm] |
|---|---|---|
| Ninth ring zone | First step | 1.06753 |
|  | Second step | 1.06931 |
|  | Third step | 1.07110 |
|  | Fourth step | 1.07290 |
|  | Fifth step | 1.07471 |
|  | Sixth step | 1.07654 |
|  | Seventh step | 1.07838 |
|  | Eighth step | 7.56149 |
| Tenth ring zone | First step | 1.08206 |
|  | Second step | 1.08393 |
|  | Third step | 1.08580 |
|  | Fourth step | 1.08769 |
|  | Fifth step | 1.08958 |
|  | Sixth step | 1.09149 |
|  | Seventh step | 1.09340 |
|  | Eighth step | 7.66728 |
| Eleventh ring zone | First step | 1.09726 |
|  | Second step | 1.09921 |
|  | Third step | 1.10116 |
|  | Fourth step | 1.10314 |
|  | Fifth step | 1.10511 |
|  | Sixth step | 1.10710 |
|  | Seventh step | 1.10911 |
|  | Eighth step | 7.77788 |
| Twelfth ring zone | First step | 1.11315 |
|  | Second step | 1.11519 |
|  | Third step | 1.11724 |
|  | Fourth step | 1.11930 |
|  | Fifth step | 1.12138 |
|  | Sixth step | 1.12345 |
|  | Seventh step | 1.12555 |
|  | Eighth step | 7.89364 |

TABLE 35D

|  |  | Depth [μm] |
|---|---|---|
| Thirteenth ring zone | First step | 1.12979 |
|  | Second step | 1.13193 |
|  | Third step | 1.13408 |
|  | Fourth step | 1.13624 |
|  | Fifth step | 1.13841 |
|  | Sixth step | 1.14060 |
|  | Seventh step | 1.14280 |
|  | Eighth step | 8.01509 |
| Fourteenth ring zone | First step | 1.14724 |
|  | Second step | 1.14949 |
|  | Third step | 1.15175 |
|  | Fourth step | 1.15401 |
|  | Fifth step | 1.15630 |
|  | Sixth step | 1.15860 |
|  | Seventh step | 1.16091 |
|  | Eighth step | 8.14275 |
| Fifteenth ring zone | First step | 1.16559 |
|  | Second step | 1.16795 |
|  | Third step | 1.17033 |
|  | Fourth step | 1.17271 |
|  | Fifth step | 1.17511 |
|  | Sixth step | 1.17754 |
|  | Seventh step | 1.17998 |
|  | Eighth step | 8.27689 |
| Sixteenth ring zone | First step | 1.18489 |
|  | Second step | 1.18736 |
|  | Third step | 1.18986 |
|  | Fourth step | 1.19236 |
|  | Fifth step | 1.19489 |
|  | Sixth step | 1.19743 |
|  | Seventh step | 1.19999 |
|  | Eighth step | 8.41785 |

TABLE 35E

| | | Depth [μm] |
|---|---|---|
| Seventeenth ring zone | First step | 1.20514 |
| | Second step | 1.20774 |
| | Third step | 1.21034 |
| | Fourth step | 1.21296 |
| | Fifth step | 1.21560 |
| | Sixth step | 1.21825 |
| | Seventh step | 1.22093 |
| | Eighth step | 8.56520 |
| Eighteenth ring zone | First step | 1.22629 |
| | Second step | 1.22898 |
| | Third step | 1.23169 |
| | Fourth step | 1.23441 |
| | Fifth step | 1.23714 |
| | Sixth step | 1.23988 |
| | Seventh step | 1.24263 |
| | Eighth step | 8.71763 |
| Nineteenth ring zone | First step | 1.24814 |
| | Second step | 1.25090 |
| | Third step | 1.25368 |
| | Fourth step | 1.25645 |
| | Fifth step | 1.25923 |
| | Sixth step | 1.26201 |
| | Seventh step | 1.26479 |
| | Eighth step | 8.87303 |
| Twentieth ring zone | First step | 1.27035 |
| | Second step | 1.27313 |
| | Third step | 1.27590 |
| | Fourth step | 1.27866 |
| | Fifth step | 1.28141 |
| | Sixth step | 1.28416 |
| | Seventh step | 1.28690 |

Tables 36A and 36B show step heights of the stair-like diffraction structure provided on the second region of Example 5. In one cycle of the stair-like diffraction structure, the height of each of the first to sixth steps is set such that a phase difference of 0.26 wavelength is provided to the light of the designed wavelength for BD, and the height of the seventh step is set such that a phase difference of 1.56 wavelengths is provided in the opposite direction.

TABLE 36A

| | | Depth [μm] |
|---|---|---|
| First ring zone | First step | 0.26920 |
| | Second step | 0.27021 |
| | Third step | 0.27127 |
| | Fourth step | 0.27238 |
| | Fifth step | 0.27353 |
| | Sixth step | 0.27473 |
| | Seventh step | 1.65591 |
| Second ring zone | First step | 0.27730 |
| | Second step | 0.27867 |
| | Third step | 0.28011 |
| | Fourth step | 0.28161 |
| | Fifth step | 0.28319 |
| | Sixth step | 0.28484 |
| | Seventh step | 1.71949 |
| Third ring zone | First step | 0.28841 |
| | Second step | 0.29034 |
| | Third step | 0.29238 |
| | Fourth step | 0.29453 |
| | Fifth step | 0.29681 |
| | Sixth step | 0.29923 |
| | Seventh step | 1.81075 |
| Fourth ring zone | First step | 0.30452 |
| | Second step | 0.30743 |
| | Third step | 0.31054 |
| | Fourth step | 0.31385 |
| | Fifth step | 0.31740 |
| | Sixth step | 0.32120 |
| | Seventh step | 1.95168 |

TABLE 36B

| | | Depth [μm] |
|---|---|---|
| Fifth ring zone | First step | 0.32965 |
| | Second step | 0.33435 |
| | Third step | 0.33939 |
| | Fourth step | 0.34481 |
| | Fifth step | 0.35064 |
| | Sixth step | 0.35689 |
| | Seventh step | 2.18174 |

It should be noted that although not shown, the sawtooth-like diffraction structure is provided on the outer region of Example 5.

Table 37 shows diffraction efficiencies at the twentieth ring zone of the first region and at the sixth ring zone of the second region. The sixth ring zone of the second region is an outermost region which contributes to formation of a spot of light for DVD in the present example.

TABLE 37

| | | | Diffractive efficiency (%) |
|---|---|---|---|
| BD | Inner region | First ring zone | 77 |
| | | Twentieth ring zone | 46 |
| | Middle region | Sixth ring zone | 9 |
| DVD | Inner region | First ring zone | 75 |
| | | Twentieth ring zone | 22 |
| | Middle region | Sixth ring zone | 85 |

The ring zone cycle of the twentieth ring zone of the first region is about 16 μm, and the diffraction efficiency of the light for DVD is about 22%. Meanwhile, the ring zone cycle of the first ring zone of the first region is about 159 μm, and the diffraction efficiency of the light for DVD is about 75%. Thus, the diffraction efficiency of the light for DVD at the twentieth ring zone of the first region is much lower than the diffraction efficiency at the first ring zone. When the present invention is not applied, the diameter of a spot on a recording surface is increased with this diffraction efficiency, and recording/reproducing performance of DVD deteriorates.

In contrast, the ring zone cycle of the sixth ring zone of the second region is about 22 μm. The diffraction efficiency of the light for DVD at the sixth ring zone of the second region is about 85% and is greatly improved as compared to that at the twentieth ring zone of the first region. Thus, enlargement of a beam spot formed when the light for DVD is incident is suppressed. As a result, the recording/reproducing performance improves.

Table 38 shows the relationship between diffraction orders of the objective lens elements according to Examples 1 to 5.

TABLE 38

| | Example | | | | | | |
|---|---|---|---|---|---|---|---|
| | 1 | 2 | | 3 | | 4 | 5 |
| | BD-DVD | BD-DVD | BD-CD | BD-DVD | BD-CD | BD-DVD | BD-DVD |
| A1 | 1 | −1 | −2 | −2 | −3 | −1 | 2 |
| B1 | −1 | 2 | 2 | 1 | 1 | 2 | −2 |
| A2 | 2 | −2 | −3 | −3 | −4 | −3 | 5 |
| B2 | −1 | 2 | 2 | 1 | 1 | 1 | −1 |
| |A1 − B1| | 2 | 3 | 4 | 3 | 4 | 3 | 4 |
| |A2 − B2| | 3 | 4 | 5 | 4 | 5 | 4 | 6 |
| |B1| | 1 | 2 | 2 | 1 | 1 | 2 | 2 |
| |B2| | 1 | 2 | 2 | 1 | 1 | 1 | 1 |

Figure 13:
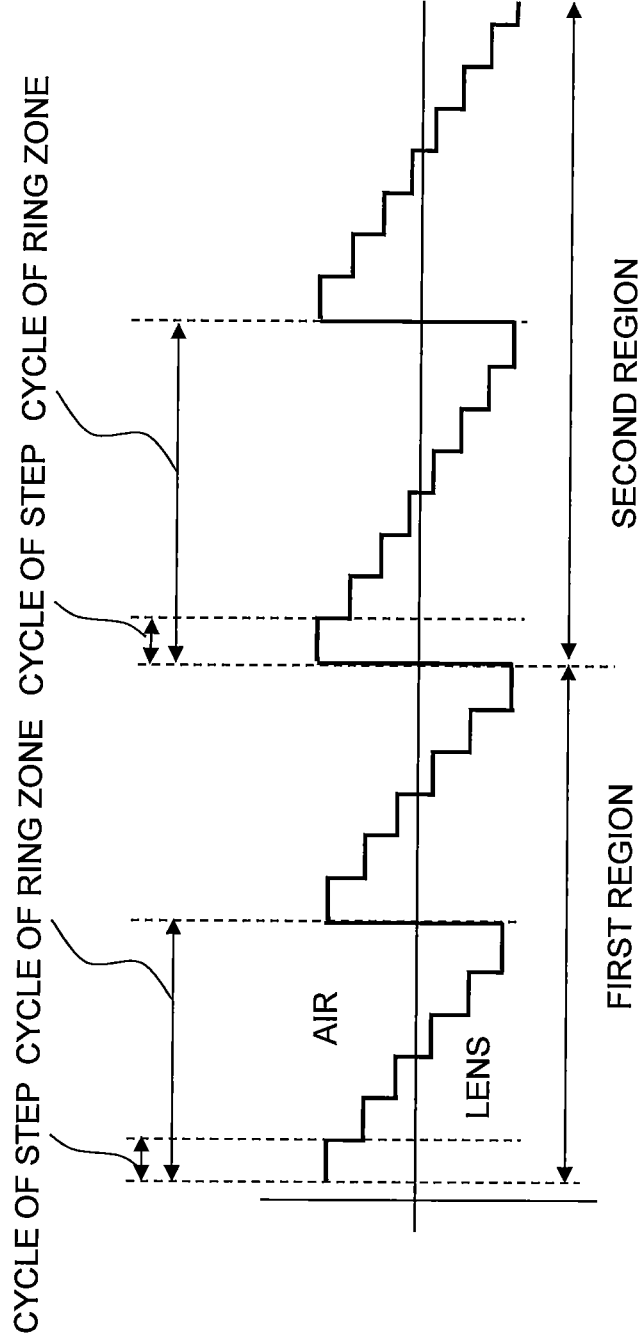
FIG. 13 is a partially enlarged view showing a diffraction shape of an objective lens element according to Example 6.
Figure 14:
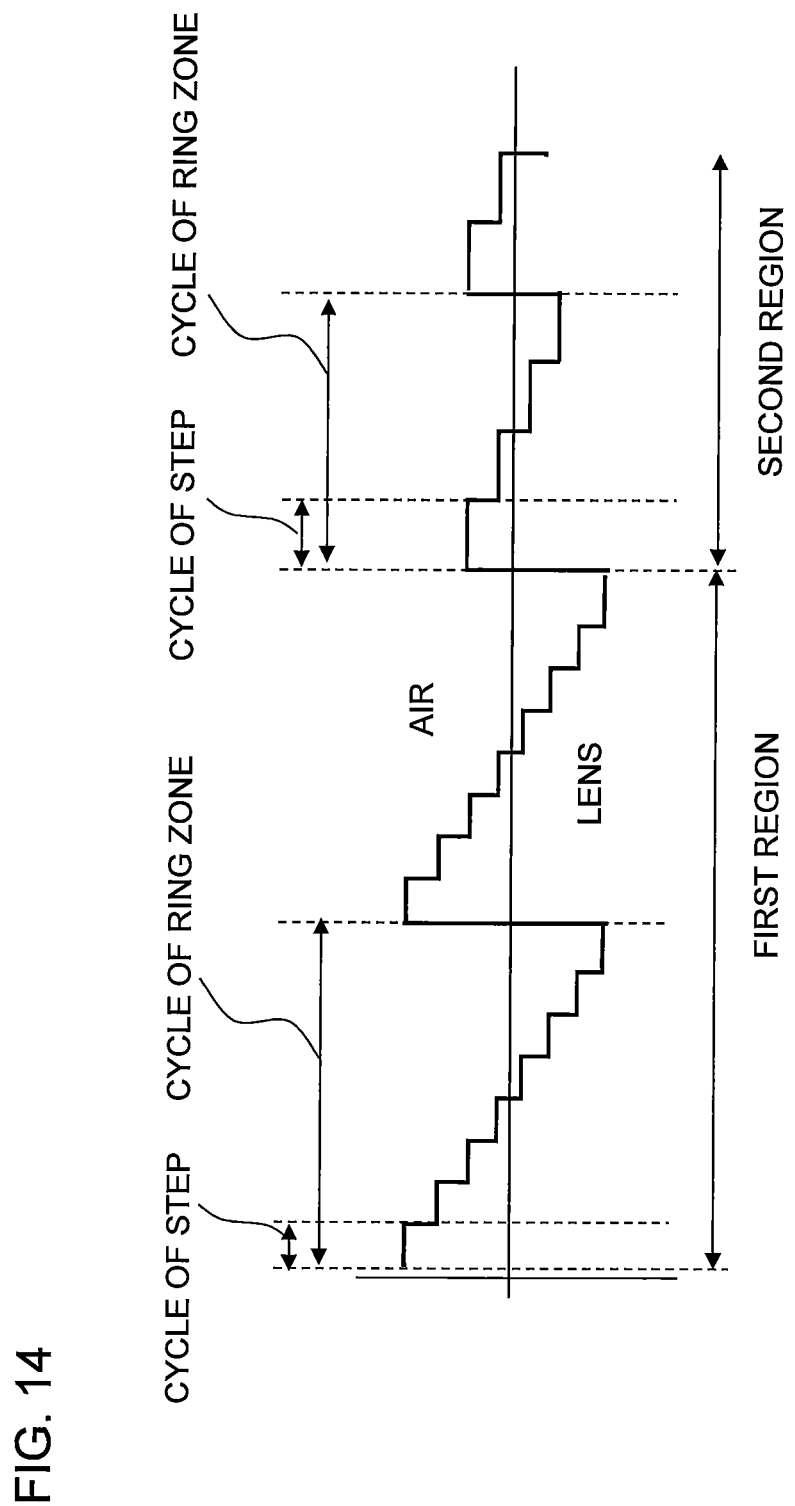
FIG. 14 is a partially enlarged view showing a diffraction shape of an objective lens element according to Example 7.

FIGS. 13 and 14 are partially enlarged views of diffraction structures of objective lens elements according to Examples 6 and 7, respectively. Specifically, FIGS. 13 and 14 each are an enlarged view of a compatible region composed of a first region and a second region. In FIGS. 13 and 14, a portion below a diffraction shape represented by a broken line is a lens material, and a portion above the diffraction shape is air.

Example 6

Example 6 corresponds to the third embodiment. The first surface of an objective lens element according to Example 2 is divided into a first region including a symmetry axis, a second region surrounding the first region, a third region surrounding the second region, and an outer region surrounding the third region. A 6-level stair-like diffraction structure whose height monotonically decreases step by step as distance from the optical axis of the objective lens element increases is provided on the first region of the first surface. An 8-level stair-like diffraction structure whose height monotonically decreases step by step as distance from the optical axis of the objective lens element increases is provided on the second region. A 4-level stair-like diffraction structure whose height monotonically decreases step by step as distance from the optical axis of the objective lens element increases is provided on the third region. A sawtooth-like diffraction structure is provided on the outer region. The second surface is an aspheric surface. The objective lens element according to Example 6 is a BD/DVD/CD compatible lens. With regard to designed values for BD, the wavelength is 405 nm; the focal length is 1.20 mm; and the protective layer thickness of an information storage medium is 0.085 mm. With regard to designed values for DVD, the wavelength is 650 nm; the focal length is 1.45 mm; and the protective layer thickness of an information storage medium is 0.6 mm. With regard to designed values for CD, the wavelength is 780 nm; the focal length is 1.64 mm; and the protective layer thickness of an information storage medium is 1.2 mm.

Tables 39 and 40 show construction data of the objective lens element according to Example 6.

TABLE 39

|  | BD | DVD | CD |
|---|---|---|---|
| Wavelength | 0.405 | 0.650 | 0.780 |
| Effective diameter | 1.66 | 1.66 | 1.66 |
| Working distance (WD) | 0.47 | 0.44 | 0.30 |
| Disc thickness (DT) | 0.085 | 0.60 | 1.20 |
| Focal length | 1.2 | 1.45 | 1.64 |
| First surface, First region Diffraction order | 2 | −1 | −2 |
| First surface, Second region Diffraction order | 2 | −2 | −3 |
| First surface, Third region Diffraction order | 1 | −1 | — |
| First surface, _Outer region Diffraction order | 3 | — | — |
| Object point (OP) | ∞ | −200 | 100 |

| Surface No. | Radius of curvature at the top | Thickness | Material | Remarks |
|---|---|---|---|---|
| 0 |  | OP |  |  |
| 1 | 0.80094682 | 1.16723 | n1 | First region (Diffractive surface), Second region (Diffractive surface), Third region (Diffractive surface), Outer region (Diffractive surface) |
| 2 | −2.36979 | WD |  | Aspheric surface |
| 3 | ∞ | DT | disc | Planar |
| 4 | ∞ |  |  | Planar |

| Wavelength | 0.405 | 0.650 | 0.780 |
|---|---|---|---|
| n1 | 1.52550 | 1.50746 | 1.50385 |
| disc | 1.61913 | 1.57881 | 1.57180 |

TABLE 40

| First surface | First region Diffractive surface | First surface | Second Region Diffractive surface | Second surface | Aspherical constant |
|---|---|---|---|---|---|
| Region | 0 mm-0.76 mm Aspherical constant | Region | 0.76 mm-0.82 mm Aspherical constant | RD | −2.433225 |
|  |  |  |  | k | 18.18902 |
| RD | 0.79379153 | RD | 0.37514459 | A0 | 0 |
| k | −1.0089037 | k | −1.7682624 | A2 | 0 |
| A0 | 0 | A0 | −0.13107122 | A4 | 1.458337 |
| A2 | 0 | A2 | 0 | A6 | −10.079282 |
| A4 | 0.15630796 | A4 | −0.016040955 | A8 | 32.941344 |
| A6 | 0.1234095 | A6 | 0.97078969 | A10 | 561.91403 |
| A8 | −0.041797152 | A8 | −1.9579984 | A12 | −7183.1577 |
| A10 | −1.9732875 | A10 | −2.5798109 | A14 | 37242.998 |
| A12 | 9.3786807 | A12 | 17.700268 | A16 | −94611.808 |
| A14 | −15.409691 | A14 | −25.617042 | A18 | 97317.354 |
| A16 | 9.1687136 | A16 | 12.626725 |  |  |
|  | Phase function | A18 | 0.12252176 |  |  |
| P2 | −302.57753 |  | Phase function |  |  |
| P4 | −39.744514 | P2 | −328.02751 |  |  |
| P6 | 45.905067 | P4 | −89.723276 |  |  |
|  |  | P6 | 209.39281 |  |  |

Tables 41A-41F show ring zone cycles of the stair-like step structure provided on the first region of the first surface, and cycles of steps arranged in each ring zone.

TABLE 41A

| | Cycle [μm] | | Cycle [μm] |
|---|---|---|---|
| First ring zone | 143.91 | First step | 58.82 |
| | | Second step | 24.34 |
| | | Third step | 18.67 |
| | | Fourth step | 15.73 |
| | | Fifth step | 13.85 |
| | | Sixth step | 12.51 |
| Second ring zone | 59.36 | First step | 11.50 |
| | | Second step | 10.70 |
| | | Third step | 10.04 |
| | | Fourth step | 9.49 |
| | | Fifth step | 9.02 |
| | | Sixth step | 8.61 |
| Third ring zone | 45.39 | First step | 8.26 |
| | | Second step | 7.94 |
| | | Third step | 7.66 |
| | | Fourth step | 7.40 |
| | | Fifth step | 7.17 |
| | | Sixth step | 6.96 |
| Fourth ring zone | 38.15 | First step | 6.77 |
| | | Second step | 6.59 |
| | | Third step | 6.42 |
| | | Fourth step | 6.27 |
| | | Fifth step | 6.12 |
| | | Sixth step | 5.99 |
| Fifth ring zone | 33.52 | First step | 5.86 |
| | | Second step | 5.74 |
| | | Third step | 5.63 |
| | | Fourth step | 5.53 |
| | | Fifth step | 5.43 |
| | | Sixth step | 5.33 |

TABLE 41B

| | Cycle [μm] | | Cycle [μm] |
|---|---|---|---|
| Sixth ring zone | 30.23 | First step | 5.24 |
| | | Second step | 5.15 |
| | | Third step | 5.07 |
| | | Fourth step | 4.99 |
| | | Fifth step | 4.92 |
| | | Sixth step | 4.85 |
| Seventh ring zone | 27.74 | First step | 4.78 |
| | | Second step | 4.71 |
| | | Third step | 4.65 |
| | | Fourth step | 4.59 |
| | | Fifth step | 4.53 |
| | | Sixth step | 4.48 |
| Eighth ring zone | 25.78 | First step | 4.42 |
| | | Second step | 4.37 |
| | | Third step | 4.32 |
| | | Fourth step | 4.27 |
| | | Fifth step | 4.22 |
| | | Sixth step | 4.18 |
| Ninth ring zone | 24.18 | First step | 4.13 |
| | | Second step | 4.09 |
| | | Third step | 4.05 |
| | | Fourth step | 4.01 |
| | | Fifth step | 3.97 |
| | | Sixth step | 3.93 |
| Tenth ring zone | 22.84 | First step | 3.89 |
| | | Second step | 3.86 |
| | | Third step | 3.82 |
| | | Fourth step | 3.79 |
| | | Fifth step | 3.76 |
| | | Sixth step | 3.72 |

TABLE 41C

| | Cycle [μm] | | Cycle [μm] |
|---|---|---|---|
| Eleventh ring zone | 21.71 | First step | 3.69 |
| | | Second step | 3.66 |
| | | Third step | 3.63 |
| | | Fourth step | 3.60 |
| | | Fifth step | 3.57 |
| | | Sixth step | 3.55 |
| Twelfth ring zone | 20.73 | First step | 3.52 |
| | | Second step | 3.49 |
| | | Third step | 3.47 |
| | | Fourth step | 3.44 |
| | | Fifth step | 3.42 |
| | | Sixth step | 3.39 |
| Thirteenth ring zone | 19.88 | First step | 3.37 |
| | | Second step | 3.35 |
| | | Third step | 3.32 |
| | | Fourth step | 3.30 |
| | | Fifth step | 3.28 |
| | | Sixth step | 3.26 |
| Fourteenth ring zone | 19.13 | First step | 3.24 |
| | | Second step | 3.22 |
| | | Third step | 3.20 |
| | | Fourth step | 3.18 |
| | | Fifth step | 3.16 |
| | | Sixth step | 3.14 |
| Fifteenth ring zone | 18.46 | First step | 3.12 |
| | | Second step | 3.10 |
| | | Third step | 3.09 |
| | | Fourth step | 3.07 |
| | | Fifth step | 3.05 |
| | | Sixth step | 3.03 |

TABLE 41D

| | Cycle [μm] | | Cycle [μm] |
|---|---|---|---|
| Sixteenth ring zone | 17.87 | First step | 3.02 |
| | | Second step | 3.00 |
| | | Third step | 2.99 |
| | | Fourth step | 2.97 |
| | | Fifth step | 2.95 |
| | | Sixth step | 2.94 |
| Seventeenth ring zone | 17.34 | First step | 2.92 |
| | | Second step | 2.91 |
| | | Third step | 2.90 |
| | | Fourth step | 2.88 |
| | | Fifth step | 2.87 |
| | | Sixth step | 2.85 |
| Eighteenth ring zone | 16.85 | First step | 2.84 |
| | | Second step | 2.83 |
| | | Third step | 2.82 |
| | | Fourth step | 2.80 |
| | | Fifth step | 2.79 |
| | | Sixth step | 2.78 |
| Nineteenth ring zone | 16.42 | First step | 2.77 |
| | | Second step | 2.75 |
| | | Third step | 2.74 |
| | | Fourth step | 2.73 |
| | | Fifth step | 2.72 |
| | | Sixth step | 2.71 |
| Twentieth ring zone | 16.02 | First step | 2.70 |
| | | Second step | 2.69 |
| | | Third step | 2.68 |
| | | Fourth step | 2.66 |
| | | Fifth step | 2.65 |
| | | Sixth step | 2.64 |

TABLE 41E

|  | Cycle [μm] |  | Cycle [μm] |
| --- | --- | --- | --- |
| Twenty-first ring zone | 15.66 | First step | 2.63 |
|  |  | Second step | 2.62 |
|  |  | Third step | 2.61 |
|  |  | Fourth step | 2.60 |
|  |  | Fifth step | 2.60 |
|  |  | Sixth step | 2.59 |
| Twenty-second ring zone | 15.33 | First step | 2.58 |
|  |  | Second step | 2.57 |
|  |  | Third step | 2.56 |
|  |  | Fourth step | 2.55 |
|  |  | Fifth step | 2.54 |
|  |  | Sixth step | 2.53 |
| Twenty-third ring zone | 15.02 | First step | 2.52 |
|  |  | Second step | 2.52 |
|  |  | Third step | 2.51 |
|  |  | Fourth step | 2.50 |
|  |  | Fifth step | 2.49 |
|  |  | Sixth step | 2.48 |
| Twenty-fourth ring zone | 14.75 | First step | 2.48 |
|  |  | Second step | 2.47 |
|  |  | Third step | 2.46 |
|  |  | Fourth step | 2.45 |
|  |  | Fifth step | 2.45 |
|  |  | Sixth step | 2.44 |
| Twenty-fifth ring zone | 14.49 | First step | 2.43 |
|  |  | Second step | 2.43 |
|  |  | Third step | 2.42 |
|  |  | Fourth step | 2.41 |
|  |  | Fifth step | 2.40 |
|  |  | Sixth step | 2.40 |

TABLE 41F

|  | Cycle [μm] |  | Cycle [μm] |
| --- | --- | --- | --- |
| Twenty-sixth ring zone | 14.26 | First step | 2.39 |
|  |  | Second step | 2.39 |
|  |  | Third step | 2.38 |
|  |  | Fourth step | 2.37 |
|  |  | Fifth step | 2.37 |
|  |  | Sixth step | 2.36 |
| Twenty-seventh ring zone | 14.04 | First step | 2.35 |
|  |  | Second step | 2.35 |
|  |  | Third step | 2.34 |
|  |  | Fourth step | 2.34 |
|  |  | Fifth step | 2.33 |
|  |  | Sixth step | 2.33 |
| Twenty-eighth ring zone | 13.85 | First step | 2.32 |
|  |  | Second step | 2.32 |
|  |  | Third step | 2.31 |
|  |  | Fourth step | 2.30 |
|  |  | Fifth step | 2.30 |
|  |  | Sixth step | 2.29 |

On the first region of Example 6, one ring zone cycle is composed of consecutive 6-level stair-like steps whose height monotonically decreases step by step as distance from the optical axis of the objective lens element increases. Each ring zone cycle in Tables 41A-41F indicate the width of a ring zone in a radial direction (in a direction perpendicular to the optical axis) as indicated by an arrow in FIG. 13. On the first region, a first ring zone, a second ring zone, a third ring zone, . . . , and a twenty-eighth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 13. In each ring zone, the steps are referred to as a first step, a second step, a third step, . . . , and a sixth step in order from the optical axis side toward the outer periphery side.

Table 42 shows ring zone cycles of the stair-like step structure provided on the second region of the first surface, and cycles of steps arranged in each ring zone.

TABLE 42

|  | Cycle [μm] |  | Cycle [μm] |
| --- | --- | --- | --- |
| First ring zone | 22.55 | First step | 2.25 |
|  |  | Second step | 2.26 |
|  |  | Third step | 2.28 |
|  |  | Fourth step | 2.30 |
|  |  | Fifth step | 2.31 |
|  |  | Sixth step | 2.33 |
|  |  | Seventh step | 2.35 |
|  |  | Eighth step | 2.37 |
| Second ring zone | 21.15 | First step | 2.40 |
|  |  | Second step | 2.42 |
|  |  | Third step | 2.44 |
|  |  | Fourth step | 2.47 |
|  |  | Fifth step | 2.50 |
|  |  | Sixth step | 2.53 |
|  |  | Seventh step | 2.56 |
|  |  | Eighth step | 2.59 |

On the second region of Example 6, one ring zone cycle is composed of consecutive 8-level stair-like steps whose height monotonically decreases step by step as distance from the optical axis of the objective lens element increases. Each ring zone cycle in Table 42 indicates the width of a ring zone in the radial direction (in the direction perpendicular to the optical axis) as indicated by an arrow in FIG. 13. On the second region, a first ring zone and a second ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 13. In each ring zone, the steps are referred to as a first step, a second step, a third step, . . . , and an eighth step in order from the optical axis side toward the outer periphery side.

Tables 43A-43F show step heights of the stair-like diffraction structure provided on the first region of Example 6. In one cycle of the stair-like diffraction structure, the height of each of the first to fifth steps is set such that a phase difference of 1.33 wavelengths is provided to light of the designed wavelength for BD, and the height of the sixth step is set such that a phase difference of 6.65 wavelengths is provided in the opposite direction.

TABLE 43A

|  |  | Depth [μm] |
| --- | --- | --- |
| First ring zone | First step | 1.02856 |
|  | Second step | 1.02978 |
|  | Third step | 1.03101 |
|  | Fourth step | 1.03224 |
|  | Fifth step | 1.03347 |
|  | Sixth step | 5.17357 |
| Second ring zone | First step | 1.03597 |
|  | Second step | 1.03722 |
|  | Third step | 1.03849 |
|  | Fourth step | 1.03974 |
|  | Fifth step | 1.04102 |
|  | Sixth step | 5.21143 |
| Third ring zone | First step | 1.04358 |
|  | Second step | 1.04486 |
|  | Third step | 1.04615 |
|  | Fourth step | 1.04746 |
|  | Fifth step | 1.04875 |
|  | Sixth step | 5.25035 |

TABLE 43A-continued

| | | Depth [μm] |
|---|---|---|
| Fourth ring zone | First step | 1.05138 |
| | Second step | 1.05271 |
| | Third step | 1.05403 |
| | Fourth step | 1.05536 |
| | Fifth step | 1.05671 |
| | Sixth step | 5.29028 |
| Fifth ring zone | First step | 1.05940 |
| | Second step | 1.06076 |
| | Third step | 1.06213 |
| | Fourth step | 1.06349 |
| | Fifth step | 1.06488 |
| | Sixth step | 5.33127 |

TABLE 43B

| | | Depth [μm] |
|---|---|---|
| Sixth ring zone | First step | 1.06764 |
| | Second step | 1.06904 |
| | Third step | 1.07044 |
| | Fourth step | 1.07185 |
| | Fifth step | 1.07326 |
| | Sixth step | 5.37339 |
| Seventh ring zone | First step | 1.07610 |
| | Second step | 1.07753 |
| | Third step | 1.07897 |
| | Fourth step | 1.08041 |
| | Fifth step | 1.08186 |
| | Sixth step | 5.41658 |
| Eighth ring zone | First step | 1.08478 |
| | Second step | 1.08625 |
| | Third step | 1.08773 |
| | Fourth step | 1.08921 |
| | Fifth step | 1.09070 |
| | Sixth step | 5.46097 |
| Ninth ring zone | First step | 1.09369 |
| | Second step | 1.09519 |
| | Third step | 1.09671 |
| | Fourth step | 1.09823 |
| | Fifth step | 1.09976 |
| | Sixth step | 5.50649 |
| Tenth ring zone | First step | 1.10283 |
| | Second step | 1.10439 |
| | Third step | 1.10594 |
| | Fourth step | 1.10751 |
| | Fifth step | 1.10908 |
| | Sixth step | 5.55328 |

TABLE 43C

| | | Depth [μm] |
|---|---|---|
| Eleventh ring zone | First step | 1.11224 |
| | Second step | 1.11384 |
| | Third step | 1.11544 |
| | Fourth step | 1.11704 |
| | Fifth step | 1.11867 |
| | Sixth step | 5.60147 |
| Twelfth ring zone | First step | 1.12193 |
| | Second step | 1.12357 |
| | Third step | 1.12523 |
| | Fourth step | 1.12688 |
| | Fifth step | 1.12856 |
| | Sixth step | 5.65119 |
| Thirteenth ring zone | First step | 1.13192 |
| | Second step | 1.13362 |
| | Third step | 1.13533 |
| | Fourth step | 1.13705 |
| | Fifth step | 1.13878 |
| | Sixth step | 5.70257 |

TABLE 43C-continued

| | | Depth [μm] |
|---|---|---|
| Fourteenth ring zone | First step | 1.14226 |
| | Second step | 1.14402 |
| | Third step | 1.14579 |
| | Fourth step | 1.14758 |
| | Fifth step | 1.14938 |
| | Sixth step | 5.75589 |
| Fifteenth ring zone | First step | 1.15301 |
| | Second step | 1.15483 |
| | Third step | 1.15667 |
| | Fourth step | 1.15852 |
| | Fifth step | 1.16039 |
| | Sixth step | 5.81135 |

TABLE 43D

| | | Depth [μm] |
|---|---|---|
| Sixteenth ring zone | First step | 1.16416 |
| | Second step | 1.16607 |
| | Third step | 1.16799 |
| | Fourth step | 1.16993 |
| | Fifth step | 1.17188 |
| | Sixth step | 5.86920 |
| Seventeenth ring zone | First step | 1.17581 |
| | Second step | 1.17781 |
| | Third step | 1.17981 |
| | Fourth step | 1.18184 |
| | Fifth step | 1.18388 |
| | Sixth step | 5.92965 |
| Eighteenth ring zone | First step | 1.18801 |
| | Second step | 1.19009 |
| | Third step | 1.19220 |
| | Fourth step | 1.19431 |
| | Fifth step | 1.19645 |
| | Sixth step | 5.99303 |
| Nineteenth ring zone | First step | 1.20078 |
| | Second step | 1.20297 |
| | Third step | 1.20518 |
| | Fourth step | 1.20740 |
| | Fifth step | 1.20966 |
| | Sixth step | 6.05962 |
| Twentieth ring zone | First step | 1.21420 |
| | Second step | 1.21651 |
| | Third step | 1.21884 |
| | Fourth step | 1.22119 |
| | Fifth step | 1.22356 |
| | Sixth step | 6.12973 |

TABLE 43E

| | | Depth [μm] |
|---|---|---|
| Twenty-first ring zone | First step | 1.22836 |
| | Second step | 1.23079 |
| | Third step | 1.23325 |
| | Fourth step | 1.23573 |
| | Fifth step | 1.23822 |
| | Sixth step | 6.20378 |
| Twenty-second ring zone | First step | 1.24332 |
| | Second step | 1.24589 |
| | Third step | 1.24849 |
| | Fourth step | 1.25113 |
| | Fifth step | 1.25378 |
| | Sixth step | 6.28230 |
| Twenty-third ring zone | First step | 1.25918 |
| | Second step | 1.26192 |
| | Third step | 1.26470 |
| | Fourth step | 1.26750 |
| | Fifth step | 1.27034 |
| | Sixth step | 6.36607 |

TABLE 43E-continued

| | | Depth [μm] |
|---|---|---|
| Twenty-fourth ring zone | First step | 1.27611 |
| | Second step | 1.27905 |
| | Third step | 1.28203 |
| | Fourth step | 1.28505 |
| | Fifth step | 1.28810 |
| | Sixth step | 6.45599 |
| Twenty-fifth ring zone | First step | 1.29433 |
| | Second step | 1.29752 |
| | Third step | 1.30074 |
| | Fourth step | 1.30401 |
| | Fifth step | 1.30734 |
| | Sixth step | 6.55356 |

TABLE 43F

| | | Depth [μm] |
|---|---|---|
| Twenty-sixth ring zone | First step | 1.31414 |
| | Second step | 1.31762 |
| | Third step | 1.32116 |
| | Fourth step | 1.32476 |
| | Fifth step | 1.32843 |
| | Sixth step | 6.66080 |
| Twenty-seventh ring zone | First step | 1.33597 |
| | Second step | 1.33984 |
| | Third step | 1.34380 |
| | Fourth step | 1.34782 |
| | Fifth step | 1.35194 |
| | Sixth step | 6.78077 |
| Twenty-eighth ring zone | First step | 1.36045 |
| | Second step | 1.36485 |
| | Third step | 1.36934 |
| | Fourth step | 1.37395 |
| | Fifth step | 1.37867 |

Table 44 shows step heights of the stair-like diffraction structure provided on the second region of Example 6. In one cycle of the stair-like diffraction structure, the height of each of the first to seventh steps is set such that a phase difference of 1.25 wavelengths is provided to the light of the designed wavelength for BD, and the height of the eighth step is set such that a phase difference of 8.75 wavelengths is provided in the opposite direction.

TABLE 44

| | | Depth [μm] |
|---|---|---|
| First ring zone | First step | 1.33470 |
| | Second step | 1.33995 |
| | Third step | 1.34543 |
| | Fourth step | 1.35111 |
| | Fifth step | 1.35706 |
| | Sixth step | 1.36328 |
| | Seventh step | 1.36976 |
| | Eighth step | 9.63594 |
| Second ring zone | First step | 1.38370 |
| | Second step | 1.39120 |
| | Third step | 1.39909 |
| | Fourth step | 1.40740 |
| | Fifth step | 1.41618 |
| | Sixth step | 1.42546 |
| | Seventh step | 1.43530 |
| | Eighth step | 10.12016 |

It should be noted that although not shown, the 4-level stair-like diffraction structure whose height monotonically decreases step by step as distance from the optical axis of the objective lens element increases is provided on the third region of Example 6. The sawtooth-like diffraction structure is provided on the outer region of Example 6.

Table 45 shows diffraction efficiencies at the twenty-eighth ring zone of the first region and at the second ring zone of the second region. The second ring zone of the second region is an outermost region which contributes to formation of a spot of light for CD in the present example.

TABLE 45

| | | | Diffractive efficiency (%) |
|---|---|---|---|
| BD | Inner region | First ring zone | 67 |
| | | Twenty-eighth ring zone | 45 |
| | Middle region | Second ring zone | 57 |
| DVD | Inner region | First ring zone | 71 |
| | | Twenty-eighth ring zone | 49 |
| | Middle region | Second ring zone | 30 |
| CD | Inner region | First ring zone | 65 |
| | | Twenty-eighth ring zone | 32 |
| | Middle region | Second ring zone | 17 |

The ring zone cycle of the twenty-eighth ring zone of the first region is about 14 μm, and the diffraction efficiency of the light for BD is about 45%. Meanwhile, the ring zone cycle of the first ring zone of the first region is about 144 μm, and the diffraction efficiency of the light for BD is about 67%. Thus, the diffraction efficiency of the light for BD at the twenty-eighth ring zone of the first region is much lower than the diffraction efficiency at the first ring zone. When the present invention is not applied, an amount of light in reproducing/recording on BD is insufficient with this diffraction efficiency.

In contrast, the ring zone cycle of the second ring zone of the second region is about 21 μm. The diffraction efficiency of the light for BD at the second ring zone of the second region is about 57% and is greatly improved as compared to the diffraction efficiency at the twenty-eighth ring zone of the first region. Thus, insufficiency of the light amount in reproducing/recording on BD is suppressed.

Example 7

Example 7 corresponds to the third embodiment. The first surface of an objective lens element according to Example 3 is divided into a first region including a symmetry axis, a second region surrounding the first region, and an outer region surrounding the second region. An 8-level stair-like diffraction structure whose height monotonically decreases step by step as distance from the optical axis of the objective lens element decreases is provided on the first region of the first surface. A 4-level stair-like diffraction structure whose height monotonically increases step by step as distance from the optical axis of the objective lens element increases is provided on the second region. A sawtooth-like diffraction structure is provided on the outer region. The second surface is an aspheric surface. The objective lens element according to Example 7 is a BD/DVD/CD compatible lens. With regard to designed values for BD, the wavelength is 408 nm; the focal length is 1.80 mm; and the protective layer thickness of an information storage medium is 0.0875 mm. With regard to designed values for DVD, the wavelength is 658 nm; the focal length is 2.0 mm; and the protective layer thickness of an information storage medium is 0.6 mm. With regard to designed values for CD, the wavelength is 785 nm; the focal length is 2.1 mm; and the protective layer thickness of an information storage medium is 1.2 mm.

Tables 46 and 47 show construction data of the objective lens element according to Example 7.

TABLE 46

| | BD | DVD | CD |
|---|---|---|---|
| Wavelength | 0.408 | 0.658 | 0.785 |
| Effective diameter | 3.09 | 2.41 | 2.06 |
| NA | 0.86 | 0.6 | 0.47 |
| Working distance (WD) | 0.53 | 0.44 | 0.3 |
| Disc thickness (DT) | 0.0875 | 0.6 | 1.2 |
| Focal length | 1.8 | 2.0 | 2.1 |
| First surface, First region Diffraction order | 2 | −2 | −3 |
| First surface, Second region _Diffraction order | 1 | −1 | — |
| First surface, Outer region Diffraction order | 3 | — | — |
| Object point (OP) | ∞ | −100 | 100 |

| Surface No. | Radius of curvature at the top | Thickness | Material |
|---|---|---|---|
| 0 | | OP | |
| 1 | 1.211178 | 2.256248 | n1 |
| 2 | −1.6991606 | WD | |
| 3 | ∞ | DT | disc |
| 4 | ∞ | | |
| Wavelength | 0.408 | 0.658 | 0.785 |
| n1 | 1.52173 | 1.50389 | 1.50072 |
| disc | 1.61642 | 1.57829 | 1.57203 |

TABLE 47

| First surface | First region Diffractive surface |
|---|---|
| Region | 0 mm-1.06 mm |

| Aspherical constant | |
|---|---|
| RD | 1.211178 |
| CC | −0.4471445 |
| A0 | 0 |
| A2 | 0 |
| A4 | 0.003042451 |
| A6 | −0.002139362 |
| A8 | −0.000916782 |

| First surface | First region Diffractive surface |
|---|---|
| P2 | −95.525682 |
| P4 | 10.679966 |
| P6 | −11.044402 |
| P8 | 4.2227878 |

| First surface | Second region Diffractive surface |
|---|---|
| Region | 1.06 mm-1.22 mm |

| Aspherical constant | |
|---|---|
| RD | 1.2175459 |
| CC | −0.62312929 |
| A0 | 0.003755648 |
| A2 | 0 |
| A4 | 0.0096913 |
| A6 | 0.018056743 |
| A8 | −0.007521892 |
| A10 | −0.006034092 |
| A12 | 0.006817604 |
| A14 | −0.001205342 |
| A16 | −0.000204353 |

TABLE 47-continued

| First surface | Second region Diffractive surface |
|---|---|
| P2 | −222.89625 |
| P4 | 36.546342 |
| P6 | −10.136124 |

| First surface | Outer region Diffractive surface |
|---|---|
| Region | 1.22 mm-1.54 mm |

| Aspherical constant | |
|---|---|
| RD | 1.2118213 |
| CC | −0.63998677 |
| A0 | −0.0027581 |
| A2 | 0 |
| A4 | 0.013731193 |
| A6 | 0.016620479 |
| A8 | −0.005058364 |
| A10 | −0.002588911 |
| A12 | 0.000276612 |
| A14 | 0.00109062 |
| A16 | −2.11E−04 |
| A18 | 2.72E−05 |
| A20 | −3.38E−05 |

| First surface | Outer region Diffractive surface |
|---|---|
| P2 | −274.96935 |
| P4 | 117.11955 |
| P6 | −40.810453 |

| Second surface | First region |
|---|---|
| Region | 0 mm-0.65 mm |

| Aspherical constant | |
|---|---|
| RD | −1.6991606 |
| CC | −17.689289 |
| A0 | 0 |
| A2 | 0 |
| A4 | 0.44868592 |
| A6 | −1.838644 |
| A8 | 4.607409 |
| A10 | −4.4442043 |
| A12 | −2.9706261 |
| A14 | 6.2221748 |

| Second surface | First region |
|---|---|
| Region | 0.65 mm-1.22 mm |

| Aspherical constant | |
|---|---|
| RD | −1.7038237 |
| CC | −24.181952 |
| A0 | 0.00145644 |
| A2 | 0 |
| A4 | 0.15414236 |
| A6 | −0.12617431 |
| A8 | −0.006173137 |
| A10 | 0.014786931 |
| A12 | 0.029242605 |
| A14 | −0.013049098 |
| A16 | −0.012637288 |
| A18 | 0.005136492 |
| A20 | 0.003026593 |
| A22 | −0.001344723 |

Tables 48A-48D show ring zone cycles of the stair-like step structure provided on the first region of the first surface, and cycles of steps arranged in each ring zone.

TABLE 48A

|  | Cycle [μm] |  | Cycle [μm] |
|---|---|---|---|
| First ring zone | 256.86 | First step | 90.30 |
|  |  | Second step | 37.63 |
|  |  | Third step | 28.92 |
|  |  | Fourth step | 24.41 |
|  |  | Fifth step | 21.53 |
|  |  | Sixth step | 19.49 |
|  |  | Seventh step | 17.94 |
|  |  | Eighth step | 16.72 |
| Second ring zone | 364.57 | First step | 15.72 |
|  |  | Second step | 14.89 |
|  |  | Third step | 14.17 |
|  |  | Fourth step | 13.56 |
|  |  | Fifth step | 13.01 |
|  |  | Sixth step | 12.54 |
|  |  | Seventh step | 12.11 |
|  |  | Eighth step | 11.72 |
| Third ring zone | 83.23 | First step | 11.37 |
|  |  | Second step | 11.05 |
|  |  | Third step | 10.75 |
|  |  | Fourth step | 10.48 |
|  |  | Fifth step | 10.23 |
|  |  | Sixth step | 10.00 |
|  |  | Seventh step | 9.78 |
|  |  | Eighth step | 9.57 |
| Fourth ring zone | 70.52 | First step | 9.38 |
|  |  | Second step | 9.20 |
|  |  | Third step | 9.03 |
|  |  | Fourth step | 8.87 |
|  |  | Fifth step | 8.72 |
|  |  | Sixth step | 8.57 |
|  |  | Seventh step | 8.44 |
|  |  | Eighth step | 8.30 |

TABLE 48B

|  | Cycle [μm] |  | Cycle [μm] |
|---|---|---|---|
| Fifth ring zone | 62.34 | First step | 8.18 |
|  |  | Second step | 8.06 |
|  |  | Third step | 7.94 |
|  |  | Fourth step | 7.83 |
|  |  | Fifth step | 7.73 |
|  |  | Sixth step | 7.63 |
|  |  | Seventh step | 7.53 |
|  |  | Eighth step | 7.44 |
| Sixth ring zone | 56.46 | First step | 7.34 |
|  |  | Second step | 7.26 |
|  |  | Third step | 7.17 |
|  |  | Fourth step | 7.09 |
|  |  | Fifth step | 7.01 |
|  |  | Sixth step | 6.94 |
|  |  | Seventh step | 6.86 |
|  |  | Eighth step | 6.79 |
| Seventh ring zone | 51.96 | First step | 6.72 |
|  |  | Second step | 6.65 |
|  |  | Third step | 6.59 |
|  |  | Fourth step | 6.52 |
|  |  | Fifth step | 6.46 |
|  |  | Sixth step | 6.40 |
|  |  | Seventh step | 6.34 |
|  |  | Eighth step | 6.28 |
| Eighth ring zone | 48.36 | First step | 6.23 |
|  |  | Second step | 6.17 |
|  |  | Third step | 6.12 |
|  |  | Fourth step | 6.07 |
|  |  | Fifth step | 6.02 |
|  |  | Sixth step | 5.97 |
|  |  | Seventh step | 5.92 |
|  |  | Eighth step | 5.87 |

TABLE 48C

|  | Cycle [μm] |  | Cycle [μm] |
|---|---|---|---|
| Ninth ring zone | 45.39 | First step | 5.83 |
|  |  | Second step | 5.78 |
|  |  | Third step | 5.74 |
|  |  | Fourth step | 5.69 |
|  |  | Fifth step | 5.65 |
|  |  | Sixth step | 5.61 |
|  |  | Seventh step | 5.57 |
|  |  | Eighth step | 5.53 |
| Tenth ring zone | 42.90 | First step | 5.49 |
|  |  | Second step | 5.45 |
|  |  | Third step | 5.41 |
|  |  | Fourth step | 5.38 |
|  |  | Fifth step | 5.34 |
|  |  | Sixth step | 5.31 |
|  |  | Seventh step | 5.27 |
|  |  | Eighth step | 5.24 |
| Eleventh ring zone | 40.77 | First step | 5.21 |
|  |  | Second step | 5.17 |
|  |  | Third step | 5.14 |
|  |  | Fourth step | 5.11 |
|  |  | Fifth step | 5.08 |
|  |  | Sixth step | 5.05 |
|  |  | Seventh step | 5.02 |
|  |  | Eighth step | 4.99 |
| Twelfth ring zone | 38.94 | First step | 4.96 |
|  |  | Second step | 4.93 |
|  |  | Third step | 4.91 |
|  |  | Fourth step | 4.88 |
|  |  | Fifth step | 4.85 |
|  |  | Sixth step | 4.83 |
|  |  | Seventh step | 4.80 |
|  |  | Eighth step | 4.78 |

TABLE 48D

|  | Cycle [μm] |  | Cycle [μm] |
|---|---|---|---|
| Thirteenth ring zone | 37.37 | First step | 4.75 |
|  |  | Second step | 4.73 |
|  |  | Third step | 4.70 |
|  |  | Fourth step | 4.68 |
|  |  | Fifth step | 4.66 |
|  |  | Sixth step | 4.64 |
|  |  | Seventh step | 4.61 |
|  |  | Eighth step | 4.59 |
| Fourteenth ring zone | 36.01 | First step | 4.57 |
|  |  | Second step | 4.55 |
|  |  | Third step | 4.53 |
|  |  | Fourth step | 4.51 |
|  |  | Fifth step | 4.49 |
|  |  | Sixth step | 4.47 |
|  |  | Seventh step | 4.45 |
|  |  | Eighth step | 4.43 |
| Fifteenth ring zone | 34.85 | First step | 4.42 |
|  |  | Second step | 4.40 |
|  |  | Third step | 4.38 |
|  |  | Fourth step | 4.36 |
|  |  | Fifth step | 4.35 |
|  |  | Sixth step | 4.33 |
|  |  | Seventh step | 4.31 |
|  |  | Eighth step | 4.30 |
| Sixteenth ring zone | 33.87 | First step | 4.28 |
|  |  | Second step | 4.27 |
|  |  | Third step | 4.25 |
|  |  | Fourth step | 4.24 |
|  |  | Fifth step | 4.23 |
|  |  | Sixth step | 4.21 |
|  |  | Seventh step | 4.20 |
|  |  | Eighth step | 4.19 |

On the first region of Example 7, one ring zone cycle is composed of consecutive 8-level stair-like steps whose height monotonically increases step by step as distance from the optical axis of the objective lens element increases. Each ring zone cycle in Tables 48A-48D indicate the width of a ring zone in a radial direction (in a direction perpendicular to the optical axis) as indicated by an arrow in FIG. 14. On the second region, a first ring zone, a second ring zone, a third ring zone, . . . , and a sixteenth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 14. In each ring zone, the steps are referred to as a first step, a second step, a third step, . . . , and an eighth step in order from the optical axis side toward the outer periphery side.

Tables 49A and 49B show ring zone cycles of the stair-like step structure provided on the second region of the first surface, and cycles of steps arranged in each ring zone.

TABLE 49A

|  | Cycle [µm] |  | Cycle [µm] |
|---|---|---|---|
| First ring zone | 16.38 | First step | 4.13 |
|  |  | Second step | 4.12 |
|  |  | Third step | 4.10 |
|  |  | Fourth step | 4.09 |
| Second ring zone | 16.14 | First step | 4.07 |
|  |  | Second step | 4.06 |
|  |  | Third step | 4.04 |
|  |  | Fourth step | 4.03 |
| Third ring zone | 15.90 | First step | 4.01 |
|  |  | Second step | 4.00 |
|  |  | Third step | 3.98 |
|  |  | Fourth step | 3.97 |
| Fourth ring zone | 15.67 | First step | 3.95 |
|  |  | Second step | 3.94 |
|  |  | Third step | 3.93 |
|  |  | Fourth step | 3.91 |
| Fifth ring zone | 15.45 | First step | 3.90 |
|  |  | Second step | 3.88 |
|  |  | Third step | 3.87 |
|  |  | Fourth step | 3.85 |
| Sixth ring zone | 15.22 | First step | 3.84 |
|  |  | Second step | 3.83 |
|  |  | Third step | 3.81 |
|  |  | Fourth step | 3.80 |
| Seventh ring zone | 15.00 | First step | 3.78 |
|  |  | Second step | 3.77 |
|  |  | Third step | 3.76 |
|  |  | Fourth step | 3.74 |
| Eighth ring zone | 14.78 | First step | 3.73 |
|  |  | Second step | 3.72 |
|  |  | Third step | 3.70 |
|  |  | Fourth step | 3.69 |

TABLE 49B

|  | Cycle [µm] |  | Cycle [µm] |
|---|---|---|---|
| Ninth ring zone | 14.56 | First step | 3.67 |
|  |  | Second step | 3.66 |
|  |  | Third step | 3.65 |
|  |  | Fourth step | 3.63 |
| Tenth ring zone | 14.35 | First step | 3.62 |
|  |  | Second step | 3.61 |
|  |  | Third step | 3.59 |
|  |  | Fourth step | 3.58 |

On the second region of Example 6, one ring zone cycle is composed of consecutive 4-level stair-like steps whose height monotonically increases step by step as distance from the optical axis of the objective lens element increases. Each ring zone cycle in Tables 49A and 49B indicate the width of a ring zone in the radial direction (in the direction perpendicular to the optical axis) as indicated by an arrow in FIG. 14. On the second region, a first ring zone, a second ring zone, a third ring zone, . . . , and a tenth ring zone are provided in order from the optical axis side toward the outer periphery side of the objective lens element. Further, each step cycle indicates the width, in the radial direction (in the direction perpendicular to the optical axis), of a step provided in each ring zone, as indicated by an arrow in FIG. 14. In each ring zone, the steps are referred to as a first step, a second step, a third step, and a fourth step in order from the optical axis side toward the outer periphery side.

Tables 50A-50D shows step heights of the stair-like diffraction structure provided on the first region of Example 7. In one cycle of the stair-like diffraction structure, the height of each of the first to seventh steps is set such that a phase difference of 1.33 wavelengths is provided to light of the designed wavelength for BD, and the height of the eighth step is set such that a phase difference of 6.65 wavelengths is provided in the opposite direction.

TABLE 50A

|  |  | Depth [µm] |
|---|---|---|
| First ring zone | First step | 0.97858 |
|  | Second step | 0.97964 |
|  | Third step | 0.98070 |
|  | Fourth step | 0.98178 |
|  | Fifth step | 0.98286 |
|  | Sixth step | 0.98394 |
|  | Seventh step | 0.98504 |
|  | Eighth step | 6.90296 |
| Second ring zone | First step | 0.98724 |
|  | Second step | 0.98836 |
|  | Third step | 0.98948 |
|  | Fourth step | 0.99060 |
|  | Fifth step | 0.99174 |
|  | Sixth step | 0.99288 |
|  | Seventh step | 0.99403 |
|  | Eighth step | 6.96623 |
| Third ring zone | First step | 0.99634 |
|  | Second step | 0.99751 |
|  | Third step | 0.99869 |
|  | Fourth step | 0.99986 |
|  | Fifth step | 1.00105 |
|  | Sixth step | 1.00225 |
|  | Seventh step | 1.00345 |
|  | Eighth step | 7.03264 |
| Fourth ring zone | First step | 1.00588 |
|  | Second step | 1.00710 |
|  | Third step | 1.00834 |
|  | Fourth step | 1.00958 |
|  | Fifth step | 1.01081 |
|  | Sixth step | 1.01206 |
|  | Seventh step | 1.01333 |
|  | Eighth step | 7.10211 |

TABLE 50B

|  |  | Depth [µm] |
|---|---|---|
| Fifth ring zone | First step | 1.01586 |
|  | Second step | 1.01715 |
|  | Third step | 1.01844 |
|  | Fourth step | 1.01973 |
|  | Fifth step | 1.02103 |
|  | Sixth step | 1.02234 |
|  | Seventh step | 1.02365 |
|  | Eighth step | 7.17483 |
| Sixth ring zone | First step | 1.02631 |
|  | Second step | 1.02765 |
|  | Third step | 1.02899 |
|  | Fourth step | 1.03034 |
|  | Fifth step | 1.03170 |
|  | Sixth step | 1.03308 |
|  | Seventh step | 1.03445 |
|  | Eighth step | 7.25078 |

TABLE 50B-continued

|  |  | Depth [μm] |
|---|---|---|
| Seventh ring zone | First step | 1.03721 |
|  | Second step | 1.03861 |
|  | Third step | 1.04001 |
|  | Fourth step | 1.04143 |
|  | Fifth step | 1.04285 |
|  | Sixth step | 1.04428 |
|  | Seventh step | 1.04571 |
|  | Eighth step | 7.33005 |
| Eighth ring zone | First step | 1.04860 |
|  | Second step | 1.05006 |
|  | Third step | 1.05153 |
|  | Fourth step | 1.05300 |
|  | Fifth step | 1.05449 |
|  | Sixth step | 1.05598 |
|  | Seventh step | 1.05748 |
|  | Eighth step | 7.41283 |

TABLE 50C

|  |  | Depth [μm] |
|---|---|---|
| Ninth ring zone | First step | 1.06049 |
|  | Second step | 1.06201 |
|  | Third step | 1.06354 |
|  | Fourth step | 1.06508 |
|  | Fifth step | 1.06663 |
|  | Sixth step | 1.06818 |
|  | Seventh step | 1.06974 |
|  | Eighth step | 7.49919 |
| Tenth ring zone | First step | 1.07289 |
|  | Second step | 1.07448 |
|  | Third step | 1.07608 |
|  | Fourth step | 1.07768 |
|  | Fifth step | 1.07929 |
|  | Sixth step | 1.08091 |
|  | Seventh step | 1.08254 |
|  | Eighth step | 7.58923 |
| Eleventh ring zone | First step | 1.08583 |
|  | Second step | 1.08749 |
|  | Third step | 1.08915 |
|  | Fourth step | 1.09083 |
|  | Fifth step | 1.09251 |
|  | Sixth step | 1.09420 |
|  | Seventh step | 1.09590 |
|  | Eighth step | 7.68329 |
| Twelfth ring zone | First step | 1.09934 |
|  | Second step | 1.10108 |
|  | Third step | 1.10281 |
|  | Fourth step | 1.10456 |
|  | Fifth step | 1.10633 |
|  | Sixth step | 1.10810 |
|  | Seventh step | 1.10988 |
|  | Eighth step | 7.78173 |

TABLE 50D

|  |  | Depth [μm] |
|---|---|---|
| Thirteenth ring zone | First step | 1.11348 |
|  | Second step | 1.11529 |
|  | Third step | 1.11711 |
|  | Fourth step | 1.11895 |
|  | Fifth step | 1.12079 |
|  | Sixth step | 1.12265 |
|  | Seventh step | 1.12451 |
|  | Eighth step | 7.88480 |
| Fourteenth ring zone | First step | 1.12829 |
|  | Second step | 1.13019 |
|  | Third step | 1.13210 |
|  | Fourth step | 1.13403 |

TABLE 50D-continued

|  |  | Depth [μm] |
|---|---|---|
|  | Fifth step | 1.13596 |
|  | Sixth step | 1.13791 |
|  | Seventh step | 1.13988 |
|  | Eighth step | 7.99304 |
| Fifteenth ring zone | First step | 1.14385 |
|  | Second step | 1.14585 |
|  | Third step | 1.14786 |
|  | Fourth step | 1.14989 |
|  | Fifth step | 1.15194 |
|  | Sixth step | 1.15399 |
|  | Seventh step | 1.15606 |
|  | Eighth step | 8.10705 |
| Sixteenth ring zone | First step | 1.16025 |
|  | Second step | 1.16236 |
|  | Third step | 1.16449 |
|  | Fourth step | 1.16664 |
|  | Fifth step | 1.16880 |
|  | Sixth step | 1.17098 |
|  | Seventh step | 1.17316 |
|  | Eighth step | 8.22763 |

Tables 51A and 51B show step heights of the stair-like diffraction structure provided on the second region of Example 6. In one cycle of the stair-like diffraction structure, the height of each of the first to third steps is set such that a phase difference of 1.25 wavelengths is provided to the light of the designed wavelength for BD, and the height of the fourth step is set such that a phase difference of 8.75 wavelengths is provided in the opposite direction.

TABLE 51A

|  |  | Depth [μm] |
|---|---|---|
| First ring zone | First step | 1.18405 |
|  | Second step | 1.18635 |
|  | Third step | 1.18866 |
|  | Fourth step | 3.57300 |
| Second ring zone | First step | 1.19335 |
|  | Second step | 1.19571 |
|  | Third step | 1.19810 |
|  | Fourth step | 3.60154 |
| Third ring zone | First step | 1.20294 |
|  | Second step | 1.20538 |
|  | Third step | 1.20783 |
|  | Fourth step | 3.63094 |
| Fourth ring zone | First step | 1.21280 |
|  | Second step | 1.21531 |
|  | Third step | 1.21785 |
|  | Fourth step | 3.66120 |
| Fifth ring zone | First step | 1.22298 |
|  | Second step | 1.22556 |
|  | Third step | 1.22816 |
|  | Fourth step | 3.69236 |
| Sixth ring zone | First step | 1.23344 |
|  | Second step | 1.23610 |
|  | Third step | 1.23878 |
|  | Fourth step | 3.72443 |
| Seventh ring zone | First step | 1.24420 |
|  | Second step | 1.24694 |
|  | Third step | 1.24969 |
|  | Fourth step | 3.75739 |
| Eighth ring zone | First step | 1.25525 |
|  | Second step | 1.25806 |
|  | Third step | 1.26089 |
|  | Fourth step | 3.79118 |

TABLE 51B

|  |  | Depth [μm] |
|---|---|---|
| Ninth ring zone | First step | 1.26659 |
|  | Second step | 1.26948 |
|  | Third step | 1.27236 |
|  | Fourth step | 3.82583 |
| Tenth ring zone | First step | 1.27820 |
|  | Second step | 1.28115 |
|  | Third step | 1.28410 |
|  | Fourth step | 3.86123 |

It should be noted that although not shown, the sawtooth-like diffraction structure is provided on the outer region of Example 7.

Table 52 shows object point distances in Examples 6 and 7.

TABLE 52

|  |  | unit: mm |
|---|---|---|
| Example | 6 | 7 |
| L1 | −200 | −100 |
| L2 | 100 | 100 |

The present invention can be used for an objective lens element used for performing at least one of recording, reproducing, and erasing of information on optical discs of a plurality of standards for which light of different wavelengths is used, and for an optical head device including the objective lens element.

While the invention has been described in detail, the foregoing description is in all aspects illustrative and not restrictive. It will be understood that numerous other modifications and variations can be devised without departing from the scope of the invention.

What is claimed is:

1. An objective lens element configured for converging each of light of a first wavelength and light of a second wavelength on an information recording surface of an optical disc, the objective lens element comprising;
   a surface having a first region including an optical axis and a second region surrounding the first region, wherein:
   a periodic first diffraction structure is provided on the first region,
   a periodic second diffraction structure, different from the first diffraction structure, is provided on the second region, and $$|A1-B1|<|A2-B2| \quad (1),$$

$$|B1|\geq|B2| \quad (2),$$

where:
   A1 is a diffraction order at the first region to converge the light of the first wavelength on the information recording surface,
   B1 is a diffraction order at the first region to converge the light of the second wavelength on the information recording surface,
   A2 is a diffraction order at the second region to converge the light of the first wavelength on the information recording surface, and
   B2 is a diffraction order at the second region to converge the light of the second wavelength on the information recording surface.

2. The objective lens element according to claim 1, wherein both the first region and the second region are provided in a region having an image side numerical aperture of equal to or less than 0.8.

3. The objective lens element according to claim 1, wherein the objective lens element is configured for converging light of a plurality of wavelengths corresponding to a plurality of standards, wherein:
   the first wavelength is the shortest wavelength among the plurality of wavelengths, and
   the second wavelength is the longest wavelength among the plurality of wavelengths.

4. The objective lens element according to claim 1, wherein the first wavelength is from 300 to 450 nm, and the second wavelength is from 600 to 700 nm.

5. The objective lens element according to claim 1, wherein the first wavelength is from 350 to 450 nm, and the second wavelength is from 700 to 800 nm.

6. The objective lens element according to claim 1, wherein the surface further comprises an outer region surrounding the second region, and
   a periodic diffraction structure having a sawtooth configuration is provided on the outer region.

7. The objective lens element according to claim 1, wherein the surface further comprises a third region surrounding the second region, and
   a periodic third diffraction structure, different from the first diffraction structure and the second diffraction structure, is provided on the third region.

8. The objective lens element according to claim 7, wherein the surface further comprises an outer region surrounding the third region, and
   a periodic diffraction structure having a sawtooth configuration is provided on the outer region.

9. An optical head device configured for converging a first incident light beam of a first wavelength through a base plate of a first thickness to form a spot and a second incident light beam of a second wavelength, longer than the first wavelength, through a base plate of a second thickness, larger than the first thickness, to form a spot, the optical head device comprising:
   a first light source configured for emitting a light beam of the first wavelength;
   a second light source configured for emitting a light beam of the second wavelength;
   an objective lens element according to claim 1; and
   a detection element configured for detecting light reflected by an information recording surface of an optical disc.

* * * * *